(12) United States Patent
Wang et al.

(10) Patent No.: US 10,846,146 B2
(45) Date of Patent: Nov. 24, 2020

(54) BRIDGING CIRCUIT AND CONTROL SYSTEM FOR AUTOMATIC CONTROL OF FLUID DISPENSERS, ARTICLE DISPENSERS, AND RELATED SYSTEMS

(71) Applicant: Wiz-Tec EMS, Inc., Alberta (CA)

(72) Inventors: Zhi Wang, Calgary (CA); Kevin Christopher Wang, Calgary (CA)

(73) Assignee: Wiz-Tec EMS, Inc., Alberta (CA)

(*) Notice: Subject to any disclaimer, the term of this patent is extended or adjusted under 35 U.S.C. 154(b) by 0 days.

(21) Appl. No.: 16/104,492

(22) Filed: Aug. 17, 2018

(65) Prior Publication Data
US 2019/0056977 A1    Feb. 21, 2019

Related U.S. Application Data

(60) Provisional application No. 62/605,585, filed on Aug. 21, 2017, provisional application No. 62/546,557, filed on Aug. 17, 2017.

(51) Int. Cl.
| | |
|---|---|
| *G06F 9/52* | (2006.01) |
| *G06F 9/54* | (2006.01) |
| *G06F 13/40* | (2006.01) |

(52) U.S. Cl.
CPC ............... *G06F 9/52* (2013.01); *G06F 9/54* (2013.01); *G06F 9/547* (2013.01); *G06F 13/4027* (2013.01); *G06F 2209/542* (2013.01)

(58) Field of Classification Search
None
See application file for complete search history.

(56) References Cited

U.S. PATENT DOCUMENTS

| | | |
|---|---|---|
| 6,360,138 B1 | 3/2002 | Coppola et al. |
| 6,801,835 B2 | 10/2004 | Covington et al. |
| 7,201,315 B2 | 4/2007 | Symonds et al. |
| 7,546,251 B1 | 6/2009 | Leatherman et al. |

(Continued)

FOREIGN PATENT DOCUMENTS

WO    2017/030553 A1    2/2017

OTHER PUBLICATIONS

International Search Report of PCT/IB2018/001134 dated Jan. 15, 2019.
Written Opinion of PCT/IB2018/001134 dated Jan. 15, 2019.

*Primary Examiner* — Henry Tsai
*Assistant Examiner* — Aurangzeb Hassan
(74) *Attorney, Agent, or Firm* — Sughrue Mion, PLLC

(57) ABSTRACT

A system and method for gas pump or carwash environments which allows new applications to be added to established systems, having a computing system, software techniques, and hardware or software communications interfaces. Various embodiments include methods of separation and interception and the software techniques. One implementation includes separating a first application from an equipped device by interposing a bridge; intercepting, with the bridge, downstream communications to the equipped device from the first application; using the bridge, accepting downstream communications to the equipped device from a second application; with the bridge, locking communications with the equipped device to one of the first application and the second application; and unlocking the communications with the equipped device in response to receiving a status from the equipped device.

14 Claims, 49 Drawing Sheets

(56) References Cited

U.S. PATENT DOCUMENTS

| | | |
|---|---|---|
| 7,624,042 B2 | 11/2009 | Negley, III et al. |
| 9,047,596 B2 | 6/2015 | Williams et al. |
| 9,582,792 B2 | 2/2017 | Bonk et al. |
| 2004/0122738 A1 | 6/2004 | Lum |
| 2011/0185090 A1 | 7/2011 | Kushnir |
| 2013/0006776 A1 | 1/2013 | Miller et al. |
| 2013/0232019 A1 | 9/2013 | Frieden et al. |
| 2013/0246171 A1 | 9/2013 | Carapelli |
| 2014/0006188 A1 | 1/2014 | Grigg et al. |
| 2014/0074605 A1 | 3/2014 | Sanchez et al. |
| 2014/0330720 A1 | 11/2014 | Tomlin |
| 2015/0106196 A1 | 4/2015 | Williams et al. |
| 2017/0109722 A1 | 4/2017 | Morris et al. |
| 2017/0171178 A1 | 6/2017 | Reynders |
| 2017/0188180 A1 | 6/2017 | Bretthauer |
| 2017/0352020 A1 | 12/2017 | Jaeger et al. |
| 2018/0117447 A1* | 5/2018 | Tran ..................... G06Q 20/00 |
| 2019/0005477 A1* | 1/2019 | Sanders ............. G06Q 30/0601 |
| 2019/0034668 A1* | 1/2019 | Novoa ................ G06F 13/4068 |

* cited by examiner

BRIDGING CIRCUIT AND CONTROL SYSTEM FOR AUTOMATIC CONTROL OF FLUID DISPENSERS, ARTICLE DISPENSERS, AND RELATED SYSTEMS

CROSS-REFERENCE TO RELATED APPLICATIONS

This application claims the benefit of priority from (1) U.S. Provisional Patent Application No. 62/546,557 filed Aug. 17, 2017 and from (2) U.S. Provisional Patent Application No. 62/605,585 filed Aug. 21, 2017. This application incorporates the entirety of each of the two above-identified disclosures by this reference.

SUMMARY

This summary does not define essential features of the claimed bridging circuit and/or control system or limit the scope of claimed subject matter. This discussion concerns a bridging circuit and/or control system that expands access to equipment that is controlled by an existing application by enabling additional applications to share control of the equipment.

One general aspect includes a bridging circuit, including: a hardware processor, configured to perform a predetermined set of basic operations in response to receiving a corresponding basic instruction, the corresponding basic instruction being one of a plurality of machine codes defining a predetermined native instruction set for the hardware processor; a memory under control of the hardware processor; a first application end interface and a second application end interface defining a plurality of application end interfaces, under control of the hardware processor; one or more upstream communication modules, configured to enable the hardware processor to communicate via the plurality of application end interfaces, and including a first set of the plurality of machine codes; an equipment end interface under control of the hardware processor; a downstream communication module including a second set of the plurality of machine codes, configured to enable the hardware processor to communicate via the equipment end interface; a control module including a third set of the plurality of machine codes, configured to enable the hardware processor to implement a lock state. In the lock state, at least one of the application end interfaces is indicated as an owner, and an instruction is not communicated via the equipment end interface in response to input received via one of the plurality of application end interfaces not indicated as the owner. The bridging circuit also includes the memory storing the first set of the plurality of machine codes, the second set of the plurality of machine codes, and the third set of the plurality of machine codes.

Another general aspect includes a control system, including: a first application communicating with an equipped device; a bridge interposed between the first application and the equipped device; a second application communicating with the equipped device via the bridge; the first application and the second application defining a plurality of applications; the bridge implementing a lock state so that at a time at least one of the plurality of applications is an owner of the equipped device; and the bridge preventing a command communicated from one of the plurality of applications, other than the owner of the equipped device, from communication to the equipped device.

Yet another general aspect includes a bridging method, including: separating (either physically or logically) a first application from an equipped device by interposing a bridge; intercepting, with the bridge, downstream communications to the equipped device from the first application; using the bridge, accepting downstream communications to the equipped device from a second application; with the bridge, designating one of the first application and the second application at a time as an owner; and prohibiting control of the equipped device by other than the owner.

A further general aspect includes an equipment apparatus, including: one or more dispensers disposed at least partially in a housing; a bridge circuit disposed at least partially in the housing. The equipment apparatus also includes a hardware processor, configured to perform a predetermined set of basic operations in response to receiving a corresponding basic instruction, the corresponding basic instruction being one of a plurality of machine codes defining a predetermined native instruction set for the hardware processor. The equipment apparatus also includes a memory under control of the hardware processor. The equipment apparatus also includes an application end interface under control of the hardware processor and adapted to communicate over a network. The equipment apparatus also includes an upstream communication module, configured to enable the hardware processor to communicate via the application end interface, and including a first set of the plurality of machine codes. The equipment apparatus also includes one or more equipment end interfaces under control of the hardware processor and respectively electrically connected with the one or more dispensers. The equipment apparatus also includes a downstream communication module including a second set of the plurality of machine codes, configured to enable the hardware processor to communicate via the one or more equipment interfaces. The equipment apparatus also includes a control module including a third set of the plurality of machine codes, configured to enable the hardware processor to respond to commands received via the application end interface and to issue instructions to the one or more dispensers via the one or more equipment end interfaces. The equipment apparatus also includes the memory storing the first set of the plurality of machine codes, the second set of the plurality of machine codes, and the third set of the plurality of machine codes.

BRIEF DESCRIPTION OF THE DRAWING FIGURES

The drawings constitute part of this specification. They illustrate example implementations of a bridging circuit and control system for the automatic control of fluid dispensers, article dispensers, and related systems.

DETAILED DESCRIPTION

Figure 1:
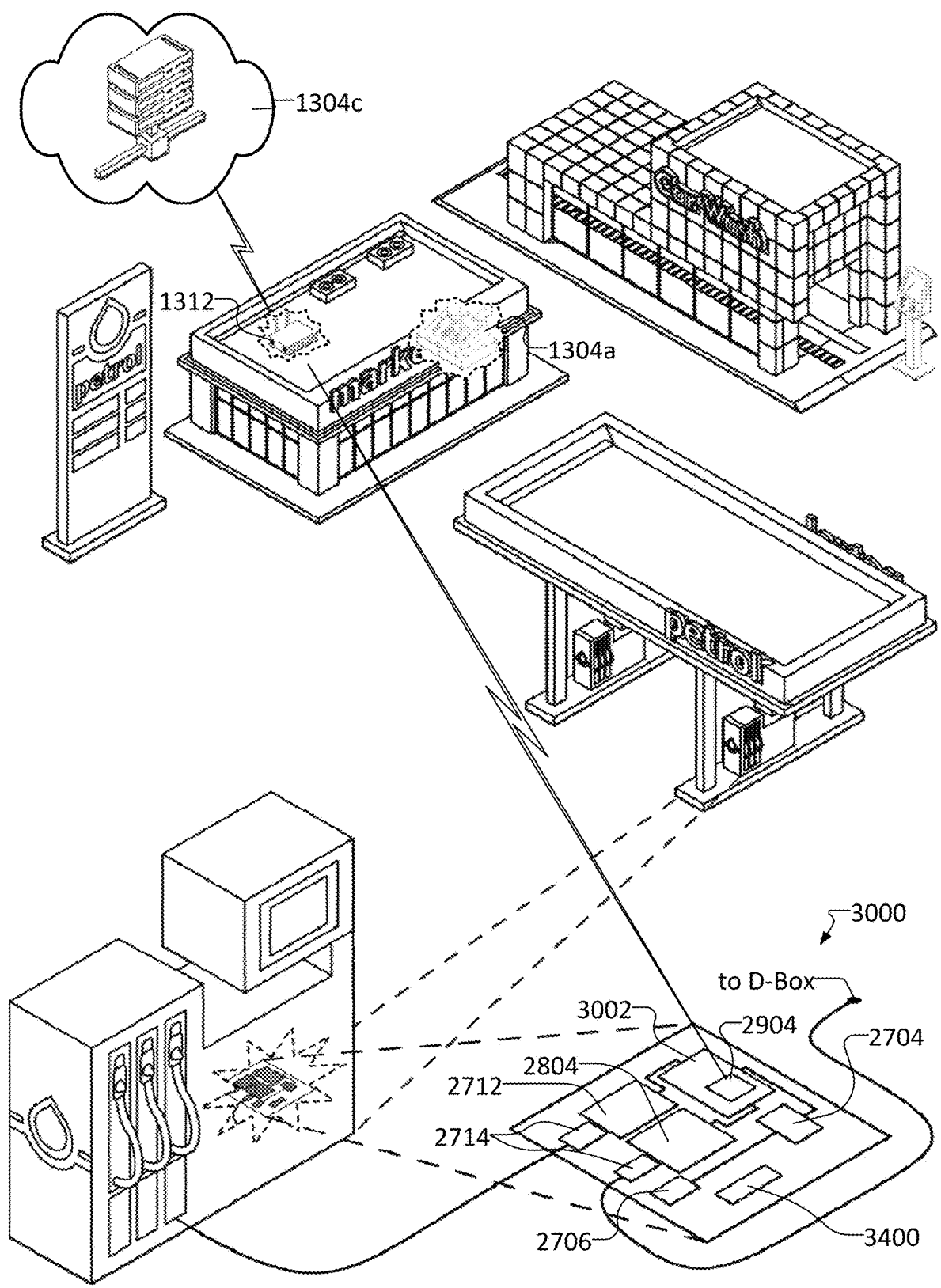
FIG. 1 shows, in highly schematic form, a concrete implementation of a bridging circuit and control system for the automatic control of fluid dispensers, article dispensers, and related systems.

FIG. 1 shows, in schematic form, an environment in which the bridging circuit and control system are implemented. In this drawing, a filling station has an existing control system (see, e.g., FIG. 2). The existing control system includes an application group having multiple complementary applications 1304*a* (graphically represented by a point-of-sale terminal). The existing application group 1304*a* controls each dispenser of each pump through a forecourt controller (not shown). The forecourt controller accepts high-level commands from the application group 1304*a* and passes down lower-level instructions to the dispensers via a distribution box or "D-Box" (not shown). The existing control system, discussed more generally below, is complex and proprietary to the extent that adding a custom or third-party application group within application group 1304*a* is impractical.

The example in FIG. 1, however, illustrates one concrete implementation that enables an additional application or application group 1304c. The additional application group 1304c in this example is a remote application although other types of additional applications are discussed below. The remote application permits a remote operation with respect to a given dispenser.

Bridging circuit 3000 accommodates the application group 1304c without interfering with existing application group 1304a. Bridging circuit 3000, embedded in this case within the pump that houses the dispenser, separates the given dispenser from the D-Box and also from the forecourt controller (this particular circuit is discussed in more detail in the context of FIGS. 29 and 31, below). The embedded bridging device 3000 includes a hardware processor which in this case is a microcontroller 3002 and a receiver/transmitter which in this case is a wireless module 2904. The microcontroller 3002 is configured with bridging software, described in more detail below in the context of FIGS. 35 to 48.

Since the bridging circuit 3000 separates the dispenser from the D-Box, it is positioned to intercept and manipulate communications between the dispenser (as a downstream component) and the D-Box and forecourt controller (as upstream components). The bridging circuit 3000 therefore permits communication to the dispenser also from an alternative upstream path via network device 1312 (shown as a wireless access point or router in the market).

This alternative communication path permits the additional application group 1304c also to control the dispenser. Due to the design of the bridging circuit 3000 and its on-board software configuration, the additional application group 1304c can coexist with application group 1304a and both application groups can interact with the same dispenser.

More generally, this paper discloses a novel electronic system, device, and method for controlling communications between applications and equipment; namely, a system or device that allows the integration of additional applications to existing systems and allowing concurrent control of equipment with minimal disruption. More specifically, this bridging circuit and/or control system adds new applications to existing systems in filling station and carwash environments.

Filling stations, also known as pumping stations, are facilities that sell or dispense fuels, typically for motor vehicles. Most commonly, these fuels are gasoline and diesel, though filling stations can dispense any manner of gas, liquid, or fuel, such as water, natural gases, propane, kerosene, alcohols, biofuel, compressed air, or electricity. These facilities can be public retail locations such as retail gas stations, or have restricted access, such as cardlock stations, refineries, or airport depots. Typical filling stations have one to multiple pumping islands, referred to as "pumps". Each pump physically houses one or, most commonly, two fuel-dispensing units, referred to as "dispensers". Most commonly, dispensers are automated and electronically connected to be part of a larger management system, interfacing to and centrally controlled by devices or software such as Point-of-Sale (POS), Pay at the Pump (P@P), Payment Terminals, inventory control software, fuel delivery software, mobile applications, and such.

Each dispenser, even if physically housed within a single pump, typically operates and communicates independently from one another. Communications for the dispensers are dedicated or shared; dispensers housed within the same pump typically share the same set of communication wires. These wires connect and interface with a communication "concentrator" and "distributor" unit, called a Distribution Box or D-Box; D-Boxes frequently provide optical isolation, standardized wiring points, and signal enhancement. The D-Box connects to a pump controller, also referred to as a forecourt controller, which is responsible for handling communications and interpreting data sent from the applications; commands and protocols between the applications and pump controllers are generally higher level, and are converted into lower level commands or instructions for the dispensers.

Car washes are facilities used to clean the exterior and interior of motor vehicles. Car washes can be self-serve, fully automated, or full-service with attendants who clean the vehicle. Self-serve typically provide tools to the user such as hoses, high-pressure equipment, brushes, dryers, vacuums, soaps, and such. Automatics, sometimes referred to as tunnel washes, use automated washing and drying equipment that may move over and around the vehicle and/or require the vehicle to move through it. These devices are typically electronically connected and controlled by software applications, such as POS, mobile applications, tellers, or by hardware devices like rotary switches. Stand-alone or manual implementations exist as well.

Similarly, car washes use a car wash controller, which handles communications and interprets data sent between the applications and the wash equipment. Typically, car wash applications and controllers are closer and control fewer pieces of equipment such that D-Box equivalents are not typically required. However, some carwashes use wiring panels that distribute communications and commands.

The implementations and realizations of systems and devices in carwash and filling stations differ depending on environments, deployments, and circumstances. For simplicity, the components of car washes and filling stations generally fall into four distinct physical and/or logical parts. In instances where these parts are combined, physically or in software, they are still considered logically separate and referenced as such.

The "application" is an electronic or mechanical system, usually controlled by a computing system, used to control or manage the system. For filling stations, applications are typically centrally controlled electronic applications such as POS, P@P, tellers, inventory control software, fuel delivery software, and mobile applications. For car washes, applications are typically POS, mobile applications, payment terminals, or code entry terminals. An application is not limited to a single device or computing system and can be comprised multiple systems working together in a network, locally, and/or remotely; for example, a POS with external tools such as cameras, tank gauges, and a remote management server could be considered a single application.

Applications that are deployed and/or can function together with minimal conflicts are hereafter referred to as "compatible applications". These applications are typically specifically designed or configured to work with one another, with rules and software for combining and handling communications from multiple compatible applications. A group of compatible applications is hereafter referred as an "application group"; application groups can have a single application or an entire suite of compatible applications.

"Equipment" (also referred to as an equipped device or as equipped devices in the plural) refers to tools, items, devices, or systems that are controlled, activated, or managed by the application. The individual tools, items, devices, or systems are referred to as a piece of equipment. Pieces of equipment that share the same set of communications wires are still considered separate pieces of equipment. In filling stations, the equipment typically includes the individual dispensers. In car washes, equipment may include, but are not limited to, high-pressure equipment, brushes, dryers, vacuums, dispensers, automated washing and drying machines. Equipment can range from very simple, requiring only on and off signals, to highly complex, requiring its own computing system and programming logic.

The "controller" is the hardware and/or software device that manages, interprets, and translates signals and data traveling to and from the application, and often acts as a standard interface or connection point. The pump controllers and car wash controllers are both controllers. Communications, information, and data sent from the applications toward equipment are referred to as "commands" or "requests". Returned information, data, or communications from the equipment are referred to as "responses"; data or information sent from the equipment to applications without a command first are referred to as "events".

The Distribution Box or "D-Box" is a device that acts as a communications and interface concentrator for data traveling from the equipment and a distribution unit for signals traveling toward the equipment. In filling stations, D-Boxes often provide signal enhancement, standardized wiring points for equipment, and optical isolation for wiring. Wiring panels that distribute communications in car washes are considered D-Boxes. Virtual devices and software that split communications from a single source to multiple pieces of equipment are considered D-Boxes as well. D-Boxes are optional components and are typically only required when there are multiple pieces of equipment being controlled.

A "bridge" or "bridging" refers to a special-purpose circuit adapted to control and manage communications between applications and equipment, to a hardware processor configured with selected machine codes from a native instruction set and adapted to control and manage communications between applications and equipment, or to a method whereby control and management of communications between applications and equipment is effected.

Communications between the applications and controllers are generally higher level and use controller protocols (referred to herein as communicating in accordance with a communication protocol or generating outputs in accordance with a communication protocol). Communications between the controller, D-Box, and equipment are typically lower level and use equipment protocols (also referred to herein as communicating in accordance with a device communication protocol). These protocols are most often proprietary and vary between equipment and controller vendors.

These terms are set out for clarity and illustrative purposes and are not intended to be restrictive; systems or devices coming within the meaning or equivalency range of the definitions are intended to be included as such. It will be apparent that components defined can be arbitrarily combined or divided into separate software, firmware, and/or hardware components. Further, it will be apparent that the bridging circuit and/or control system does not rely on the clear identification of these parts and can function regardless of how they are combined or divided, or with any additional or omitted components.

The technical difficulties in adding applications to filling stations and car washes are now discussed.

Filling stations and car washes are highly complex systems, with many interdependent and expensive devices working closely together. Existing systems, infrastructure, devices, and applications are explicitly designed to work with one another, and are incompatible with other products and applications, especially those with new features, technologies, or implementations. Adding new systems, products, and applications typically requires replacement or upgrades to parts or the entirety of the existing system. This is often impractical and not desirable for sufficiently complex or expensive environments such as filling stations and car washes. The lack of a minimally disruptive method for adding new systems, equipment, and applications has greatly hindered acceptance and use of new technologies and products, and has encouraged the use of legacy systems and infrastructure.

Development of new products is also hindered by these legacy technologies and vendor differences. There is limited standardization between systems from different vendors; protocols and communication interfaces are frequently proprietary, strictly maintained for compatibility across legacy devices, and highly restrictive. Applications are typically limited to working with only a single vendor's systems or a select few third parties. Further, development of new applications and products typically prioritizes backward compatibility wherever possible, to minimize replacement needed to implement it. This has heavily discouraged the development and use of new technologies in fueling and car wash industries; there is simply too much variation in the industry for which to account and to design. The main causes of incompatibility between applications are differences in protocol, commands, features, rules and methods of control, and differences in the interpretation and management of information.

It is desirable to create a method by which new incompatible applications can be integrated into existing systems without requiring replacement or affecting the operational abilities of the original system. Further, it is desirable to create a method where new applications are not restricted by vendor differences and legacy systems.

U.S. Pat. No. 6,360,138 B1, issued Mar. 19, 2002, discusses how to integrate a new generation fuel dispenser with a legacy POS system using basic protocol translation in a forecourt controller.

U.S. Pat. No. 9,047,596 B2, issued Jun. 2, 2015 introduces a system and method for a plurality of POS applications to control equipment through a set of business rules; it introduces rules for issuing, terminating, and transferring control between multiple POSs. However, this control system requires all controlled applications to be aware and compatible with one another and/or coordinate and obey the rules set for issuing, terminating, and transferring control.

Bridging through a software or electronic system that controls and manages communications between application groups and equipment is in various implementations realized with a software or electronic system, with a method of separation and interception, and/or with logical techniques.

One aspect of the bridging circuit and/or control system is the separation and interception of communications for each application group. This is realized through the alteration of the original system and insertion of the bridge where communications can be physically or virtually separated. There are four primary locations where separation and interception can occur.

At the "equipment level", the interception occurs between the equipment and the D-Box. If there is no D-Box present, this is interception which occurs between the equipment and the controller.

At the "D-Box level", the interception occurs between the D-Box and the Controller.

At the "controller level", the interception occurs between Controller and the application and the controller and applications are separated and intercepted using physical methods At the "software level", where the interception occurs between the Controller and the application and the controller and applications are separated and intercepted using software methods After separation, the system has just one "equipment end". The equipment end includes the components between the bridge and the equipment. After separation, the system has one or more (typically a plurality of) "application ends". The application ends include the components between the bridge and each application group. Each application end includes an application group and can contain controllers and D-Boxes as well. Each application end is typically separated and intercepted at the same location, though a mix of separation and interception locations is possible as well. The location of separation and interception affects the selection of protocols to use, and affects how the communications are interfaced. The location of separation and interception does not change the fundamental logic or software techniques.

The separation and interception of communications is not limited to these locations; they are presented for illustrative purposes and represent interception points for frequently-occurring layouts. Uncommon systems, layouts, protocols, and communications may exist or be developed where these locations cannot be easily identified or accessed, and cases may exist where components and communications are arbitrarily combined, divided, rerouted, converted, or otherwise obfuscated. This bridging circuit and/or control system can be realized at any location where communications can be physically, logically, or virtually separated and intercepted.

Another aspect of the bridging circuit and/or control system is the computing device and interface modules used to connect to the separated communications interfaces. These interface modules can be separate, combined, software, or part of the bridging circuit and/or control system, physically or virtually. Further, the interface modules can be physical or virtual devices.

In an implementation, the computing system runs multiple concurrent processes with a shared set of memory data. The first process, known as the "Tx controller", controls communications to and from the equipment end. The Tx controller may be referred to also as a downstream communication module. An additional process is run for each additional application group, known as the "Rx emulator", which controls communications traveling to and from each application end. Rx emulators may be referred to also as upstream communication modules.

Another aspect of the bridging circuit and/or control system are the logical techniques, residing on the computing system, used to control the flow of information between the equipment and application groups such that there is little conflict and the operational abilities of each application and the equipment are minimally affected. The logical techniques include interception, packet switching, locking/unlocking, caching, blocking, emulation, pass-through, and translation. In interception, communications between the application end and equipment end are intercepted, inspected and captured. Packet switching handles communications from multiple sources through a single channel. With locking and unlocking, control of a piece of equipment is assigned to a single or several application groups. Caching in various implementations provides performance improvements in that the bridge circuit and/or control system collects and caches frequently-requested data from the equipment. With blocking, intercepted commands are prevented from passing to the equipment. In emulation, emulated responses to commands are made in real time. In some implementations, the emulated responses contain true data, while in other implementations the data is altered or not based on current equipment information at all. With pass-through, certain commands are passed through the bridge and a true response from the equipment is permitted to be returned. Translation is used to accommodate differences between the application ends and the equipment end protocols or commands, and to address minor revisions or differences within the same protocol.

These techniques are described below, and are adaptable to the requirements and conditions of virtually any existing system, equipment, and application groups. These logical techniques do not rely on, nor are they restricted by, any one protocol or set of commands, regardless of how they may be arbitrarily combined, separated, or otherwise implemented, nor does it require all commands within a protocol to be known or used.

Aspects of this bridging circuit and/or control system are realized through use of computing systems, which at least includes memory, a processing system with one or more hardware processors, and interfaces used to communicate with external devices; this includes general purpose computer systems, embedded systems, or combinations of the two. The computing system is typically a single device, though processors and memory from different devices working together can act as a computing system as well.

The hardware processor has a small amount of memory including registers, buffers, and cache which are used by the processor to store information for short periods of time. Such information may include instructions or data.

In more detail, a hardware processor is a type of integrated circuit that contains a vast number of transistors and other electrical components interconnected so as to function as an array of logic gates in a pattern that yields predictable outputs in response to a vector of predefined machine code inputs. The hardware processor is configured to perform a predefined set of basic operations corresponding to the predetermined machine code inputs. The set of predefined machine codes is finite and well-defined for each hardware processor, as are the corresponding basic operations. Each of the basic operations has a corresponding basic instruction which is one of the plurality of machine codes defining a predetermined native instruction set for the hardware processor. The set of predefined machine codes that may validly be provided as input to a given hardware processor defines the native instruction set of the hardware processor. To put it another way, each of the basic operations has a corresponding basic instruction that is one of the plurality of machine codes defining a predetermined native instruction set for the hardware processor.

The machine codes of the native instruction set of a hardware processor are input to the hardware processor in binary form. In binary form, the machine codes constitute particular logical inputs that enter the pattern of logic gates that is hard-wired into (i.e., manufactured as) the hardware processor, resulting in a predictable output that depends on the particular machine code used.

Modern software is typically authored in a form other than binary and then converted through various processes such as compilation or interpretation into binary form. The machine codes are input into a given hardware processor in binary form.

Modern software is complex, performing numerous functions and amounting to a vast amount of lines of source code.

Each line of source code represents one or more (typically many more) individual instructions selected from the native instruction set of a hardware processor. Hardware processors have registers, buffers, cache, and the like which can store binary information. The amount of such storage is much smaller than the set of machine codes that implement a given software program or process.

The set of machine codes are therefore stored in a memory that the hardware processor can access. In other words, the memory is under control of the hardware processor. The hardware processor, when executing a particular set of machine codes selected from the native instruction set, loads the machine codes from the memory, executes the machine codes, and then loads other machine codes from the memory.

The term software or logical techniques, used herein, refers generally to this executable machine code.

A process is the sequential execution of programmed instructions on the processing system. Computer systems can run one or multiple processes, and multiple processes may be executed concurrently in multitasking operating environments. Two forms of multitasking include operating system multitasking, which is controlled by the computing system, and self-implemented or "pseudo" multitasking, which is implemented by the application or software itself. In one implementation, a single process is used. In other implementations, multiple processes under multitasking operating environments are used.

The term memory, cache, database, and storage, are used broadly to include any known or convenient means for storing data, whether centralized or distributed, local, remote, cloud based, or otherwise.

Computing systems usually communicate with one another using sets of predefined rules, called protocols. Protocols usually have sets of commands and data with specifically structured formats and methods for transmitting or receiving through packets. Packets are collections of data which are used by most computing systems for communications. Serial communications typically transmit packets as a sequence of bits and bytes individually, while network communications like TCP/IP transmit by packet.

Communications is the information exchange which enables separate machines, devices, or software to communicate with one another. Communications most commonly used in filling stations and carwashes are serial (RS232, USB, RS485/RS422, current loop) and network (TCP/IP over Ethernet, Wi-Fi). Serial communications fall into two categories, dedicated, such as RS232 and USB, where each device has its own dedicated line, and shared, such as a current loop circuit, Modbus, an RS485 module, an RS422 module, where devices share a communications channel. In some network communications protocols, such as TCP/IP, communications from a single channel can be separated into multiple virtual connections and channels.

Aspects of this bridging circuit and/or control system are realized through the separation and interception of these communications. The communications used are based on the operating environment and the requirements of the application and equipment. The bridging circuit and/or control system does not dictate or require any specific communications method or technology and can function as long as communications can be separated and intercepted. Hardware and/or software required to interface with these communications are commonly used, custom built, or virtually programmed.

Statuses/commands: Equipment for both carwashes and filling stations use statuses to describe the state and current operations of the equipment. In simple devices, these states are typically "idle", "busy", and "offline". More complex systems require more states. Filling stations frequently use "Idle", "Handle lifted", "Busy", "Sale", "Stop", and "Offline" states. The most frequent command sent between applications and equipment is the retrieval of these states. Common commands which affect these states in filling environments include "authorize" or "start", "unauthorize", "clear sale", and "end sale" commands. Common commands in carwash are "start", and "stop" or "end" commands.

Aspects of this bridging circuit and/or control system rely on the capturing, storage, and/or interpretation of these states and commands.

Figure 2:
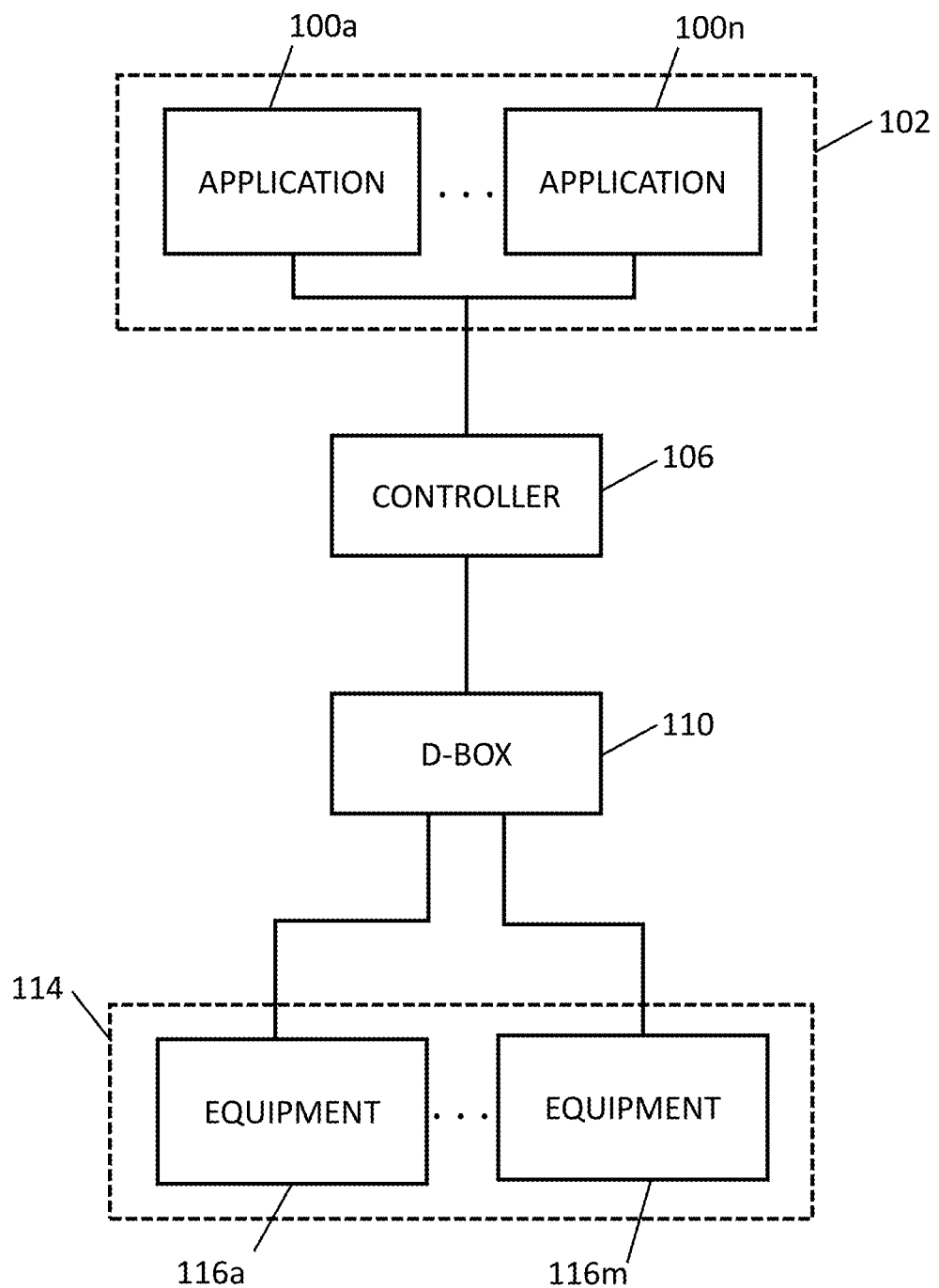
FIG. 2 illustrates a simplified example of a typical environment in which the bridging circuit and/or control system are employed.

FIG. 2 through FIG. 8 illustrate simplified examples of a filling station or car wash environments in which embodiments can be implemented. FIG. 2 depicts a typical environment where all systems are physically separated, comprising of an application group 102, a controller 106, a D-Box 110, and equipment 114. The application group 102 is comprised of one or more compatible applications 100a . . . 100n; these applications are typically on site with the rest of the equipment, but can be remotely located. The equipment 114 includes a plurality of pieces of equipment 116a . . . 116m. In filling station environments, these pieces of equipment 116a . . . 116m would be dispensers. In car washes, they could be automated wash equipment, or a mix of various wash tools.

Communications between the application group 102 and the controller 106 are on a single combined communications channel, as controllers typically only allow for one channel of communications from the application group 102 and do not provide concurrent application capabilities; the combination of communications from compatible applications are typically implemented by the applications themselves.

Communications between applications and the controller typically use dedicated serial (RS232, USB) or network (TCP/IP) methods, and are formatted with controller protocols. Communications between the controller 106, D-Box 110, and equipment 114 typically use shared serial methods (2 or 3 wire current loop, RS485/RS422), and are formatted with equipment protocols. In some environments, such as car washes, parallel communications interfaces can be used. When network communications are used, they typically travel through a network device (not shown) such as a network switch or router.

The communication channel for each piece of equipment 116 are depicted separately for illustration purposes. Pieces of equipment 116 with shared serial methods can share communications channels; these channels can be arbitrarily routed, combined, or separated between pieces of equipment 116.

These communication methods are described for illustrative purposes and are not intended to be restrictive of environments the bridging circuit and/or control system can operate in. While the communications interface used is typically based on the operating environment and requirements of the system, any manner of communications interface can be used between each component. New technologies, applications, and innovations in communications technologies may introduce new methods and layouts for communications.

Figure 3:
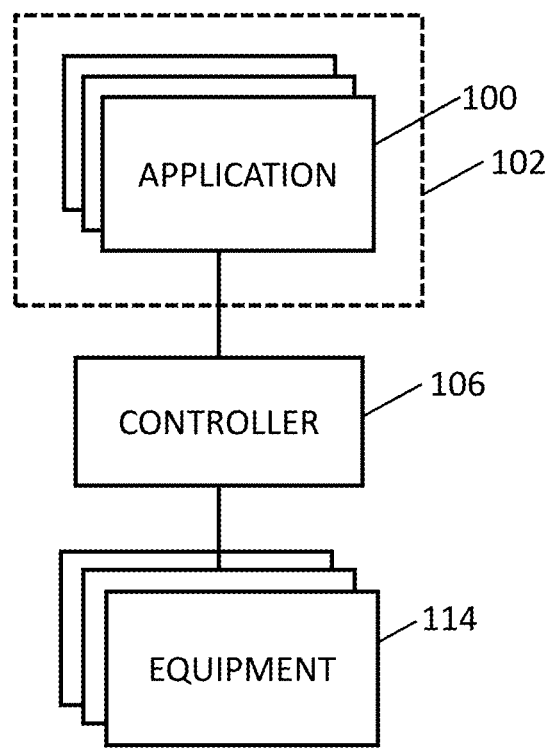
FIG. 3 illustrates a simplified example of a typical environment in which the bridging circuit and/or control system are employed.
Figure 4:
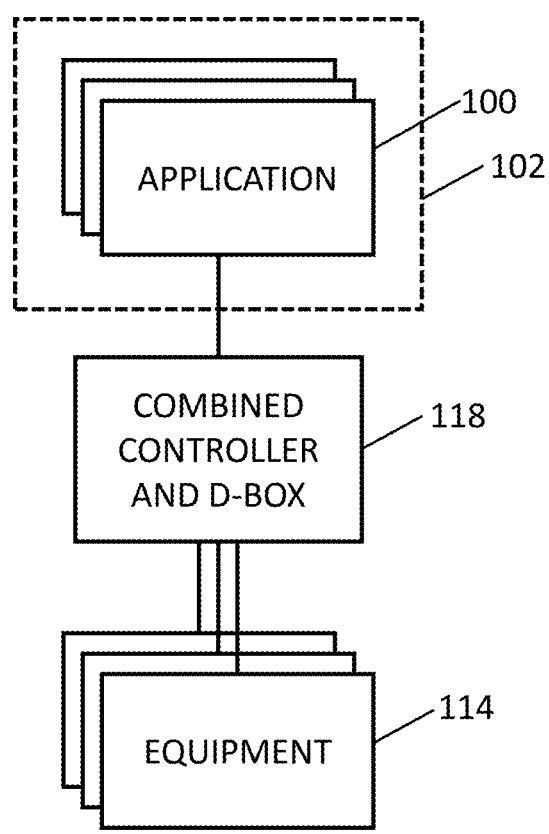
FIG. 4 illustrates a simplified example of a typical environment in which the bridging circuit and/or control system are employed.
Figure 5:
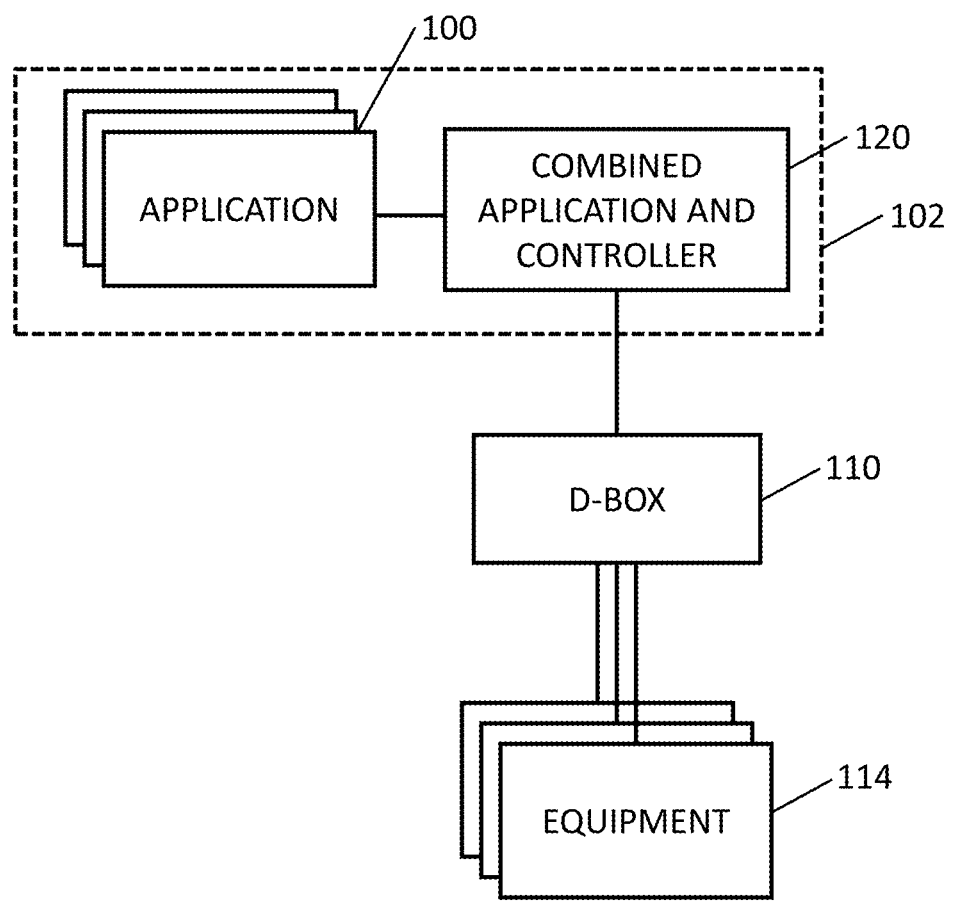
FIG. 5 illustrates a simplified example of a typical environment in which the bridging circuit and/or control system are employed.
Figure 6:
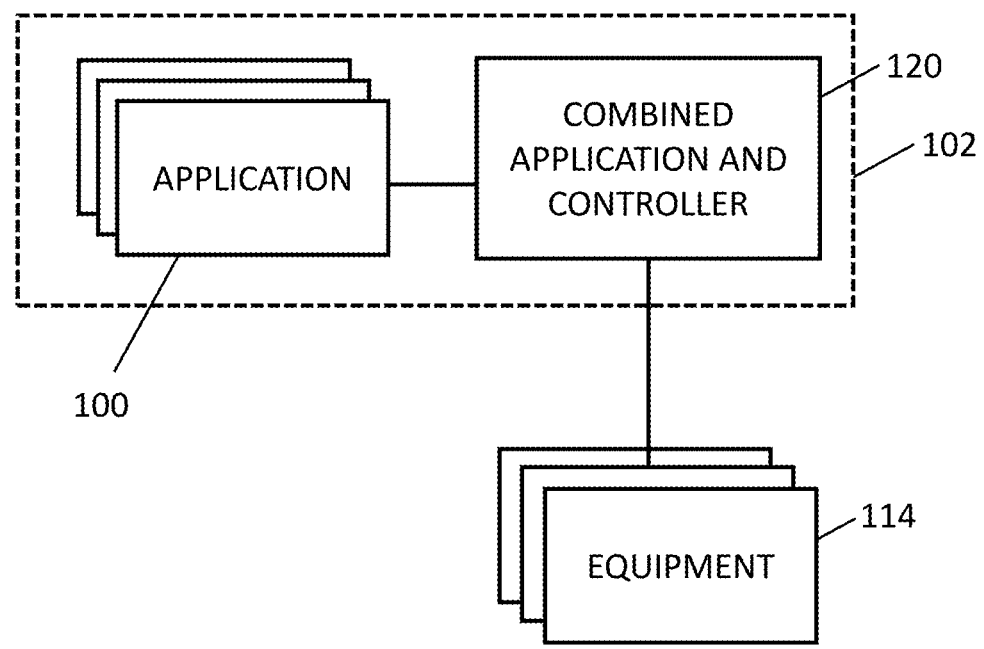
FIG. 6 illustrates a simplified example of a typical environment in which the bridging circuit and/or control system are employed.
Figure 7:
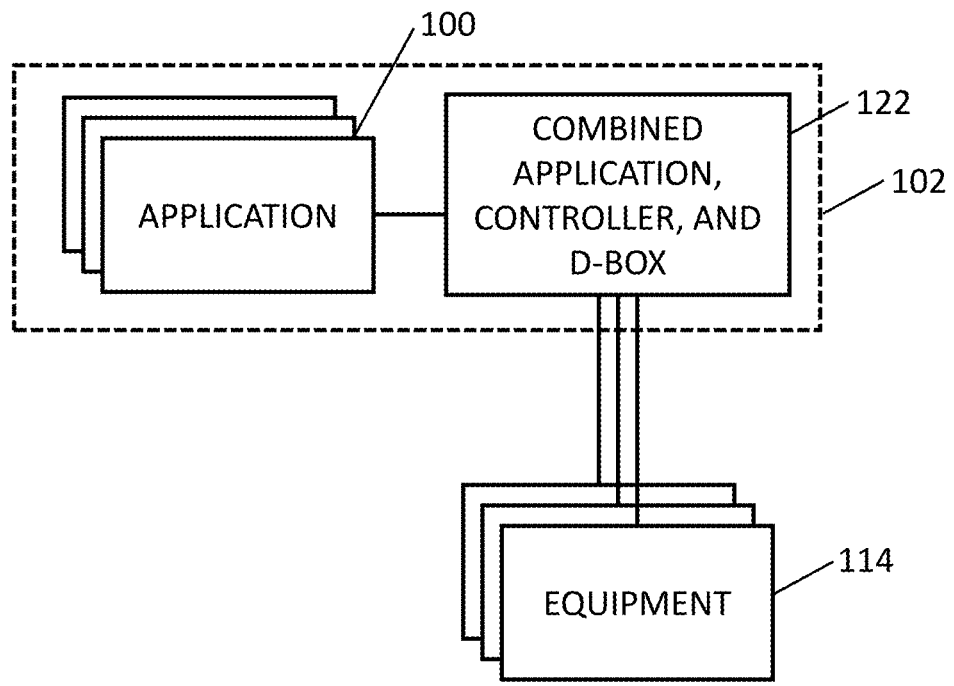
FIG. 7 illustrates a simplified example of a typical environment in which the bridging circuit and/or control system are employed.
Figure 8:
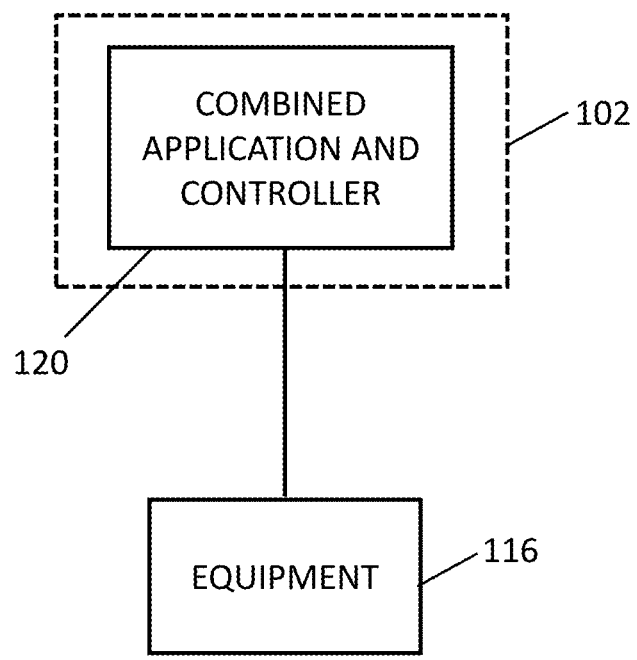
FIG. 8 illustrates a simplified example of a typical environment in which the bridging circuit and/or control system are employed.

FIG. 3-8 illustrate several examples of alternate filling station or car wash environments where the bridging circuit and/or control system can be implemented. FIG. 3 illustrates an environment where there is no D-Box 110. In this case, all pieces of equipment share the same communications channel. FIG. 4 illustrates an environment where the controller and D-Box are physically and/or logically combined 118. FIG. 5 illustrates an environment where an application and a controller are combined 120, and all other applications send commands through the combined unit 120. The combined unit, for example, could be a controller with an interface panel, or an application which can translate and output in equipment protocol format. FIG. 6 shows an environment with a combined application and controller 120 and with no D-Box 110. FIG. 7 shows an environment with a combined application, controller, and D-Box 122; for example, this could be a payment teller with a wiring panel which can activate multiple dispensers. FIG. 8 shows an environment where a single combined application and controller 120 communicates with a single piece of equipment 116.

These diagrams are depicted for illustrative purposes and are not intended to be an exhaustive list of possible configurations. Other systems may have components arbitrarily combined or separated, or any manner of additional systems which may reside outside or within the defined components. The bridging circuit and/or control system is not limited or restricted by the depictions, regardless of the layout, addition, or omission of components and systems.

Figure 9:
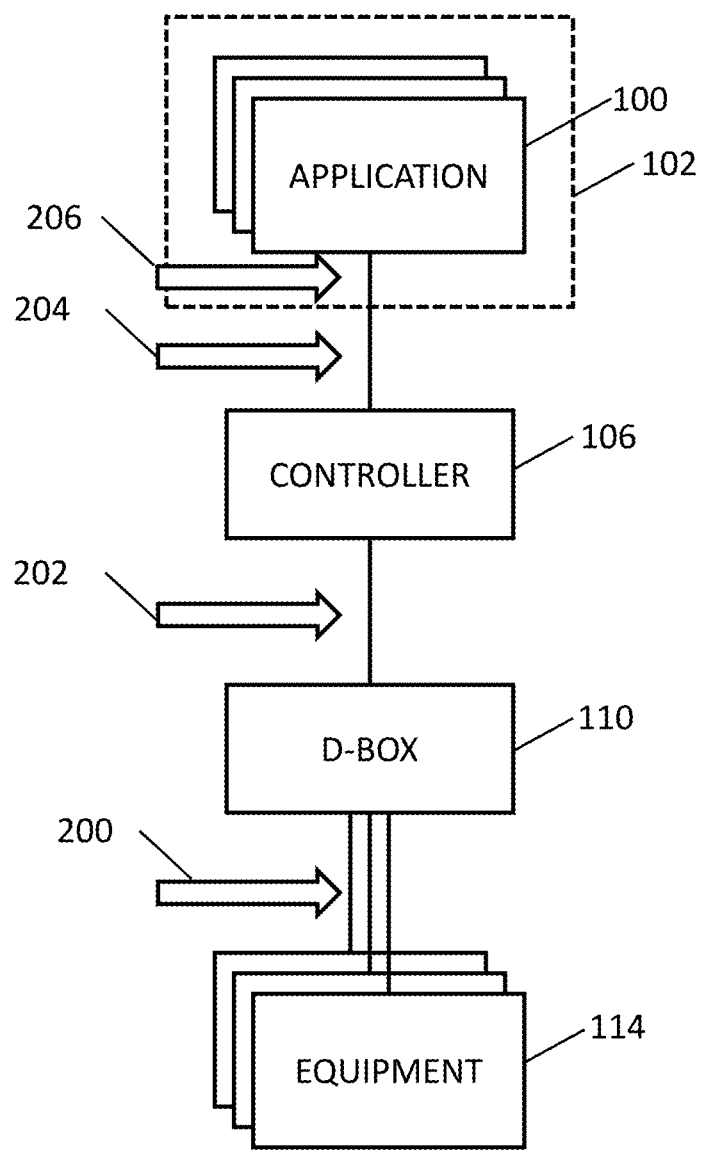
FIG. 9 depicts applicable locations for separation and interception.
Figure 10:
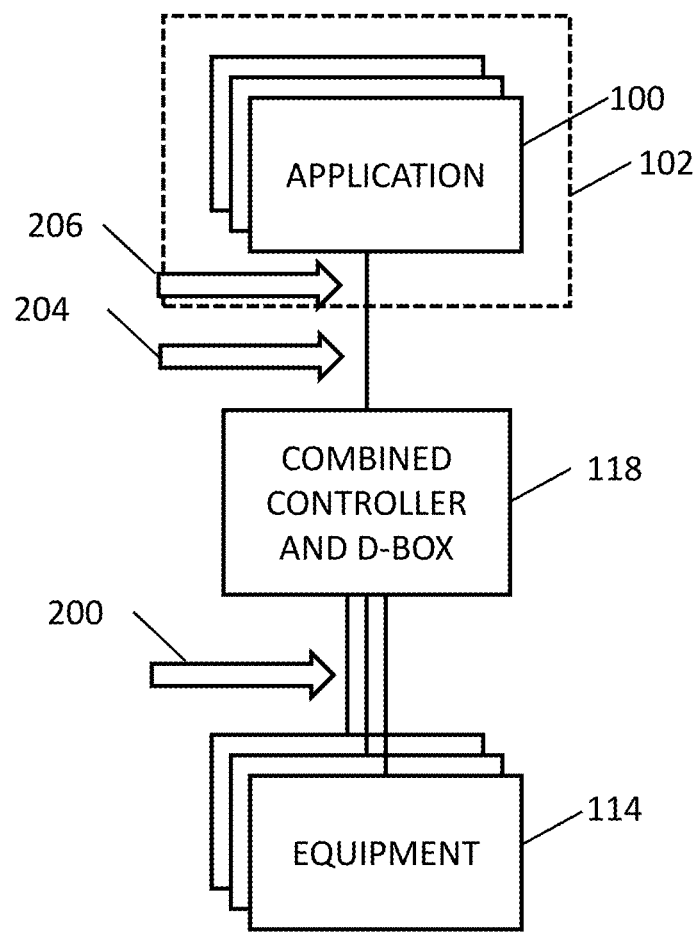
FIG. 10 depicts applicable locations for separation and interception.

Aspects of this bridging circuit and/or control system rely on the separation and interception of communications. Separation refers to a physical or virtual state such that communication between the application groups and the equipment is prevented except as provided for by the bridging circuit and/or control system. Interception refers to the connection and collection of these communications. FIG. 9 and FIG. 10 depict embodiments of separation and interception locations.

FIG. 9 depicts applicable locations for separation and interception based on the environment shown in FIG. 2. Separation and interception between the D-Box 110 and the equipment 114 is referred to as "equipment level bridging" 200; this requires each communications channel, shared or dedicated, be separated and intercepted. Separation and interception between the controller 106 and D-Box 110 is referred to as D-Box level bridging 202. Physical separation and interception between the application groups 102 and the controller 106 is referred to as "controller level bridging" 204; this is typically used when the controller 106 and application groups 102 are physically separate devices. Separation and virtual interception between the application groups 102 and the controller 106 is referred to as "software level bridging" 206; this is typically used when the controller and application are physically combined, reside on the same computing system, or are on networked computing systems.

Some separation and interception locations may be impractical or impossible when components are physically combined or omitted. For example, if there is no D-Box 110, D-Box level bridging 202 would not be possible. FIG. 10 depicts potential locations for separation and interception on a system where the D-Box 110 and controller 106 are physically combined 118 as depicted FIG. 4. In this environment, D-Box level bridging 202 may not be practical or possible.

The location where separation and interception occurs is dependent on the hardware, infrastructure, software, and restrictions of the existing system and any requirements from the application groups. The locations identified are for illustrative purposes and are not intended to restrict locations where separation and interception can occur. Unusual set-ups, systems, or technologies may exist or be created such that these locations cannot be easily identified or modified; it will be apparent that this bridging circuit and/or control system is not reliant on any one setup, layout, or set of defined locations regardless of how they are arbitrarily combined, omitted, or otherwise implemented. This bridging circuit and/or control system can be inserted anywhere as long as communications between the application groups 102 and equipment 114 can be separated and intercepted by any means, physical, virtual, software based, or otherwise.

The bridging circuit and/or control system uses protocols appropriate for its location of insertion and the systems it interfaces with. For instance, equipment level bridging 200 and D-Box level bridging 202 use equipment protocols, while controller level bridging 204 and software level bridging 206 use controller protocols.

Figure 11:
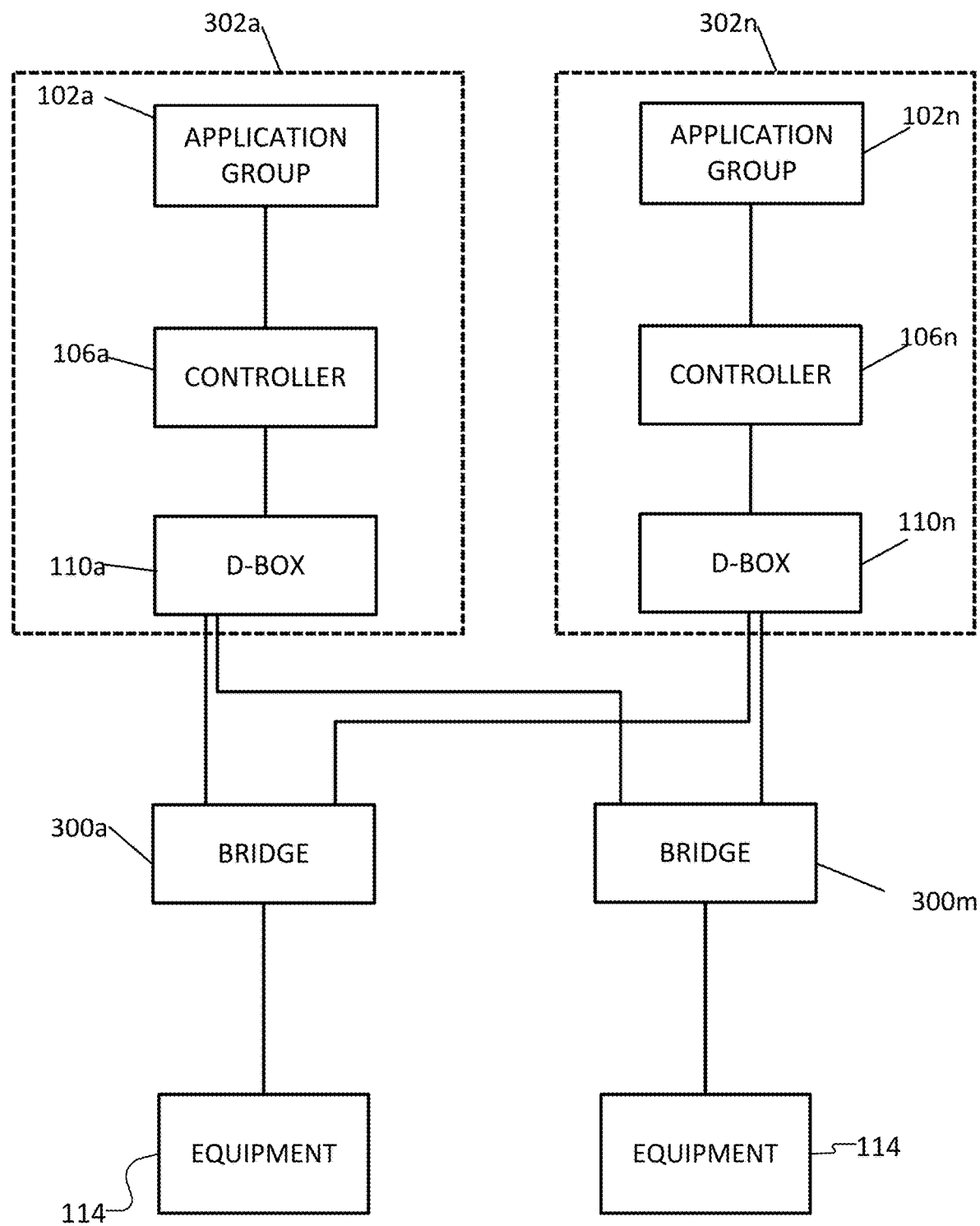
FIG. 11 depicts an embodiment where separation and interception for a plurality of application groups is at the equipment level.

FIG. 11 depicts an embodiment where separation and interception for a plurality of application groups is at the equipment level 200. The application end 302a . . . 302n represents a plurality of application ends, including application groups 102a . . . 102n, controllers 106a . . . 106n, and a D-Boxes 110a . . . 110n, which may or may not be the same between application ends 302a . . . 302n. In this embodiment, the bridging device 300a . . . 300m is required for each communications channel to the equipment 114, as the bridging device in this embodiment only has a single equipment end communications interface. For instance, four pieces of equipment with two communications channels would require two bridges, and four pieces of equipment with four communications channels would require four bridges. Alternate embodiments of the bridging device may have multiple equipment end interfaces such that one bridging device 300 would be sufficient for all pieces of equipment.

Figure 12:
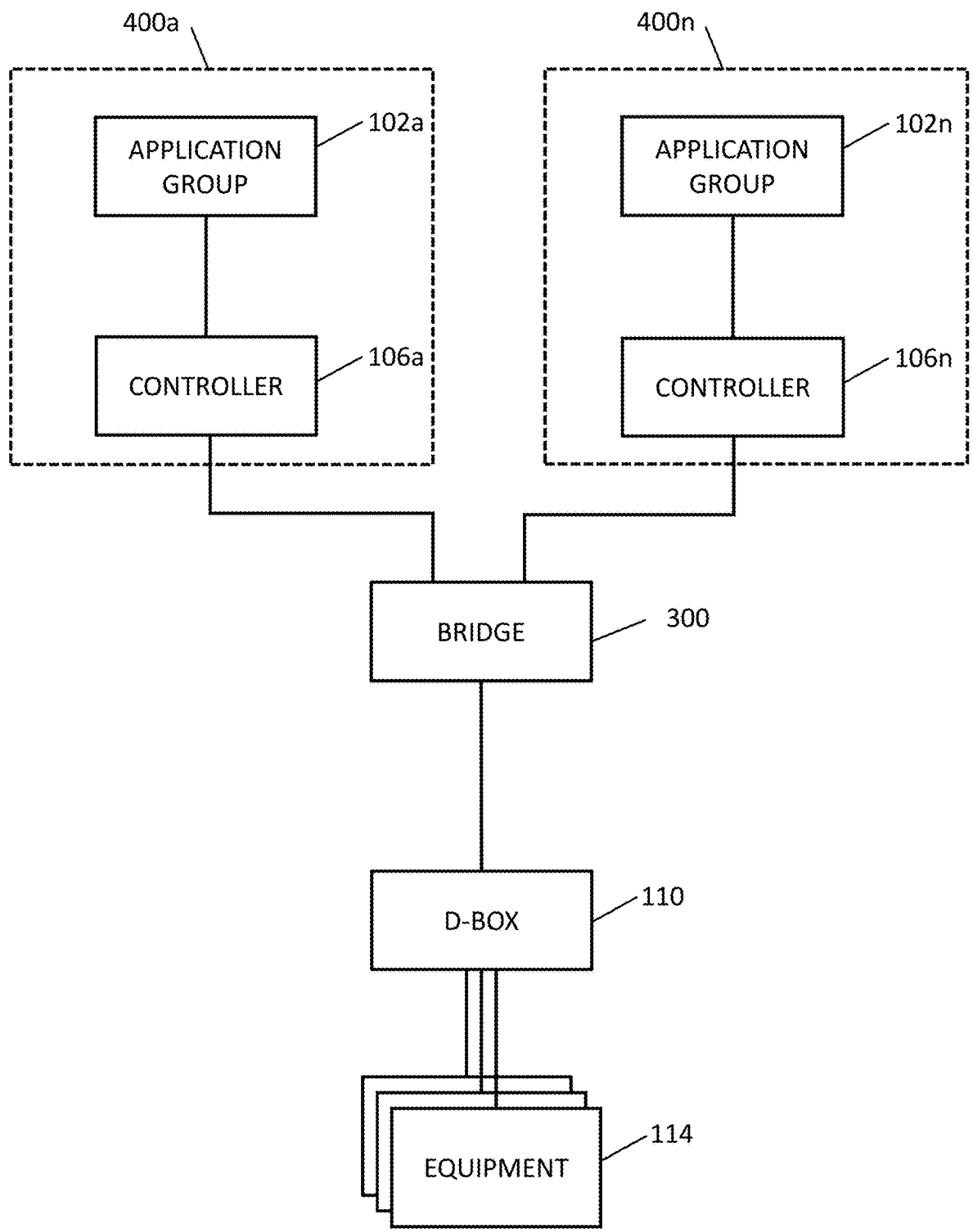
FIG. 12 depicts an embodiment where separation and interception for a plurality of application groups occurs at the D-Box level.

FIG. 12 depicts an embodiment where separation and interception for a plurality of application groups occurs at the D-Box level 202; in this case, only a single bridge 300 is required. In this embodiment, the application ends 400a . . . 400n have only an application group 102a . . . 102n and a controller 106a . . . 106n.

Figure 13:
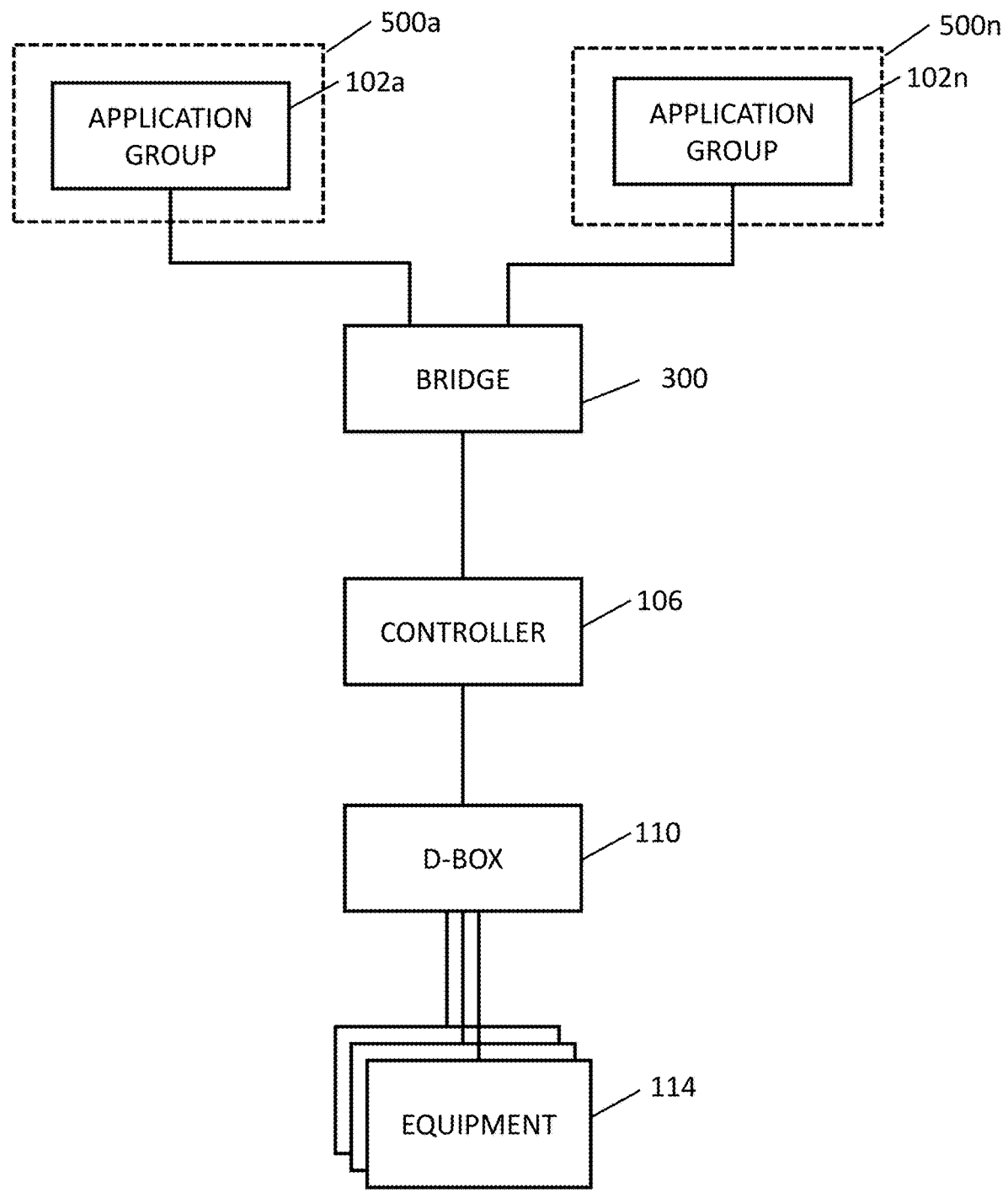
FIG. 13 depicts an embodiment where separation and interception for a plurality of application groups occur at the controller level.

FIG. 13 depicts an embodiment where separation and interception for a plurality of application groups occur at the controller level 204; similarly, only a single bridge 300 is required. In this embodiment, the application ends 500a . . . 500n have only an application group 102a . . . 102n.

Figure 14:
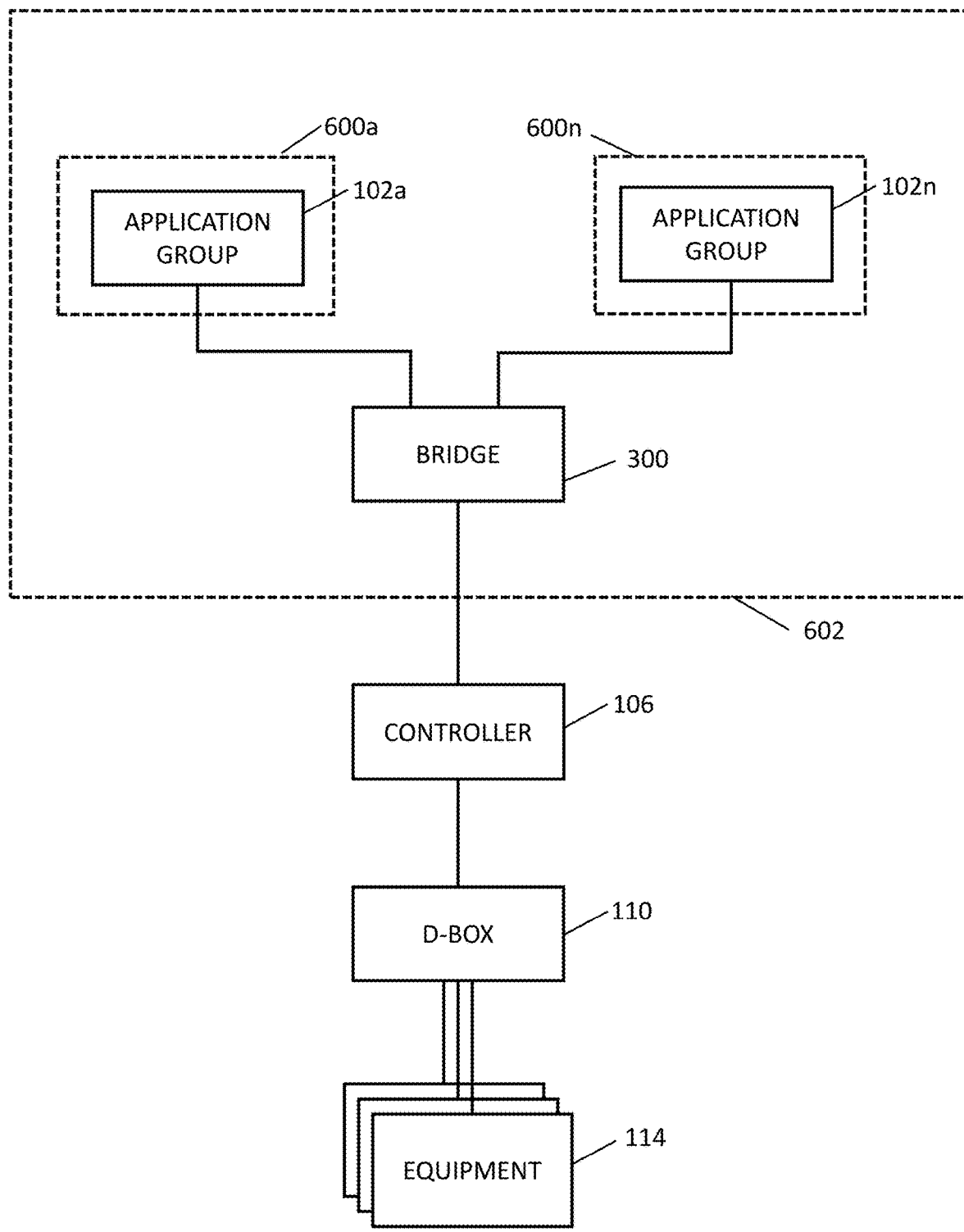
FIG. 14 depicts an embodiment where separation and interception for a plurality of application groups occurs at the software level.

FIG. 14 depicts an embodiment where separation and interception for a plurality of application groups occurs at the software level 206. In this embodiment, the application ends 600a . . . 600n have only an application group 102a . . . 102n, and all application ends 600a . . . 600n and the bridge 300 all exist on a single computing system 602 (i.e., they are all running on the same computer system). Alternate embodiments may exist where the bridge is on a separate but networked computing system. Another alternate embodiment may have the controller 106 within the computing system 602 as well.

While the application ends and components within are depicted with the same number, they do not have to be the same. The bridge uses protocols appropriate for its location of insertion and the systems with which it interfaces. Further, separation and interception of the plurality of application groups are not restricted to only a single location, any mix or combination of separation and interception levels is possible.

Figure 15:
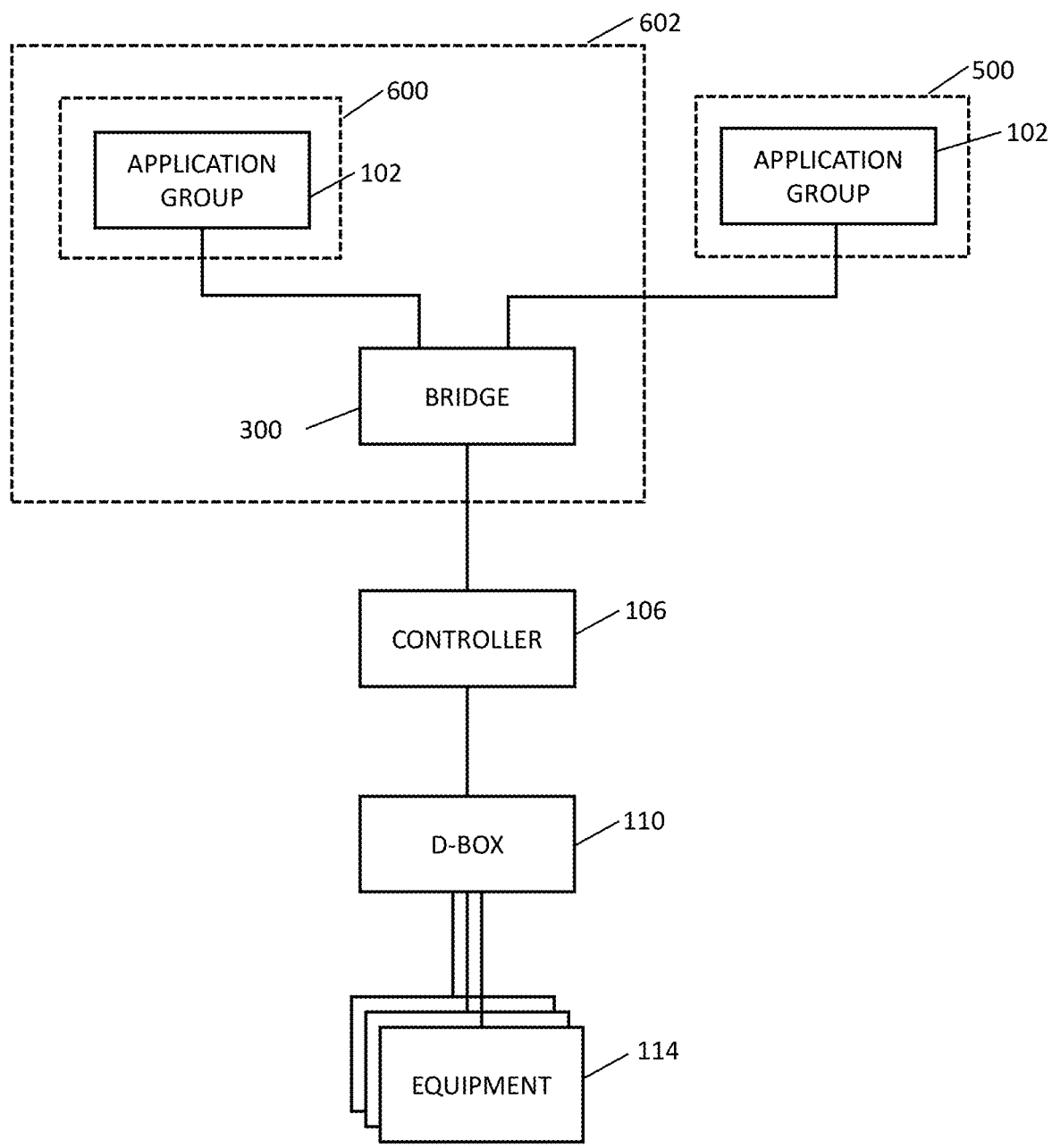
FIG. 15 depicts an embodiment where separation and interception is at both the software and controller level.

FIG. 15 depicts an embodiment where separation and interception of the first application end 600 is software level 206 and separation and interception of the second application end 500 is at the controller level 204. In this embodiment, the second application end 500 is not on the same computing system 602 as the first application end 600 and bridge 300.

Figure 16:
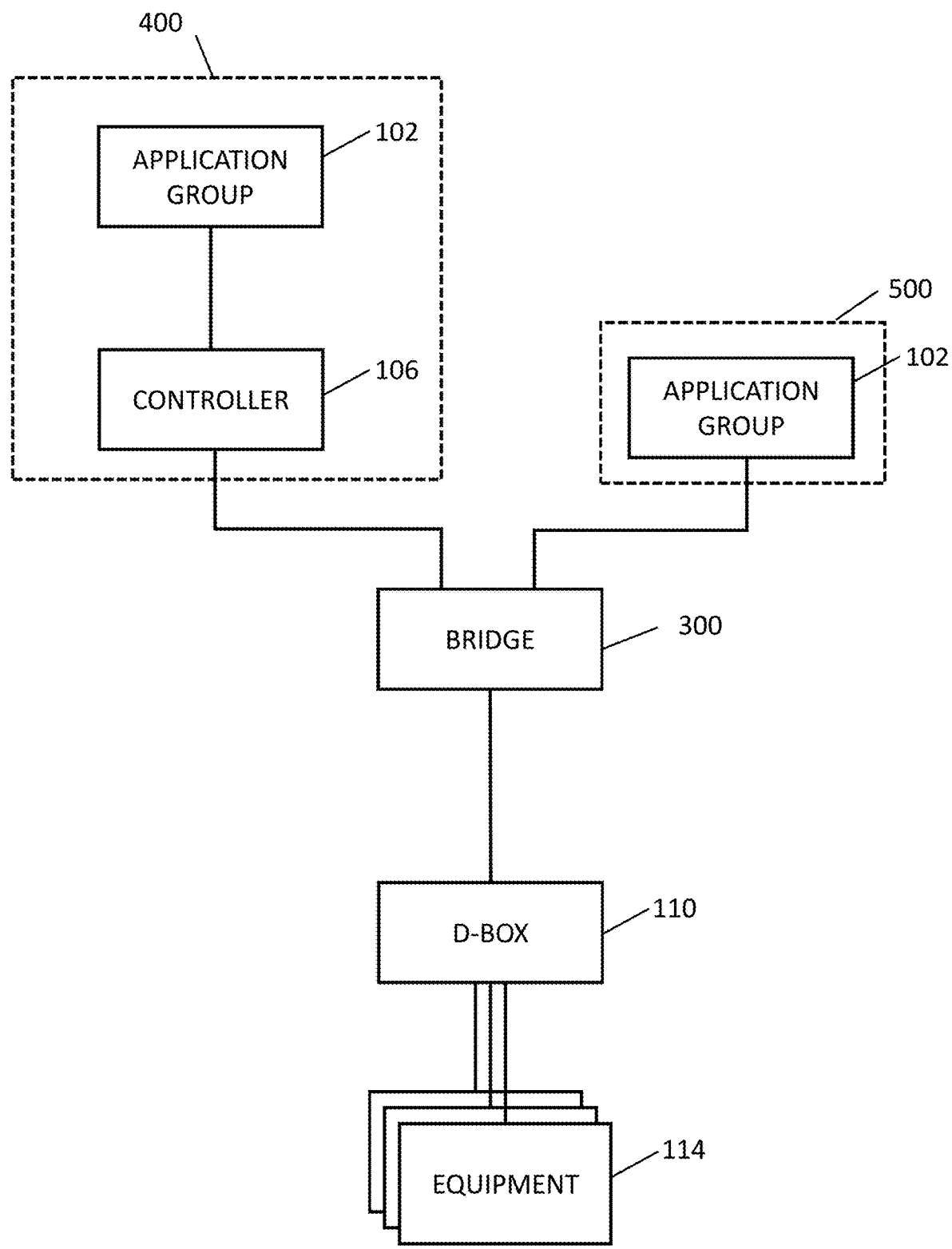
FIG. 16 depicts an embodiment where separation and interception is at both the D-Box and controller level.

FIG. 16 depicts an embodiment where separation and interception of the first application end 400 is at the D-Box level 202 and the separation and interception of the second application end 500 is at the controller level 204. In this embodiment, the second application end 500 lacks a controller; the bridge 300 would have to translate commands from the second application end 500 to the equipment end's equipment protocols.

Figure 17:
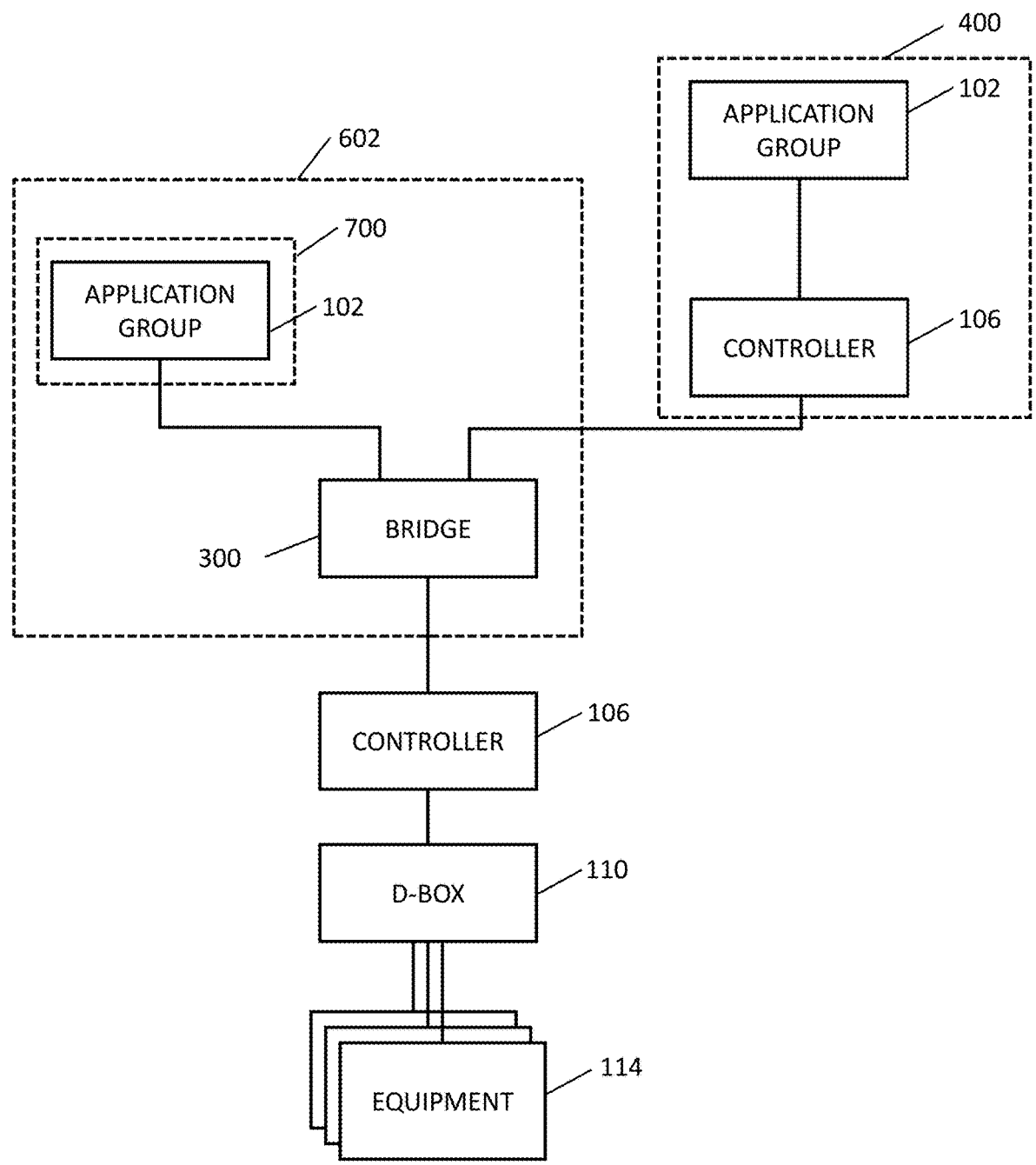
FIG. 17 depicts an embodiment where separation and interception is at both the software and D-Box level.

FIG. 17 depicts an embodiment where separation and interception of the first application end 700 is at the software level 206 and separation and interception of the second application end 400 is at the D-Box level 202. In this embodiment, there are two controllers for the second application group so the bridge 300 translates communications from the second application 400 to the equipment end's controller protocols.

Figure 18:
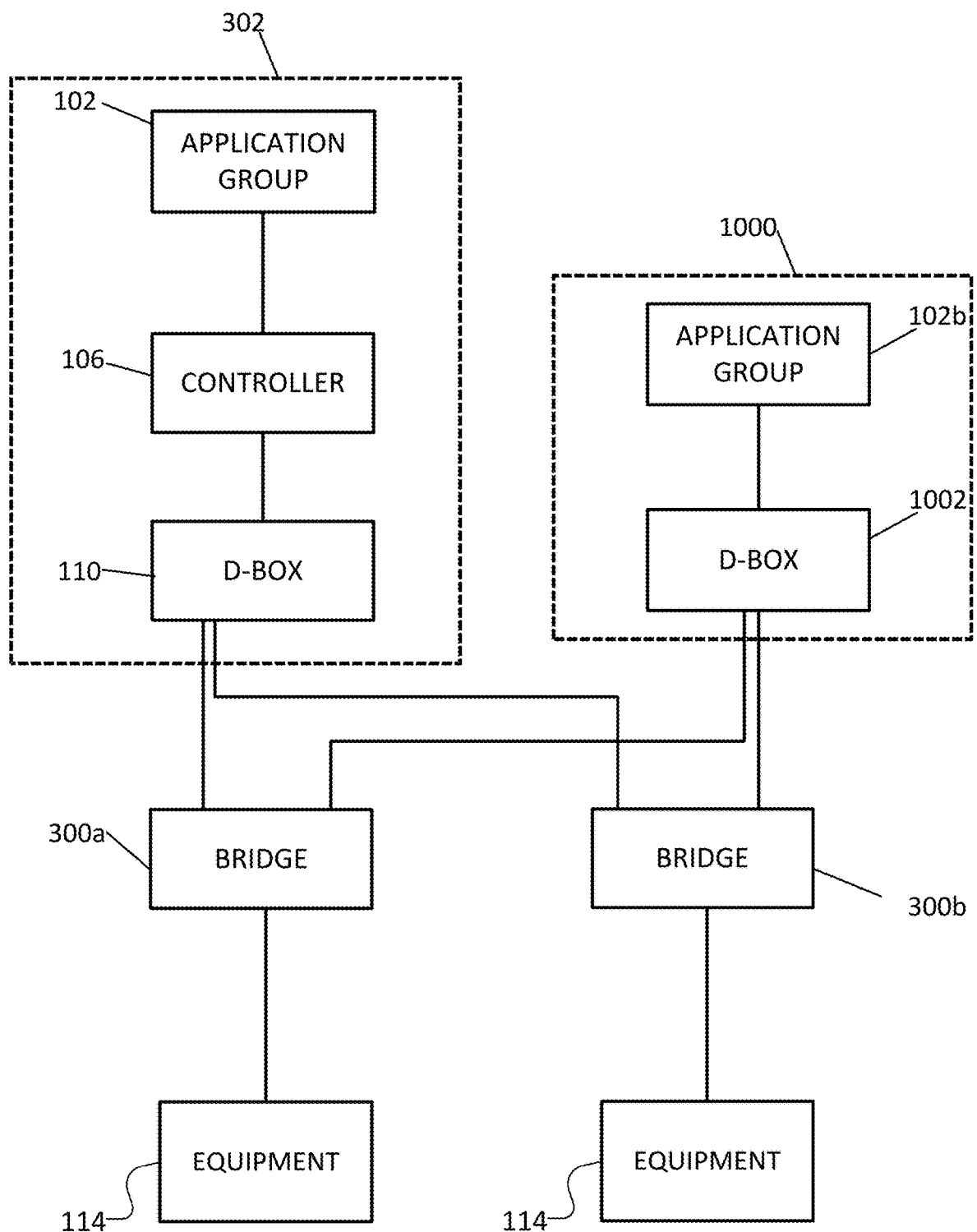
FIG. 18 depicts an embodiment where separation and interception for both application groups is at the equipment level, with one unique application end.

FIG. 18 depicts an embodiment where separation and interception of the first application end 302 and second application end 1000 are both at the equipment level 200; however, there is no controller in the second application end 1000. This scenario represents control from a central server which can communicate remotely with multiple bridges 300a . . . 300n across multiple locations which may control different types of equipment. The server has a virtual D-Box which distributes the communications, but no controller because equipment can vary. Here, the bridge translates from controller protocols to equipment protocols.

Figure 19:
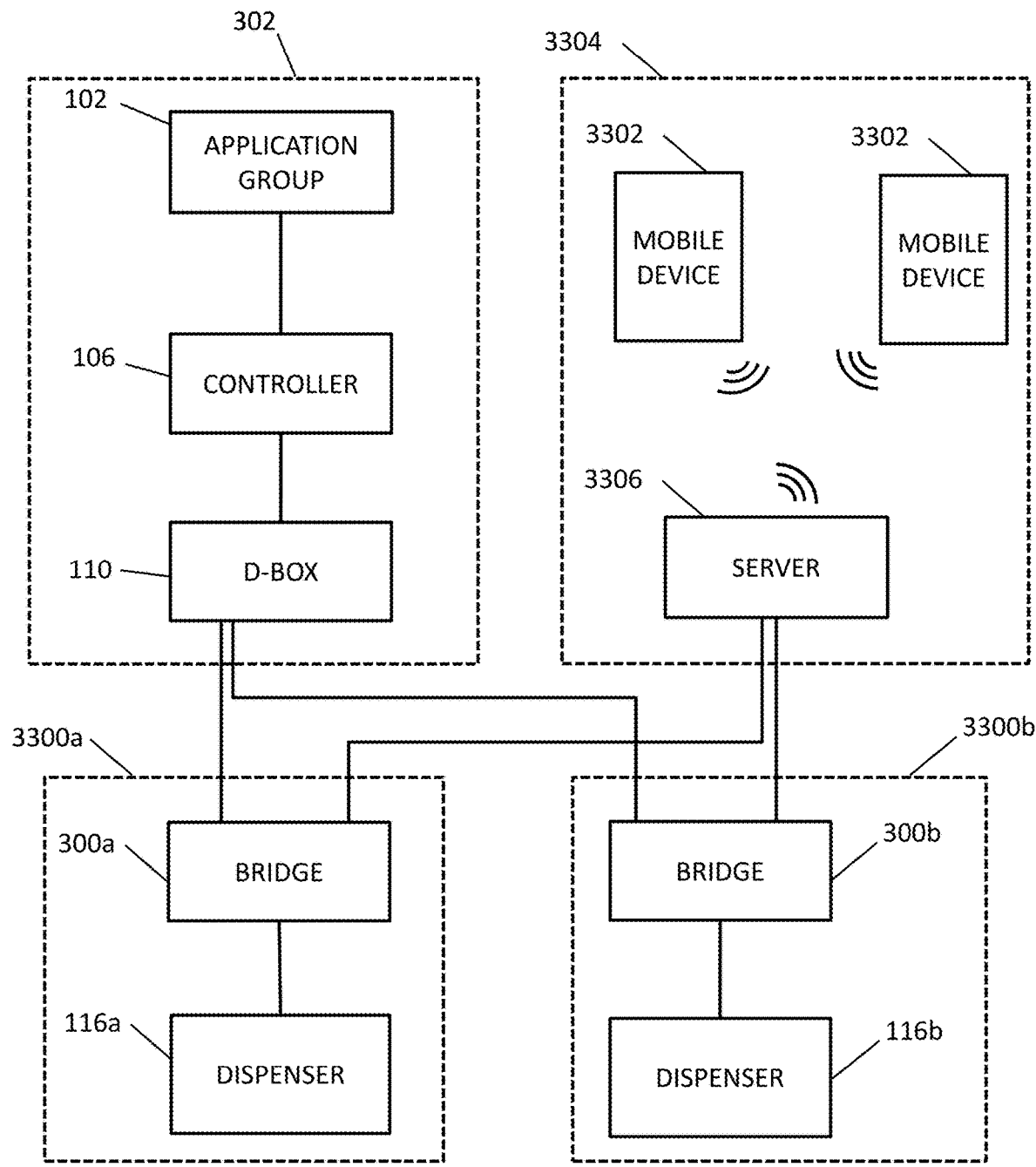
FIG. 19 depicts an embodiment for filling stations where the bridging device is placed within the equipment.

FIG. 19 depicts an embodiment for filling stations where separation and interception for both the application groups is at the equipment level. This embodiment applies to filling stations only, where the pieces of equipment are the dispensers 116a, b. In this embodiment, the bridging device 300a, b is placed within the housing of the equipment 3300a, b; it intercepts the communications from the first application end 300 physically and communicates with the second application end 3304 wirelessly (i.e., via a wireless communication circuit). The second application end 3304 includes a server 3306 and a plurality of mobile devices 3302 which together act as an application group; the server 3306 also performs D-Box functionalities. In this embodiment, both the server 3306 and mobile device 3302 can act as the application group for multiple sets of equipment 114 across any number of locations; further, pieces of equipment 116 at the same location can be controlled by different servers 3306. The server 3306 can freely establish or release communications with the pieces of equipment 116 and the mobile devices 3302 can freely establish or release communications with any server 3306; the application group 3304 can be empty when no server 3306 is connected, and can have any number of mobile devices 3302 connected to the server.

Figure 20:
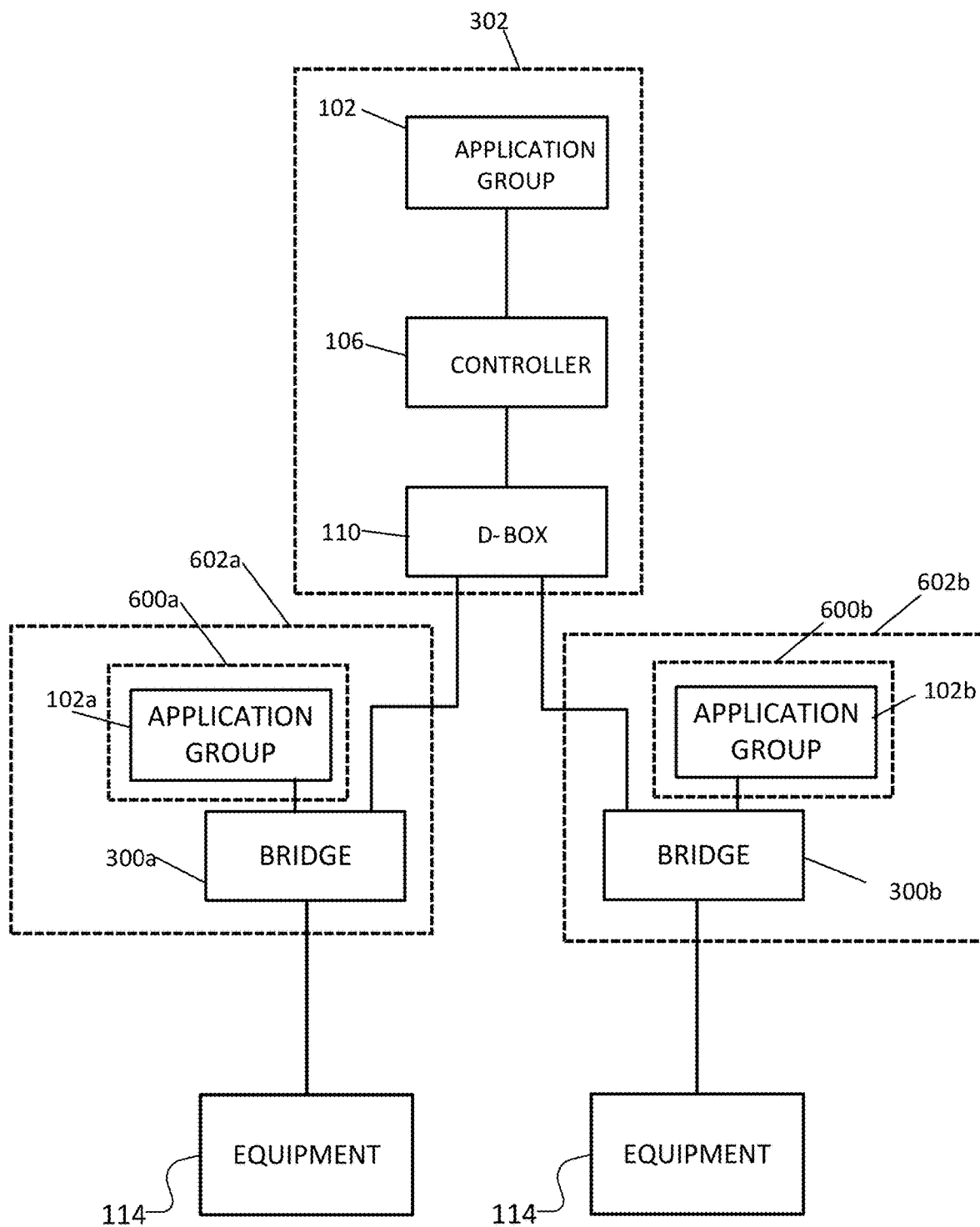
FIG. 20 depicts an embodiment where separation and interception is at both the equipment and software level.
Figure 21:
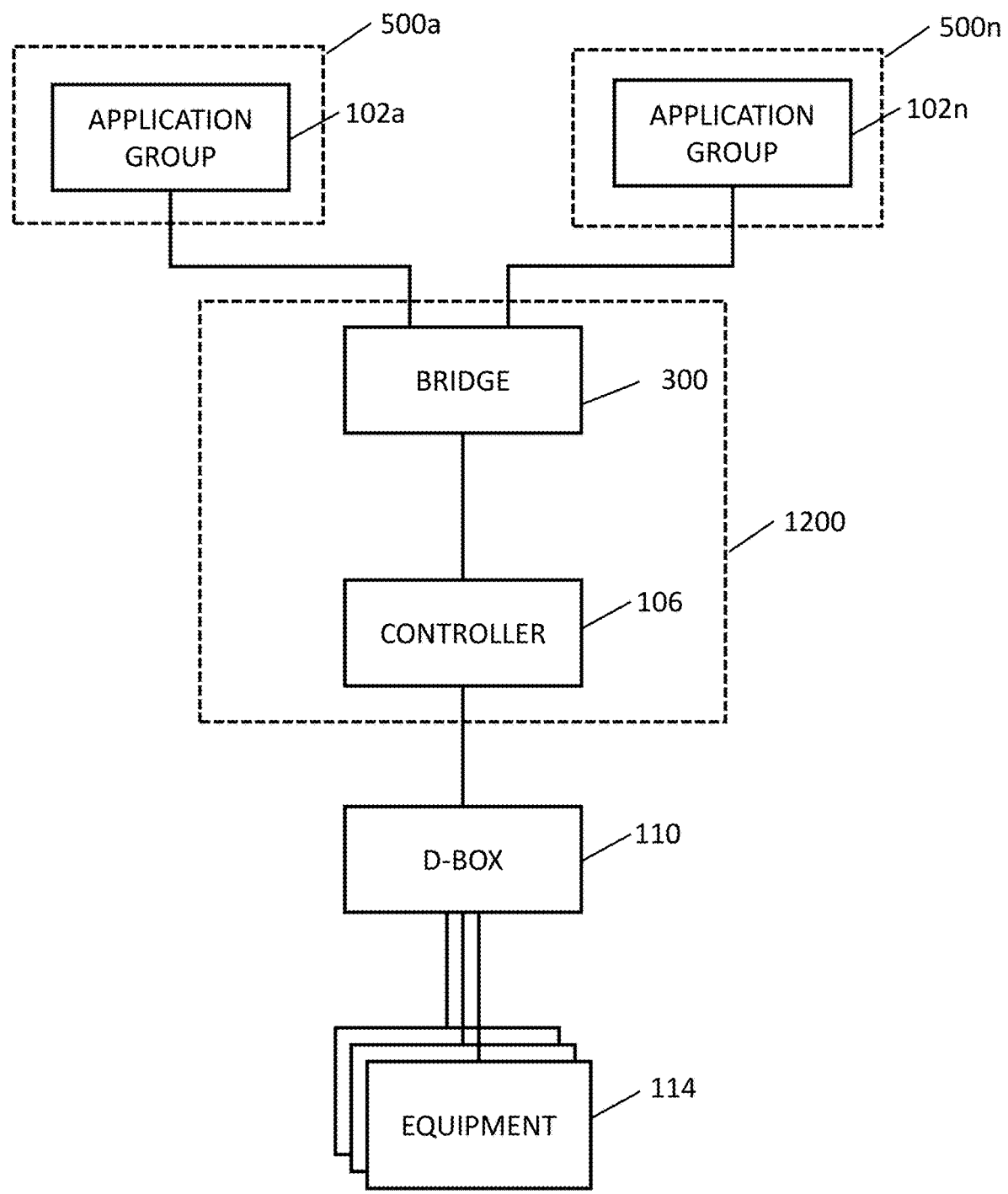
FIG. 21 depicts an embodiment where separation and interception is at the controller level and the bridge and controller exist on a single computing system.

With the knowledge and techniques described, it is possible to combine the bridge on a single computing system or device with any one or several of the other components. FIG. 20 and FIG. 21 depict two possible embodiments where the bridge is physically or logically combined with other components.

FIG. 20 depicts an embodiment where separation and interception of the first application end 302 is at the equipment level 200 and the separation of the second and third application ends 600a, b are at the software level 206. This embodiment is unique in that each bridge interfaces with its own unique application group 102a, b; further, each application group 102a, b is on the same computing system as the bridging device 300a, b.

FIG. 21 depicts an embodiment where separation and interception for a plurality of application ends 500a . . . 500n is at the controller level 204. In this embodiment, the bridge and controller exist on a single computing system 1200.

These embodiments are presented for illustrative purposes and are not intended to be restrictive; the bridge can be inserted at any locations where communications can be separated and intercepted. One skilled in the relevant art will appreciate that the various locations of separation and interceptions can be identified, omitted, rearranged, combined, and/or adapted in various ways.

Figure 22:
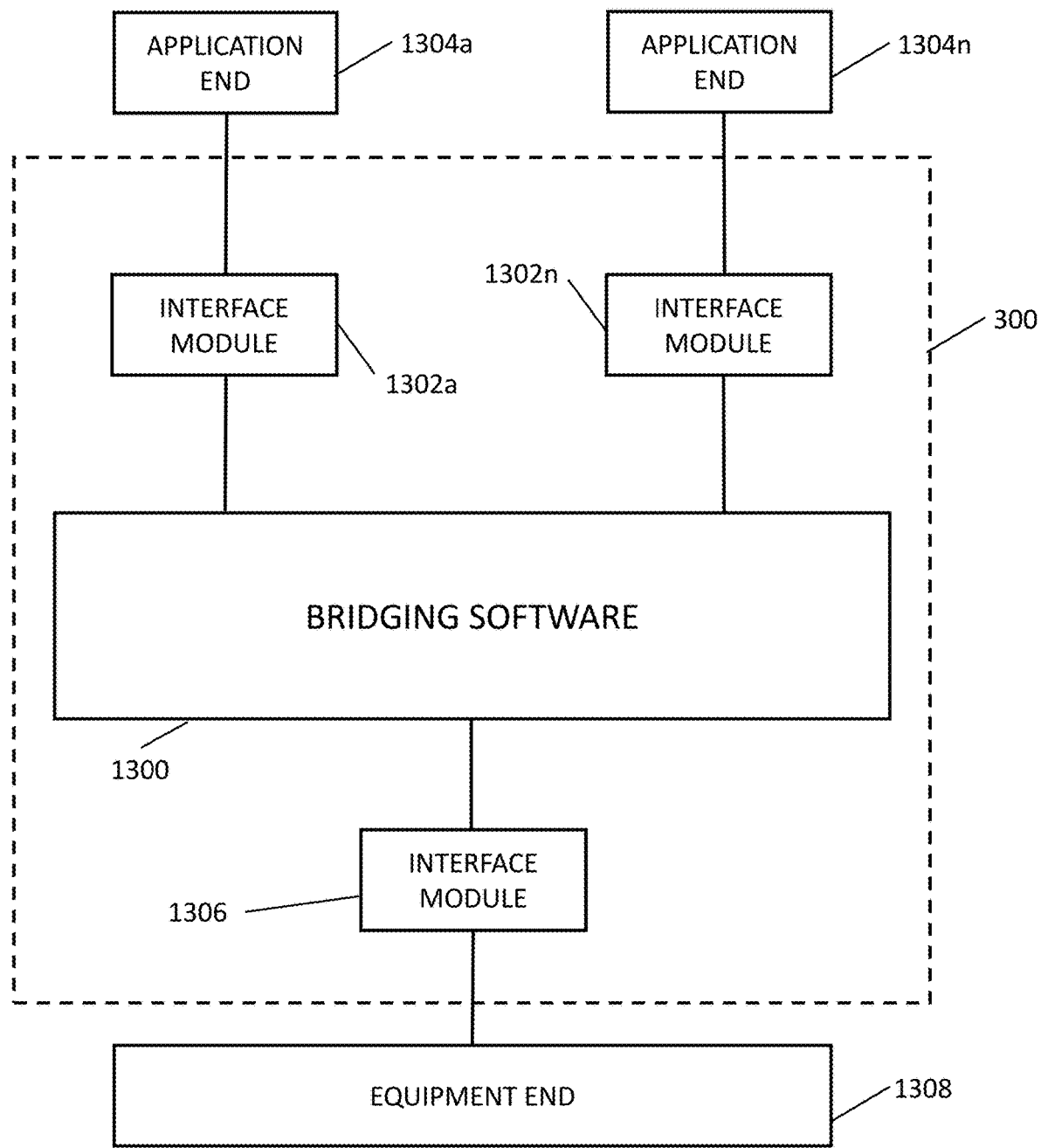
FIG. 22 illustrates an embodiment of the bridging device with interface modules.

FIG. 22 illustrates an embodiment of the bridging device 300 having the bridging software 1300, interface modules 1302a . . . 1302n for each application end 1304a . . . 1304n, and an interface module 1306 for the equipment end 1308. The interface modules 1302a . . . 1302n convert communications from the bridging software 1300 such that it is compatible with the communications interface of the application ends 1304a . . . 1304n. These interface modules may be referred to as application end interfaces. The interface module 1306 converts communications from the computing device 1300 to the communications interface of the equipment end 1308. These interface modules 1302a . . . 1302n, 1306 can be hardware devices such as RS232, active/passive current loop, and RS485/422 converters, or virtual, such as virtual serial ports. Interface modules 1303a . . . 1302n may be referred to as equipment end interfaces. Further, they can exist each as separate device, a single device with multiple interface modules, or on the same device as the bridging software 1300. Interface conversion techniques are common and can be obtained or otherwise built.

Figure 23:
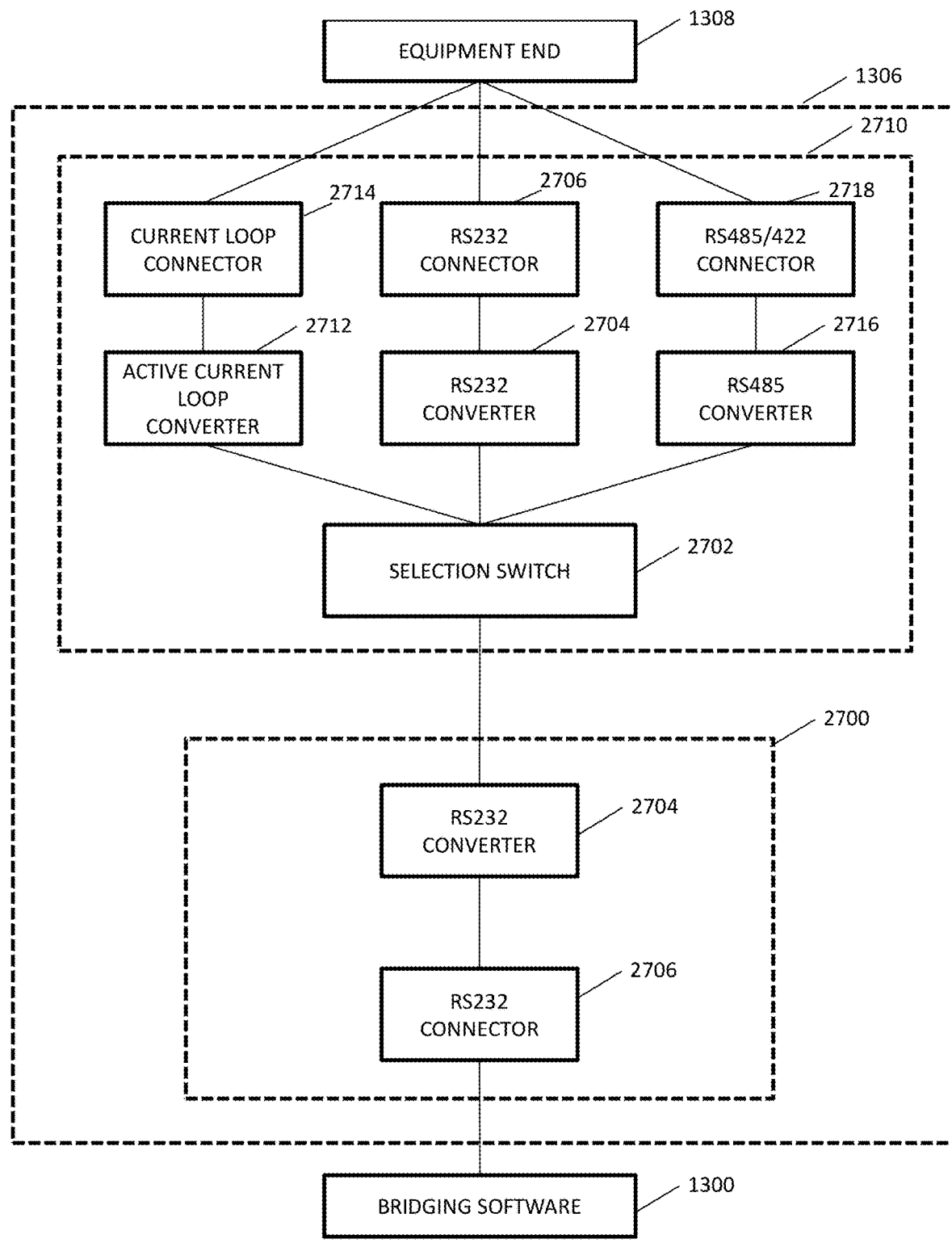
FIG. 23 depicts an embodiment of an equipment end interface module used in FIG. 22.
Figure 24:
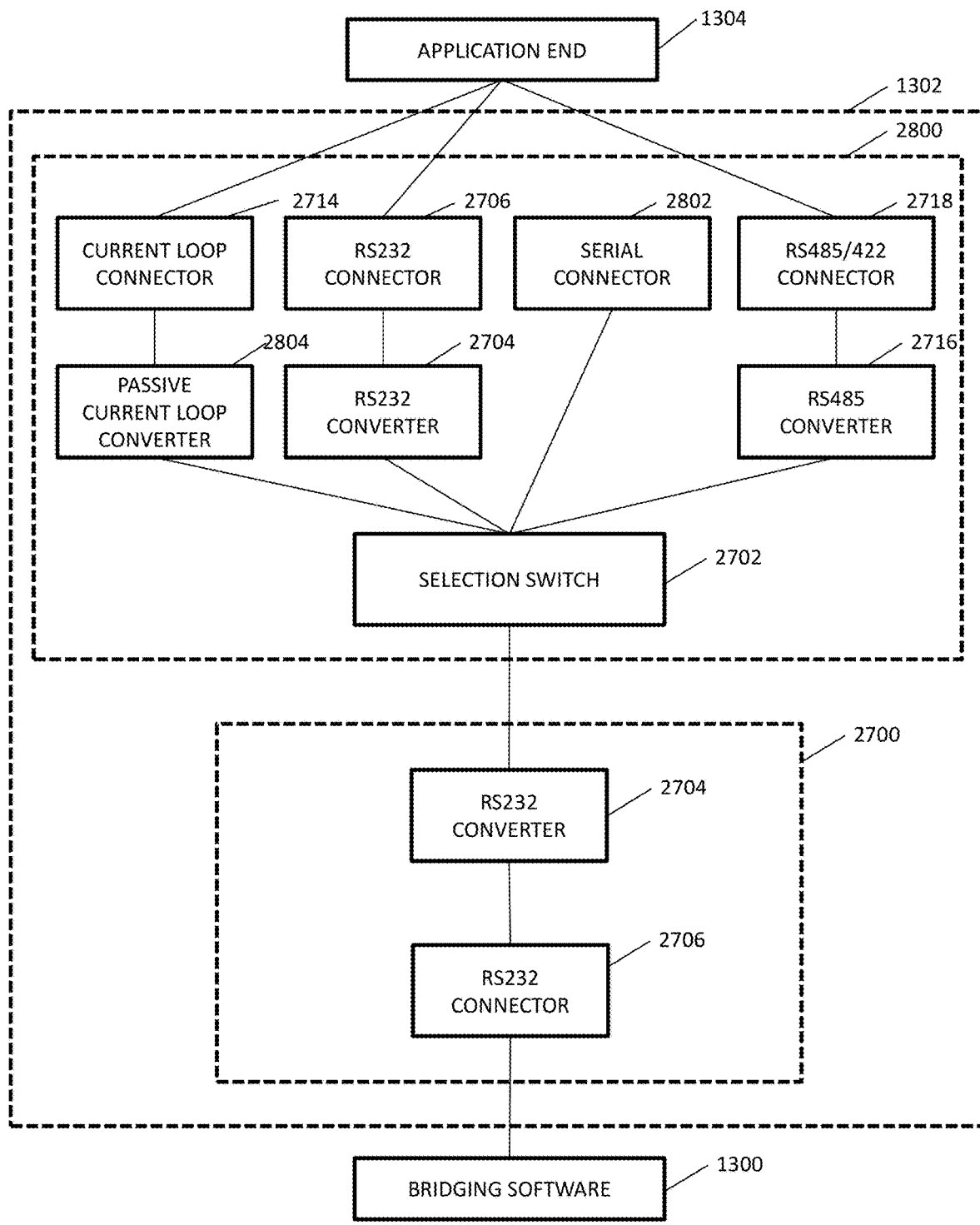
FIG. 24 depicts an embodiment of an application end interface module used in FIG. 22.
Figure 26:
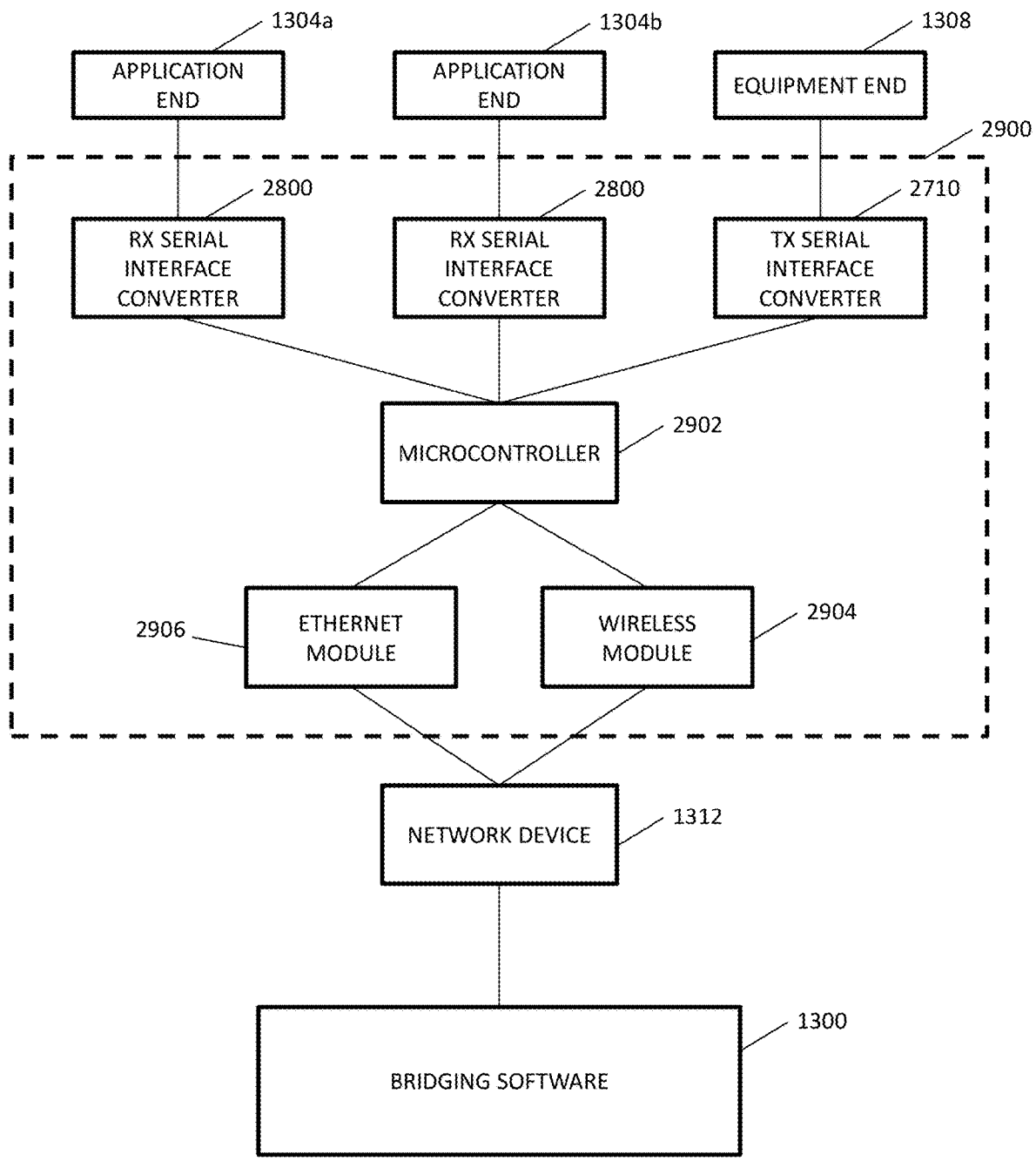
FIG. 26 depicts an embodiment of a combined interface module which converts between network and serial interfaces.

FIG. 23, FIG. 24, and FIG. 26 depict interface modules which are typically used when the bridging software exists on a separate non-embedded computing device. FIG. 23 depicts an embodiment of a Tx controller interface module 1306 used in FIG. 22 which controls communications between the bridging software 1300 and equipment end 1308. In this embodiment, group 2700 converts signals from the bridging software 1300 to and from TTL serial, and group 2710 converts from the TTL serial to and from the desired interface for the equipment end 1308. Group 2700 includes an RS232 connector 2706 and a RS232 converter 2704 which converts between RS232 and TTL serial. Embodiments where bridging software uses USB typically use a separate USB to RS232 converter. The selection switch 2702 is used to select the desired interface for the equipment end; several methods of implementation include switches, jumpers, programmatic settings, or physical modifications. The active current loop converter 2712 converts between TTL serial and active current loop which provides current through the current loop connector 2714. The RS485 converter 2716 converts between TTL serial and RS485 though the RS485/422 connector 2718. These interface modules are widely available or can otherwise be constructed by one skilled in the relevant art.

FIG. 24 depicts an embodiment of a Rx emulator interface module 1302 used in FIG. 22 which controls communications between the bridging software 1300 and application end 1304. In this embodiment, group 2700 converts signals from the bridging software 1300 to and from TTL serial, and group 2800 converts from the TTL serial to the desired interface for the equipment end 1308. Group 2800 is similar to group 2710 but instead has a passive current loop converter 2804 which does not provide current. Further, it includes a TTL serial connector 2802 for additional interface converters to be attached.

Figure 25:
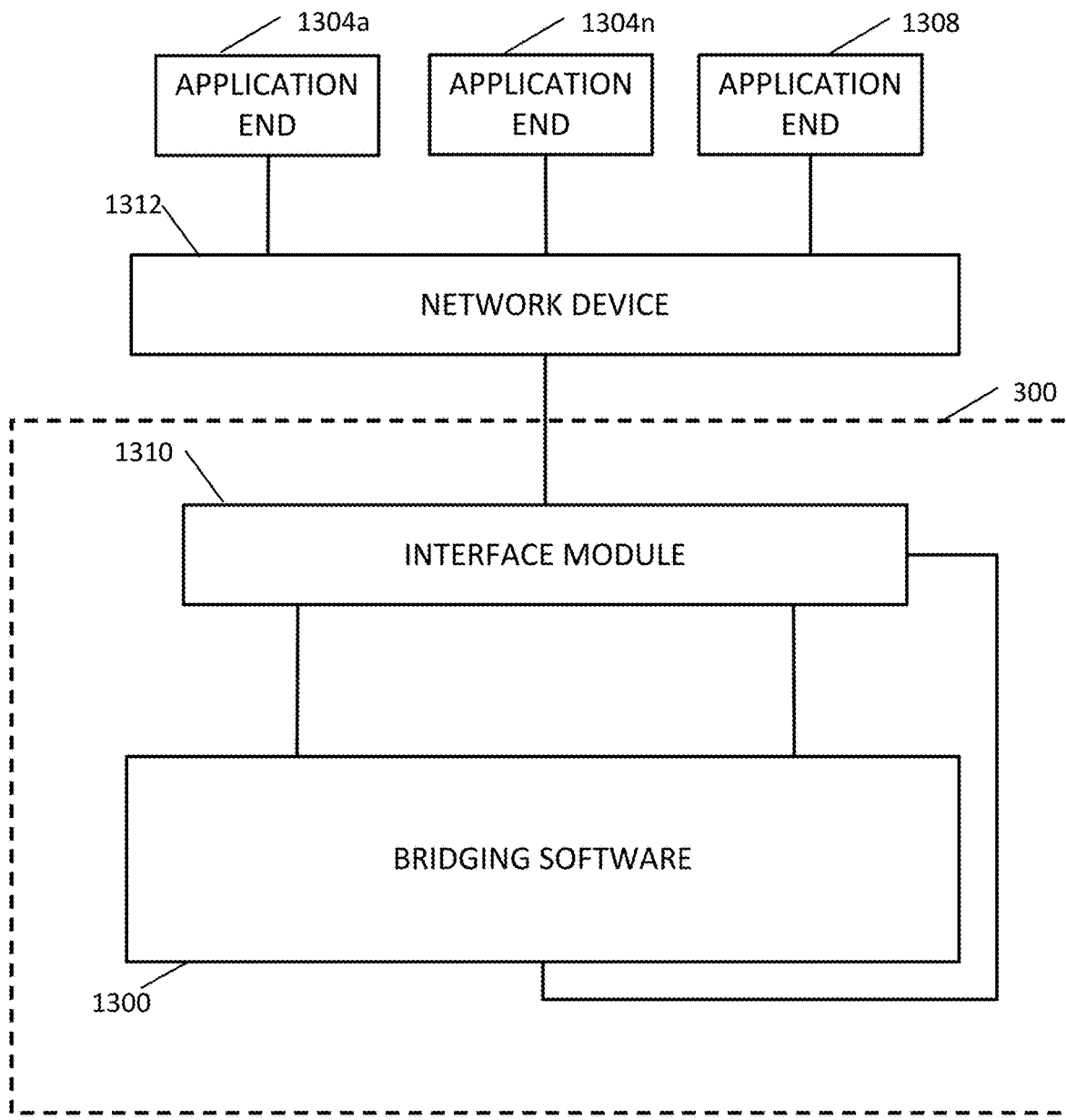
FIG. 25 illustrates an embodiment of the bridging device with interface modules.

FIG. 25 illustrates an embodiment of the bridging device 300 having the bridging software 1300 and a single interface module 1310 which communicates with a network device 1312 such as a network router or switch. In this embodiment, the interface module 1310 converts from the bridging software's output to a network communications interface like TCP/IP, where multiple channels of communications can exist within a single physical channel. The connection between the interface module 1310 and the network device 1312 could be physical, as in the case of Ethernet, or wireless, as in the case of Wi-Fi.

Alternate embodiments of separation and insertion may not require interface modules, where the output from the bridging software 1300 or computing device matches that of the application ends 1304a . . . 1304n and/or equipment end 1308.

It is possible that the bridging device 300 or software 1300 could be combined or could exist on the same physical system or computing device as another component, such as an application or controller. Using this, communications between the bridging device 300 and the combined component are such that interface modules are not necessary. The bridging software would still be considered to logically exist even if it resides on the same computing system or piece of software.

FIG. 26 depicts another interface module for use in an implementation when the bridging software exists on a separate non-embedded computing device. In FIG. 26, a combined interface module 2900 converts between network and serial interfaces. The application ends 1304 and equipment end 1308 use serial communications. The bridging software 1300 uses network communications through a network device 1312. The microcontroller 2902 connects with a wireless module 2904 and an Ethernet module 2906 (i.e., an Ethernet communication circuit) and converts from the network communications to/from serial. The wireless module 2904 is shown separately here but can reside on the microcontroller 2902. Microcontrollers 2902 typically output TTL serial so group 2700 is not required. The Tx serial interface converter 2710 converts to/from TTL serial to the equipment end's interface, and the Rx serial interface converters 2800 convert from TTL serial to/from the application end's 1304 interface.

Figure 27:
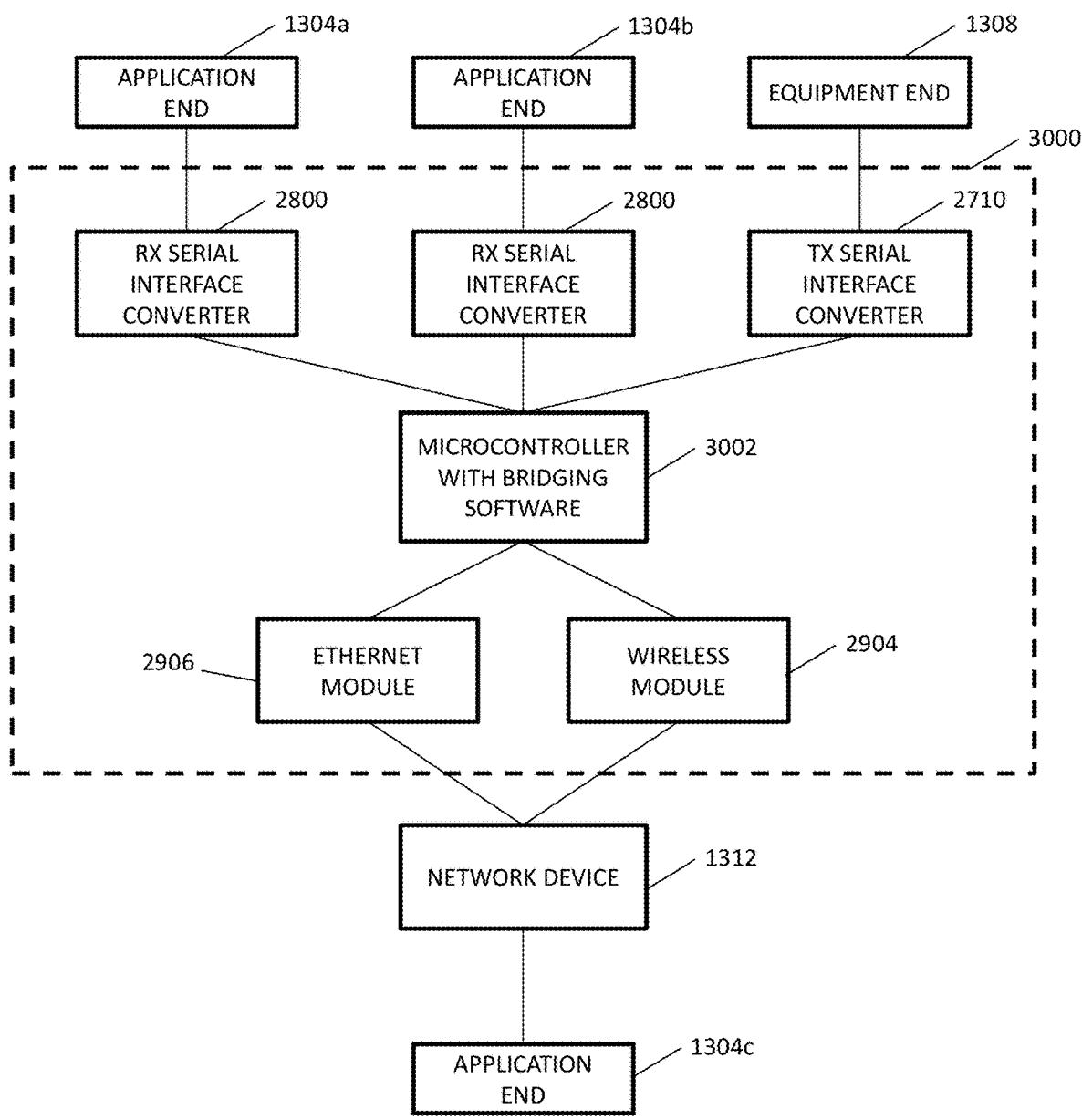
FIG. 27 depicts an embodiment of an embedded bridging device where the bridging software and required interface modules exist on the same device.
Figure 28:
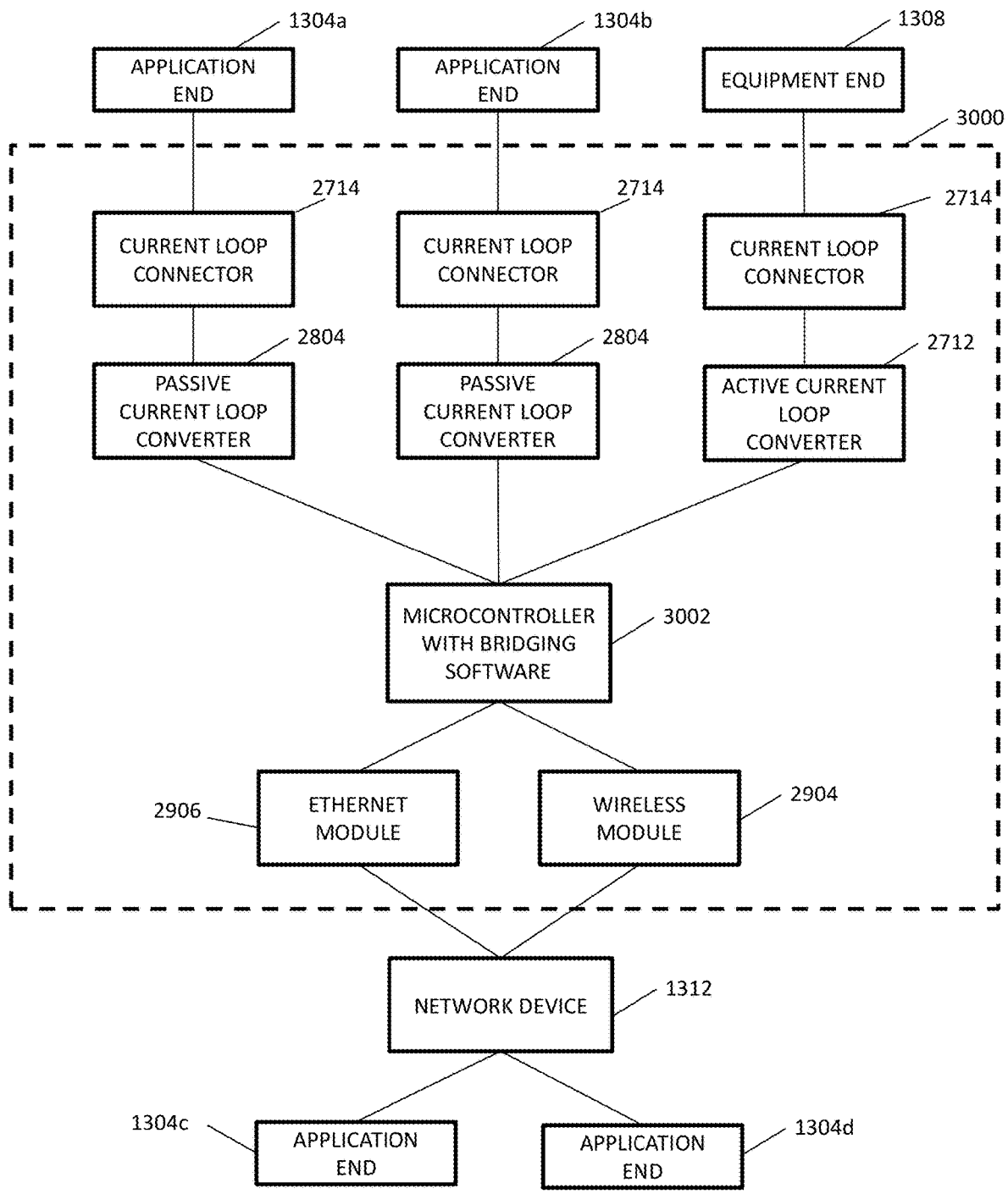
FIG. 28 depicts an embodiment of an embedded bridging device with multiple current loop and network application ends.
Figure 29:
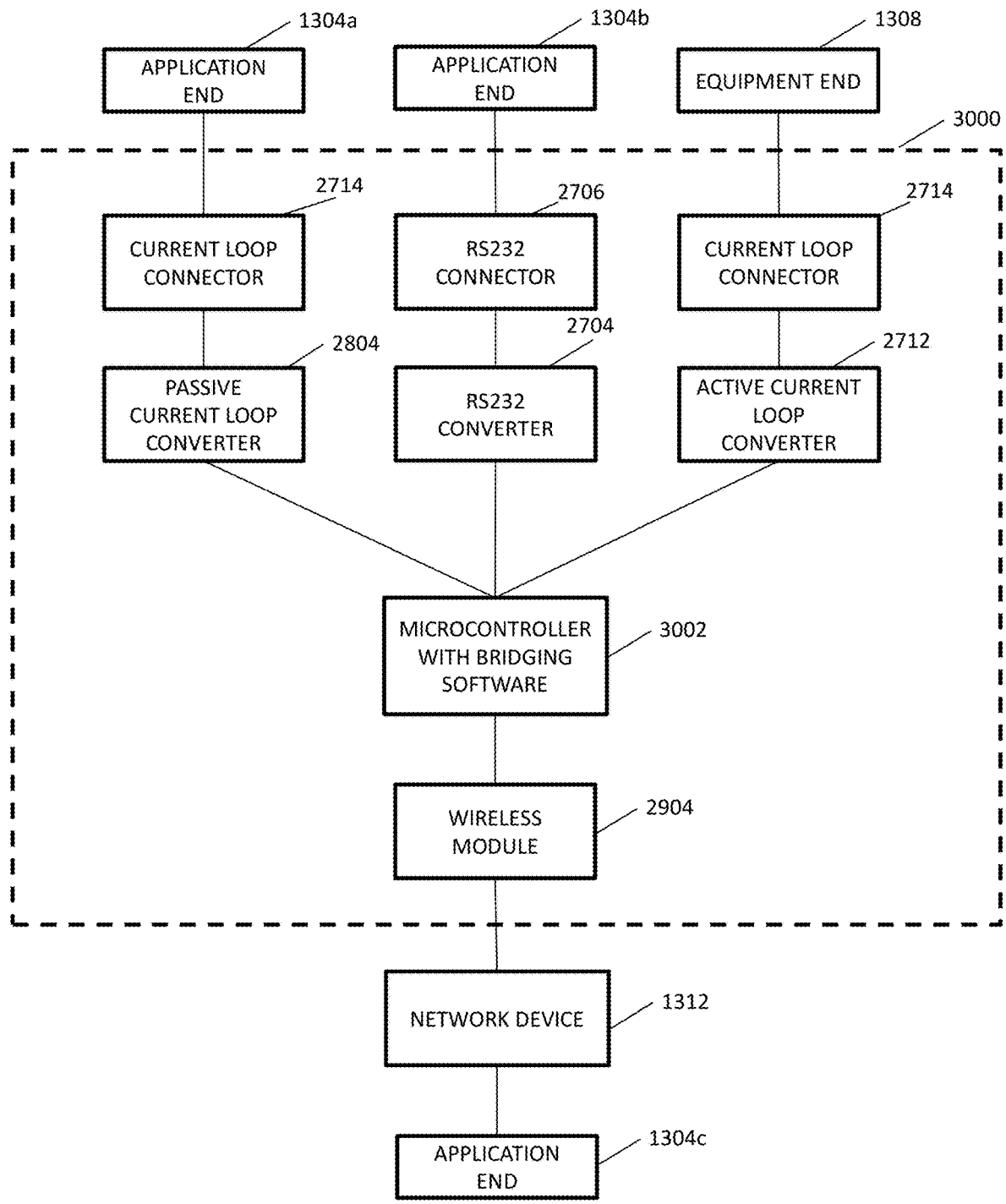
FIG. 29 depicts an embodiment of an embedded bridging device with one current loop application end, one RS232 application end, and one Wi-Fi application end.

FIG. 27, FIG. 28, and FIG. 29 depict embodiments where bridging software uses an embedded computing device and is combined with the interface modules. FIG. 27 depicts an embodiment of an embedded bridging device 3000 where the bridging software and required interface modules exist on the same device. The microcontroller 3002 performs the network to and from serial conversions as well as the bridging software techniques. The Rx serial interface converters 2800 are used to interface with application ends 1304a, b connected through serial. Wireless modules 2904 and Ethernet modules 2906 are used to interface with application ends 1304c located over a network. The wireless module 2904 is shown separately here but can reside on the microcontroller 3002.

FIG. 28 depicts an embodiment of an embedded bridging device 3000 where one equipment end 1308 and two application ends 1304a, b are connected through current loop serial, and two additional application ends 1304c, d are connected through a network. FIG. 29 depicts an embodiment of an embedded bridging device 3000 where the equipment end 1308 and one application end 1304a connect through current loop serial, one application end 1304b connects through RS232 serial, and one application end 1304c connects through Wi-Fi. This embodiment is typically used when at least one of the application ends 1304c is remotely located, such as the scenario presented in FIG. 18 and FIG. 19 which uses a server.

Not shown in the above interface converters and embedded devices is the power module which supplies one or more levels of regulated voltage. Other embodiments may use alternate serial communications methods in place of TTL serial, most commonly CMOS, though any method of serial communications can be used in its place. Any number of additional interface converters or modules can be added, removed, combined, or separated from a device or multiple devices. Further, it is not required that every interface converter or module be attached to an application end or equipment end. Any of these converters or connectors can be physically combined, separate, or entirely virtual and implemented as software.

Figure 30:
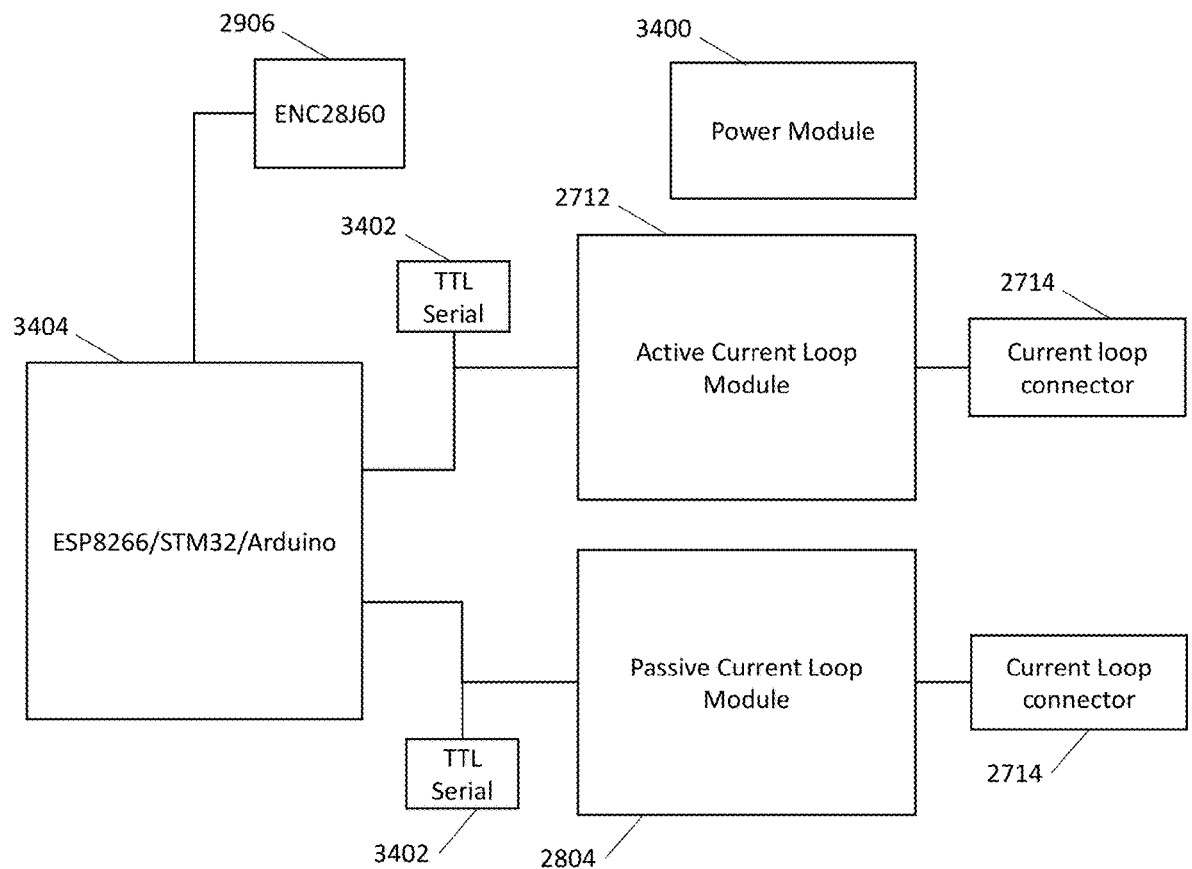
FIG. 30 depicts an embodiment of an embedded bridging device where one or more application ends can interface though Ethernet, and one application end and the equipment end can interface through current loop or TTL serial.
Figure 31:
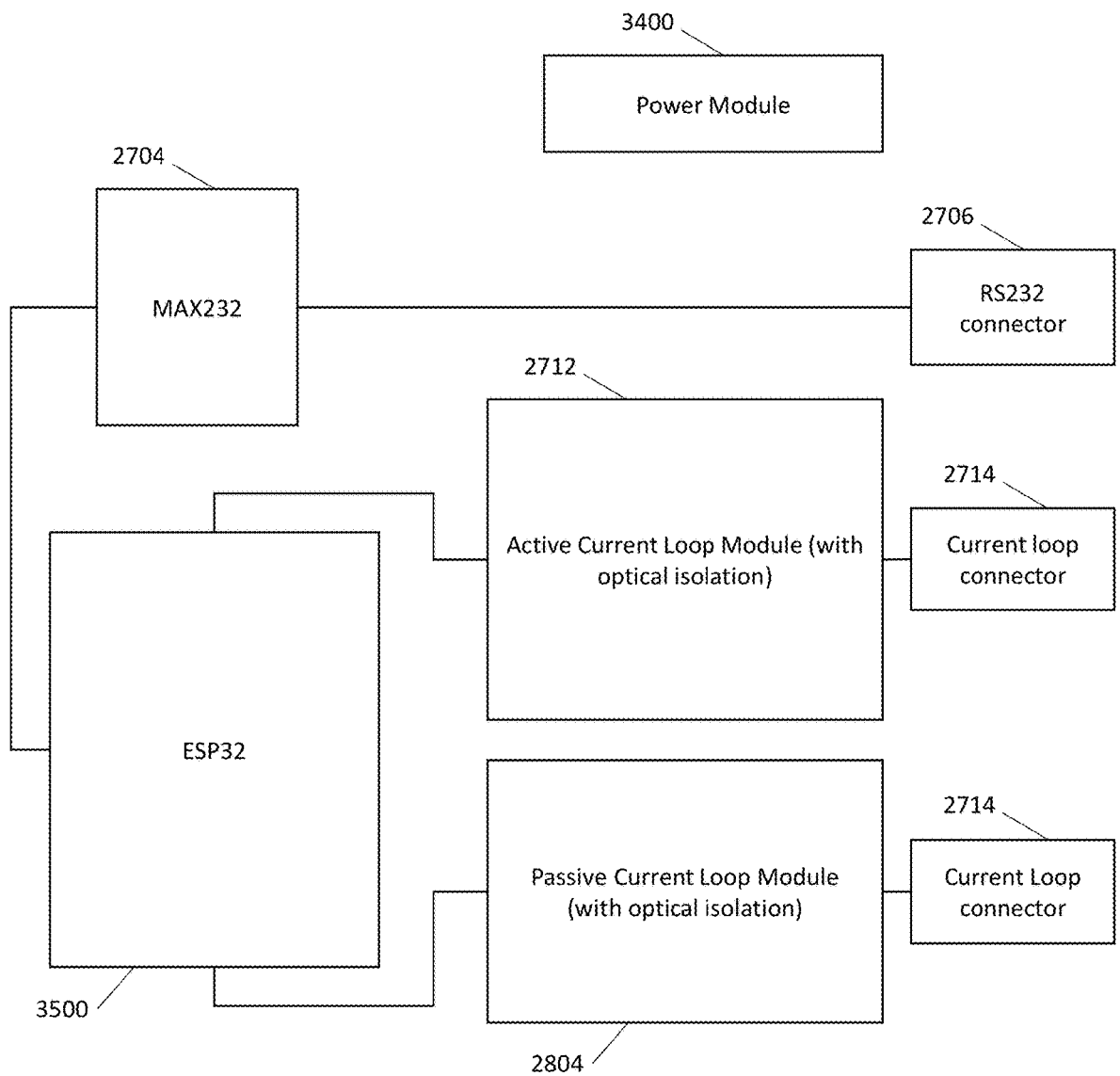
FIG. 31 depicts an embodiment of an embedded bridging device where one application end can connect through RS232, one or more application ends can connect through Wi-Fi, and one application end and the equipment end can connect through current loop.

FIG. 30, FIG. 31, FIG. 32, and FIG. 34 depict circuit designs for embodiments where the bridging software is on an embedded device. FIG. 30 depicts an embodiment of an embedded bridging device where one or more application ends can interface though Ethernet, and one application end and the equipment end can interface through current loop or TTL serial. The TTL serial interface allows additional interface converters to be attached. The Ethernet controller ENC28J60 2906 is an Ethernet connection interface. The bridging software resides on the microcontroller 3404 which may or may not have wireless capabilities. Microcontrollers with wireless capabilities allow for one or more application ends to be connected through Wi-Fi. The TTL serial connections 3402 allow for a TTL connection rather that current loop for the application end and the equipment end. The power module 3400 is used to power the device FIG. 31 depicts an embodiment of an embedded bridging device where one application end can connect through RS232, one or more application ends can connect through Wi-Fi, and one application end and the equipment end can connect through current loop. A MAX232 integrated circuit 2704 converts to/from TTL serial and RS232. The RS232 connector 2706 is typically used for an application end connection but can be used for an equipment end connection or for other devices. The bridging software runs, for example, on an ESP32 microcontroller with wireless capabilities 3500 used for connecting wireless application ends.

Figure 32:
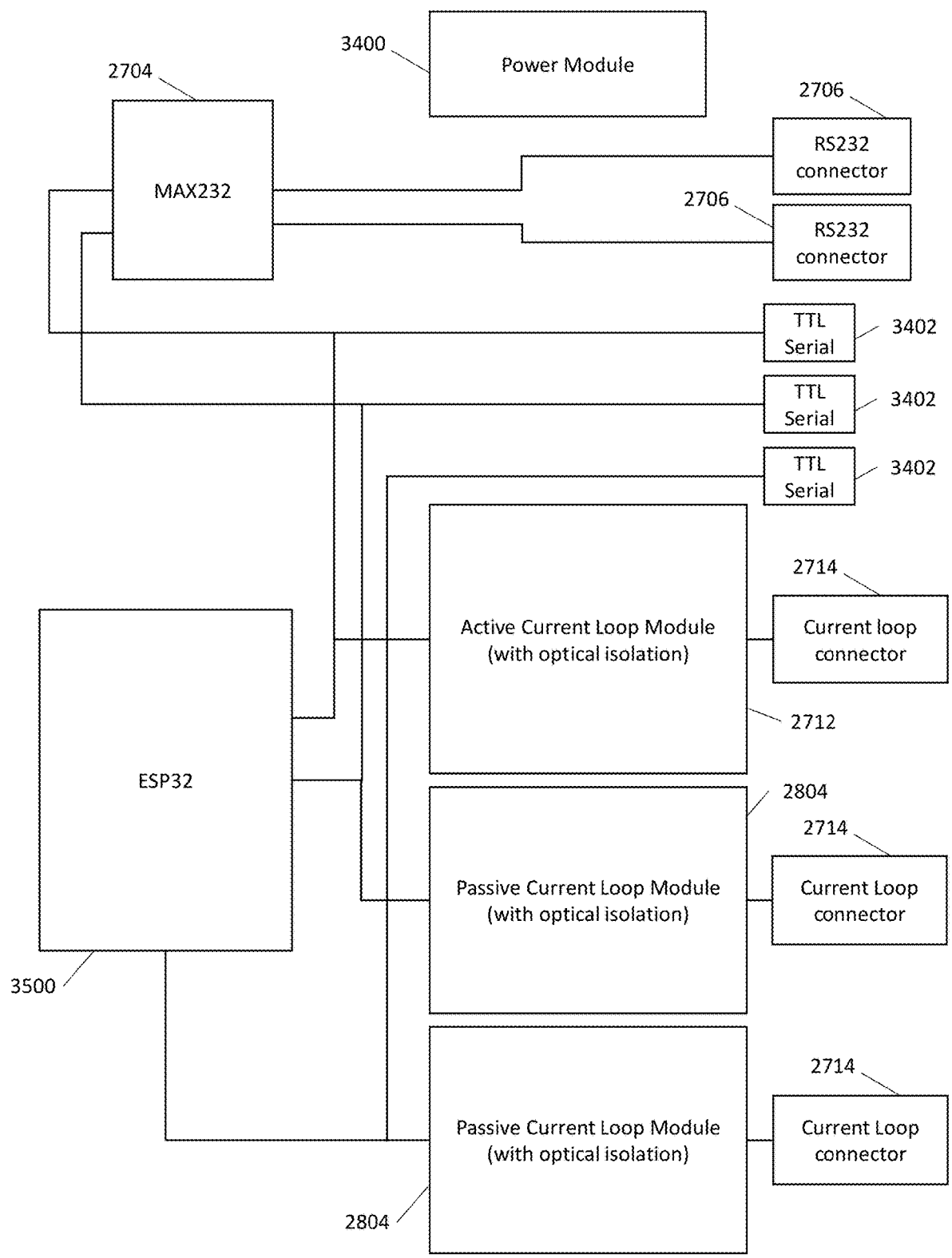
FIG. 32 depicts an embodiment of an embedded bridging device where the equipment end and one application end can connect through current loop, TTL serial, or RS232, one application end can connect through current loop or TTL serial, and one or more application ends can connect through Wi-Fi.

FIG. 32 depicts an embodiment of an embedded bridging device where the equipment end and one application end can connect through current loop, TTL serial, or RS232, one application end can connect through current loop or TTL serial, and one or more application ends can connect through Wi-Fi. RS232, TTL serial, and current loop interfaces share wiring for the equipment end and one application end. Further, TTL serial and current loop interfaces share wiring for one application end. This allows flexibility for how application and equipment ends are connected; they are not interfaces for additional connections.

Figure 33:
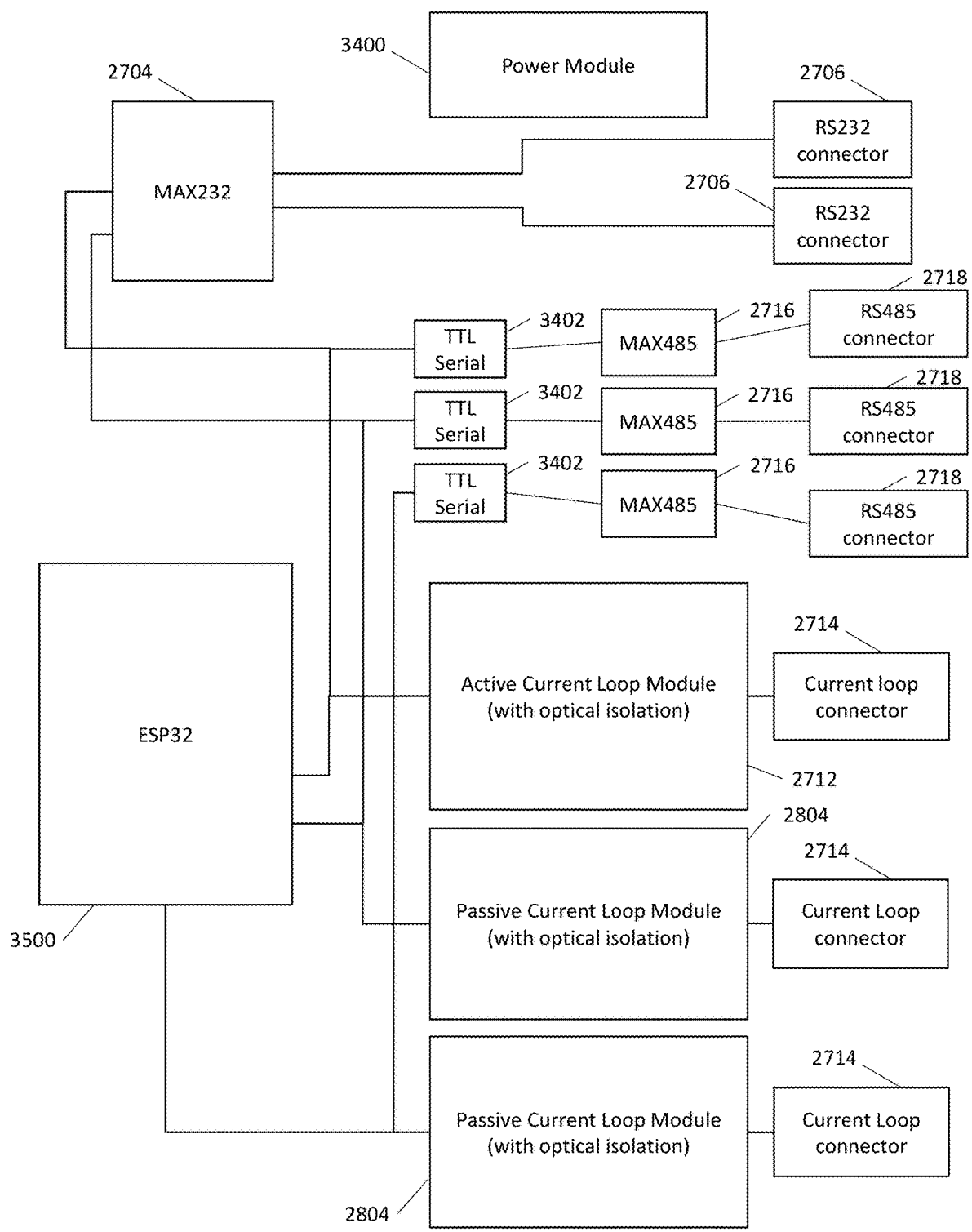
FIG. 33 depicts an embodiment of the embedded bridging device where two application ends and the equipment ends connect through RS485.

FIG. 33 depicts an embodiment of the embedded bridging from FIG. 32 with a RS485 conversion module 2716 and RS485 connectors 2718 connected to each TTL serial connector 3402. This allows two application ends and the equipment end to connect through RS485 in addition to the existing interfaces.

Figure 34:
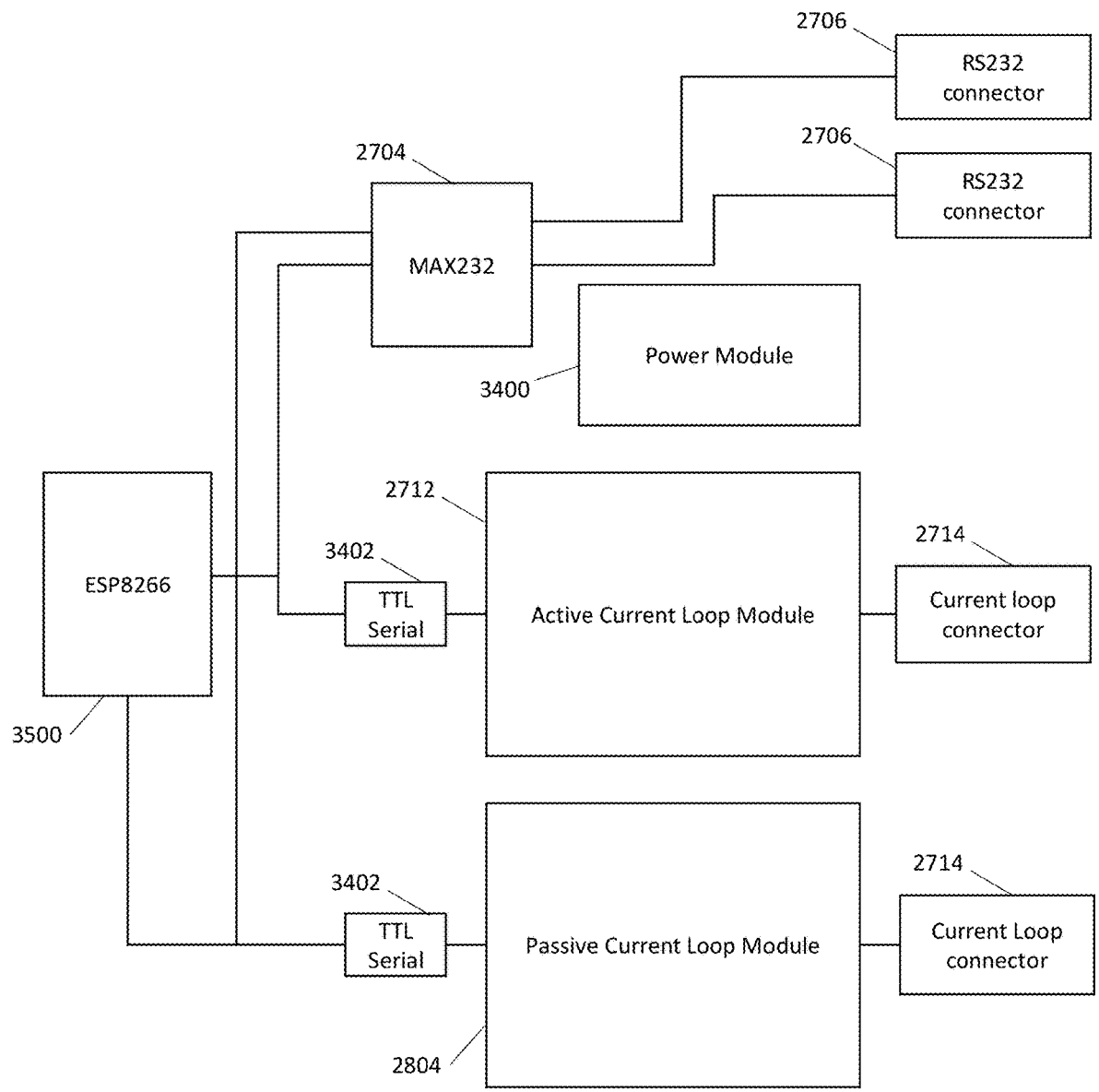
FIG. 34 depicts an embodiment of an embedded bridging device where the equipment end and one application end can connect using current loop, TTL serial, or RS232, and one or more application ends can interface through Wi-Fi.

FIG. 34 depicts an embodiment of an embedded bridging device where the equipment end and one application end can interface using current loop, TTL serial, or RS232, and one or more application ends can interface through Wi-Fi. Wiring is shared for the TTL serial, RS232, and current loop for both the equipment end and one application end connection.

Applications are typically developed to be compatible within a specific set of equipment, systems, and other applications. Existing methods of combining application requires similar protocols and compatible rules, control, and management methods for controlling a shared set of equipment. The addition of incompatible applications, whose mechanisms, control rules, commands, and/or protocols are not known can and typically will cause adverse reactions and undesirable outcomes.

For example, take a system with two incompatible applications and the first application issues a command (i.e., a received one of the allowable commands) which changes the equipment status to busy. The second application, unaware of the sent command, could consider this to be an error and try to interrupt the equipment.

One aspect of the bridging circuit and/or control system is the management of communications so these issues do not arise and applications do not react adversely to changes or circumstances. The fundamental logical technique used is locking and unlocking; each individual piece of equipment (i.e., each equipped device) can be locked (i.e., placed in a lock state), granting ownership to a single or multiple application groups. The application group or groups with ownership is/are referred to as the "Owner" while all other application groups are referred to as "Observers" for that piece of equipment. Changes which may cause conflict are hidden from the observers, and commands from observers which may cause conflict are blocked.

Commands are separated into two primary categories. Data collection commands are commands which collect information, such as status, from the equipment. Controlling commands are commands which control, affect, or otherwise alter the equipment.

TABLE 1

|  | Unlocked or Owner | Locked (Observer) |
|---|---|---|
| Data Collection Commands (conflict) | Pass-through | Emulated |
| Controlling Commands (conflict) | Pass-through | Blocked and emulated |
| Other Commands | Pass-through | Pass-through |

Table 1 depicts an embodiment where commands from the applications and the required responses are separated into three categories. Data collection commands (conflict) are data collections commands which can cause conflict for observers, so the data is emulated. Controlling commands (conflict) are controlling commands which may cause conflict if sent by an observer and therefore are blocked (i.e., no corresponding communication is sent to the equipment) and return an emulated response. Other commands are all other commands, such as controlling commands or data collection commands which would not cause conflict, and unknown commands.

Pass-through refers to sending the command using packet switching to the equipment and returning a true response. Blocking refers to stopping the command such that it never reaches the equipment. Emulation refers to modifying or creating return data which is sent to the application groups. These emulated responses are typically programmatically generated or previously configured and retrieved from memory. In both of these cases the memory (either through configuration information or through stored programmatic machine codes—either of these alone or both together) stores a configuration that indicates, for each of the application end interfaces, a predesignated response to every command. The configuration stored in memory is thus a stored configuration. Not every command need be known or explicitly handled, and therefore a catch-all that handles unknown commands or commands not otherwise explicitly handled is a predesignated response.

In Table 1, the state (unlocked/owner or locked/observer, in the first row) discriminates among the application end interfaces and the command categories in the first column account for every possible command. The memory thus is said to store a configuration indicating, for each of the application end interfaces, a predesignated action for each received command. The commands all have predesignated actions in Table 1.

TABLE 2

|  | Unlocked or Owner | Locked (Observer) |
|---|---|---|
| Data Collection Commands (conflict) | Cached Response | Emulated |
| Data Collection Commands (no conflict) | Cached Response | Cached Response |
| Controlling Commands (conflict) | Pass-through | Blocked and emulated |
| Other Commands | Pass-through | Pass-through |

Table 2 depicts an embodiment where commands from the applications and the required responses are separated into four categories and caching is used. Here, data collection commands (no conflict) are data collection commands which cannot or do not cause conflict despite ownership and can therefore always return true data. Data collection commands in general are typically the most frequently sent commands, often multiple times each second. To improve performance, these commands can be cached by the bridging circuit and/or control system so when a data collection command is sent, it returns a true result from the cache rather than having to pass-through the command.

TABLE 3

|  | Unlocked or Owner | Locked (Observer) |
|---|---|---|
| Data Collection Commands (conflict) | Cached Response | Emulated |
| Data Collection Commands (no conflict) | Cached Response | Cached Response |
| Controlling Commands (conflict) | Pass-through | Blocked and emulated |
| Unknown commands (frequent) | Cached Response | Cached Response |
| Other Commands | Pass-through | Pass-through |

Table 3 depicts an embodiment where commands from the applications and the required responses are separated into five categories. The unknown commands (frequent) represent unknown but frequently sent commands with consistent responses; these are likely to be unknown data collection commands. These commands can be programmatically identified and added to the cache so it can return cached results

TABLE 4

|  | Unlocked or Owner | Locked (Observer) | Handle Lock (observer) | Sales Lock (observer) |
|---|---|---|---|---|
| Data Collection Commands (conflict) | Cached Response | Blocked and emulated | Emulated | Emulated |
| Data Collection Commands (no conflict) | Cached Response | Cached Response | Cached Response | Cached Response |

TABLE 4-continued

|  | Unlocked or Owner | Locked (Observer) | Handle Lock (observer) | Sales Lock (observer) |
| --- | --- | --- | --- | --- |
| Controlling Commands (conflict) | Pass-through | Blocked and emulated | Pass-through | Pass-through |
| Other Commands | Pass-through | Pass-through | Pass-through | Pass-through |

Table 4 depicts an embodiment where commands from the applications and the required responses are separated into four categories and additional types of locks are supported. These locks similarly assign ownership to a single or set of application groups, but the responses for observers can vary. Here, both handle lock and sales are configured to only emulate data but allow control.

It will be apparent that any arbitrary addition, separation, combination, or omission of categories and commands can exist. Further, any number of additional unique types of locks can exist. The categories, commands, and responses are tuned, tested, and set based on the conditions and operating requirements of the equipment, system and application groups; further, these configurations can vary between each application group.

TABLE 5

|  | Application Group 1 | Application Group 2 | Application Group 3 |
| --- | --- | --- | --- |
| Data Collection Commands | | | |
| Status-Authorized | Return Busy | Return Busy | No emulation |
| Status-Busy | Return Busy | Return Busy | Return Busy |
| Status-Stopped | Return Busy | Return Busy | No emulation |
| Status-Sales Pending | Return Busy | Return Idle | Return Busy |
| Status-Offline | Return Busy | Return Busy | No emulation |
| ReadSale | Return 0 | No emulation | No emulation |
| ReadPrice | No emulation | No emulation | No emulation |
| ReadTotal | No emulation | No emulation | No emulation |
| GetReport | No emulation | No emulation | No emulation |
| Controlling Commands | | | |
| Lock | Block, return success | Block, return error | Block, return success |
| Authorize | Block, return success | Block, return error | Block, return success |
| Stop | Block, return success | Block, return error | Pass-through |
| Unlock | Block, return success | Block, return error | Pass-through |
| Unauthorize | Block, return success | Block, return error | Pass-through |
| ClearSale | Block, return success | Block, return error | Block, return success |
| SendPrice | Block, return success | Block, return error | Pass-through |
| SendConfiguration | Block, return success | Block, return error | Pass-through |

Table 5 depicts an example set of configurations for commands and responses in a hypothetical filling station environment. Different application groups may have different responses based on what is required. In this example, Readsale emulation is required for application group 1, but none of the other applications. Controlling commands in application group 1 block the command and emulate a "successful" response while controlling commands in application group 2 block and emulate an "error" response. The third application group has many commands which do not have to be blocked. This is not an exhaustive list of commands and responses, nor is it intended to represent typical responses required, nor does it intend to dictate the format in which these fields are stored. The commands and responses shown above have been arbitrarily selected for demonstration purposes. Actual embodiments have these fields set and tuned according to the requirements of each system, equipment, and applications. Unique emulated response can be configured for different types of locks if required, such as handle lock or sales lock.

TABLE 6

|  | Application Group 1 | Application Group 2 | Application Group 3 |
| --- | --- | --- | --- |
| Data Collection Commands | | | |
| Status-Busy | Return Busy | Return Busy | Return Busy |
| Status-Stopped | Return Busy | No emulation | Return Busy |
| Status-Offline | Return Busy | Return Busy | No emulation |
| ReadSale | Return 0 | No emulation | No emulation |
| GetWashCode | No emulation | No emulation | No emulation |
| GetReport | No emulation | No emulation | No emulation |
| Controlling Commands | | | |
| Start | Block, return success | Block, return fail | Pass-through |
| Stop | Block, return success | Block, return fail | Pass-through |
| Unauthorize/cancel | Block, return success | Block, return fail | Pass-through |
| SendPrice | Block, return success | Block, return fail | Pass-through |
| SendConfiguration | Pass-through | Pass-through | Pass-through |
| ValidateCode | Pass-through | Pass-through | Pass-through |
| DeleteWashCode | Pass-through | Pass-through | Pass-through |

Table 6 depicts an example set of configurations for commands and responses in a hypothetical car wash environment. The commands have been modified to better represent commands and responses in car wash environments, though it is not an exhaustive list, nor is it intended to be a representation of typical responses required, nor does it intend to dictate the format in which these fields are stored. The commands and responses shown above have been arbitrarily selected for demonstration purposes. Actual embodiments have these fields set and tuned according to the requirements of each system, equipment, and application group.

Locking and unlocking are typically triggered by explicitly identified commands sent from the application groups, or by an altered state of the equipment status. Locks triggered by explicitly identified commands can immediately grant ownership to the issuing application group. Locks triggered by equipment statuses use logical techniques or configured settings to assign or determine an owner.

TABLE 7

| Condition | Action |
| --- | --- |
| Locking command intercepted | Lock for issuing application group |
| Equipment busy status = true | Lock for application group 1 |
| Time = 12 pm | Lock for application group 2 |
| Equipment idle status = true | Unlock system |
| Unlocking command intercepted | Unlock system |
| No response from pump for # of seconds | Unlock system |

Table 7 shows an example of several locking and unlocking triggers. Similarly, these conditions are set, tuned, and configured based on the requirements of the system, equipment, and application groups. The "locking command intercepted" condition is the most common locking trigger. In this embodiment, a busy status automatically grants ownership to application group 1, regardless of cause. At 12 pm each day, a lock is granted for application group 2.

TABLE 8

| Condition | Action |
|---|---|
| Locking command intercepted | Lock for issuing application group |
| Equipment status = idle | Unlock system |
| Unlocking command intercepted | Unlock system |
| No response from pump for # of seconds | Unlock system |
| Handle lifted status = true, equipment status = idle | Handle lock for configured application group(s) |
| Handle lock owner hasn't issued locking command in # of seconds | Unlock system |
| Equipment status = sales | Sales lock for configured application group(s) |
| Handle lock owner hasn't issued locking command in # of seconds | Unlock system |

Table 8 illustrates an example embodiment of locking and unlocking triggers with additional conditions for issuing and removing handle lock and sales lock. Handle lock is a type of lock used in filling stations and is issued when a dispenser's handle is lifted but the equipment status is idle; the handle lock gives a "head start" to configured application groups to react by hiding this change from all other application groups for several seconds. A sales lock is issued when the equipment indicates an application group should "claim" the sale, meaning it should be paid through that application group; this gives a "head start" to configured applications by hiding the "equipment status=sales" status from other application groups.

Tables 7 and 8 are not an exhaustive list of conditions and actions which may be used and is depicted for illustrative purposes; It does not intend to dictate what conditions and actions may be or how it may be stored or implemented. The fields shown above have been selected for demonstration purposes. Actual embodiments have these fields set and tuned according to the requirements of each system, equipment, and application group.

TABLE 9

| Locking Commands |
|---|
| Lock |
| Authorize |
| Start |
| Stop |
| Unlocking Commands |
| Unlock |
| Unauthorize |
| Resume |
| Clear |
| EndSale |

Table 9 illustrates examples of controlling commands which may be explicitly identified to be locking or unlocking commands. These commands and identifications are defined and set according the requirements of the systems affected; this list is not meant to be exhaustive or define a minimum of required commands. Locking or unlocking commands may vary between application groups.

A partial set of functions suitable for implementing the above-identified embodiments is now described. These functions are provided for instruction and as an example, and not by way of limitation. It is to be understood that these functions represents an algorithm for implementing the bridging circuit and/or control system.

| Analyze packet |
|---|
| Input: (string packet)<br>Output: (int commandtype, int equipmentid, int protocolid, int RxEmulatorID)<br>This function analyzes the received packet according to the protocol and issuing application group, looking up from list of known packet formats and returning the type of command the packet contains. Typical types are data collection commands (status, price packet, sales packet, total packet), controlling commands (lock acquiring type, lock releasing type), or unknown, unrelated, or unneeded commands. If applicable, it determines which piece of equipment the command was destined for; this could be a single piece, none/unknown, or all pieces of equipment. |

| Get cached data |
|---|
| Input: (string command, int equipmentid)<br>Output: (string cachedata)<br>This function looks up the cached response's result from the runtime cache memory |

| Update cache |
|---|
| Input: (string command, int equipmentid, string cachedata)<br>Output: (void)<br>This function updates its runtime cache memory using the command packet sent and its responded result. If a matching cached result does not exist, or if the result does not match the previously stored value, the counter is set to 1. Otherwise, the matching cache entry will have its counter incremented by 1. An OK flag and time stamp are then set for the cached entry. |

| Emulation |
|---|
| Input: (string command, int emulatetype, int protocolid, int RxEmulatorID)<br>Output: (string emulatedresponse)<br>This function looks up the appropriate emulation result from list of preconfigured results for the issuing application group and protocol. It formats the response according to the protocol and returns the emulated response |

| Block |
|---|
| Input: (string command, int emulatetype, int protocolid, int RxEmulatorID)<br>Output: (void)<br>This function blocks the command so it is not sent to the equipment. |

| Lock |
|---|
| Input: (int equipmentid, int RxEmulatorID, int locktype)<br>Output: (void)<br>This function sets the Lock status for a piece of equipment in its runtime memory for a specified application group. If the type of lock is specified, it also sets the type of lock. Locks are internally managed memory objects and managed for each piece of equipment. |

Unlock

Input: (int equipmentid)
Output: (void)
This function clears the lock status in its runtime memory for the specified piece of equipment. Locks are internally managed memory objects.

Collect data and maintain cache

Input: (int protocolid, int equipmentid)
Output: (void)
This function issues a sequence of commands in a timed interval, according to specific protocol, from a list of preconfigured commands and parameters (frequency, time interval). At runtime, it also captures and monitors responses from all known and unknown pass-through commands for frequency and intervals. Not all commands are executed during each polling cycle, rather only those that meet the frequency and interval criteria, or when a cache data flag is reset. This function also checks and captures events sent from the equipment, if applicable. Cached data is maintained both globally and for pieces of equipment.
The cache is maintained during each poll cycle as well; a counter and time stamp is kept for each command, both executed or not executed. For each command not executed, it checks if the timer and counter is outside a configured range and resets the cache data flag if it is. Status changes for each piece of equipment are checked as well, according to protocol. Certain status changes, set based on configured parameters, will reset the cache data flag.

Delay

Input: (int millisecond)
Output: (void)
This function pauses the current process for the number of milliseconds specified. Under multitasking environments like Windows, Linux or RTOS (real-time OS) in embedded environment, this delay function also sets current process to "sleep", thus yielding execution to other tasks . . . Under non-multitasking environments, where application or "pseudo" multitasking methods are used, this function can yield or switch to other tasks.

Send via packet switching

Input: (string commandpacket, int protocolid)
Output: (string responsepacket)
This function sends the command packet to the equipment. In the presented embodiments, there is only one Tx controller communication channel which is shared; thus, only one request-response command can be executed at any given time. All commands sent to the equipment, including commands from the Rx emulators and polling from the Tx controller, go through packet switching. Under true multitasking OS environments, the process lock methods are used to prevent concurrent processes from executing. Many equipment protocols require timed pause intervals between each command, configured according to protocols. When the required pause time is not reached, the Delay function is called.

Translation

Input: (string packetdata, int fromprotocolid, int toprotocolid)
Output: (string newpacketdata, int IsSuccess)
This function translates the packet data from one protocol or command to another by lookup from list of known commands.

Translation

For a successful translation, both commands must be known. When it cannot be translated, the system can be configured to change the command to a known command, such as a status request command, or block and emulate a response, such as error.

Example embodiments for controlling a bridge are now discussed. The control of a bridge circuit is, in one implementation, provided in a control module that implements the logic shown, e.g., in Tables 1-9, and the logic of the preceding example function calls.

Figure 35:
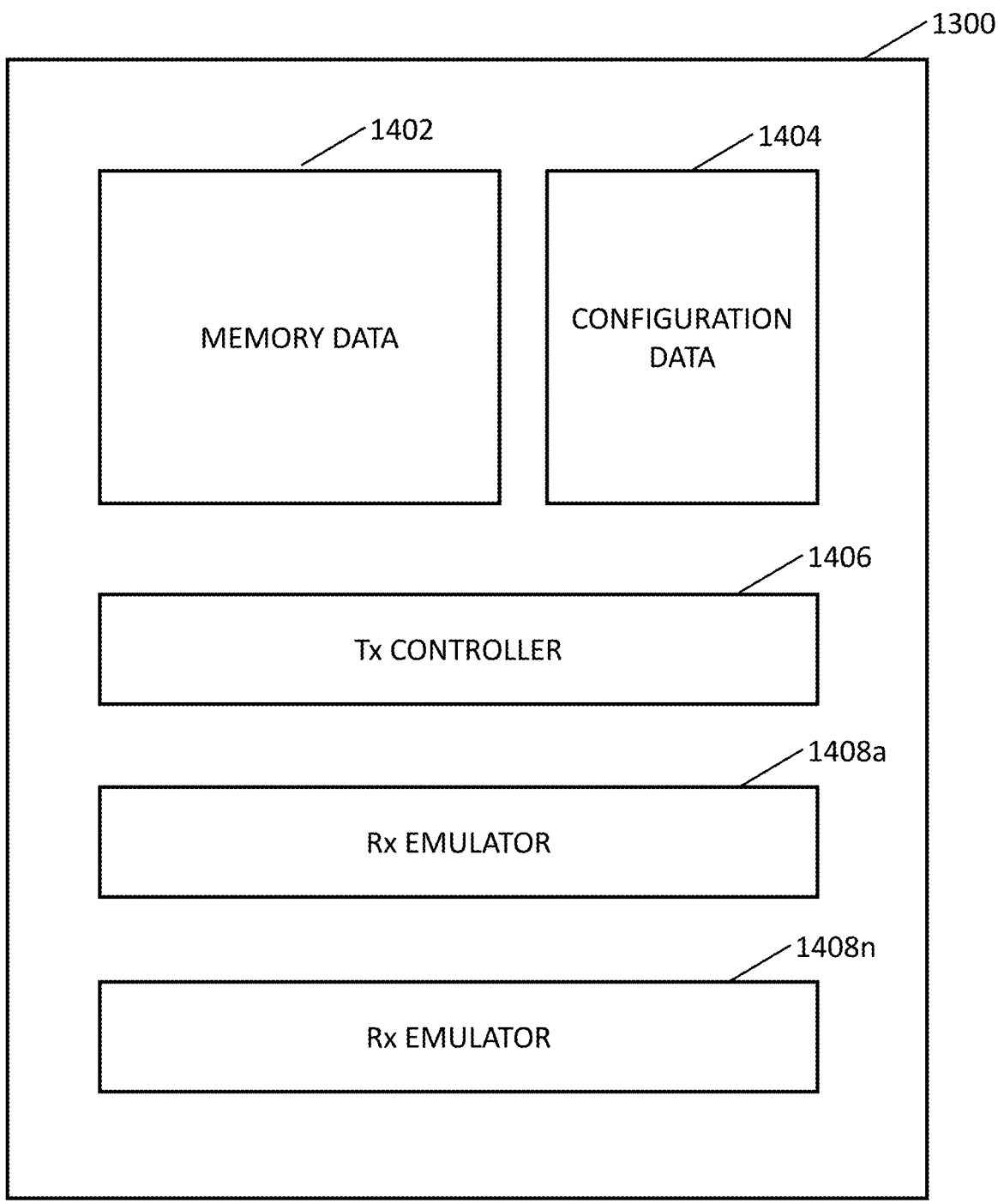
FIG. 35 depicts an embodiment's software architecture for serial connections.

FIG. 35 depicts an embodiment's software architecture for a serial connection. The configuration data 1404 are the preconfigured values and fields set and tuned for the system, equipment, and application groups. The memory data 1402 represents the runtime memory. The Tx controller 1406 is a process which handles communications to the equipment end, and Rx emulators 1408a . . . 1408n are each a process which handle communications with a single application group. These processes are typically concurrent processes on a multitasking computing device. Alternate embodiments may have them implemented as a single process or with code based multitasking.

Figure 36:
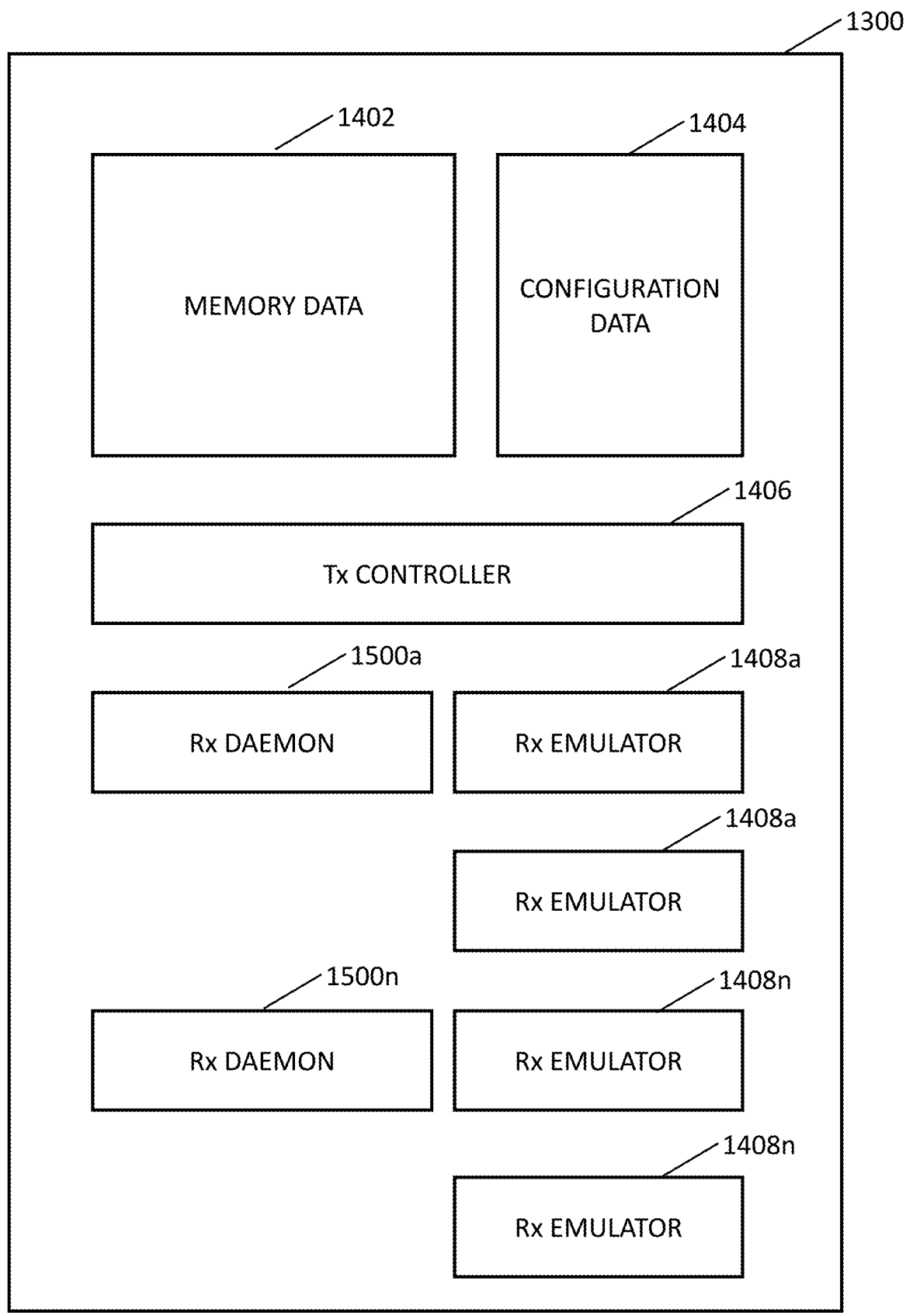
FIG. 36 depicts an embodiment's software architecture for TCP/IP connections.

FIG. 36 depicts an embodiment's software architecture for a TCP/IP connection. A single physical TCP/IP channel can be separated into multiple concurrent virtual communications channels. A Rx Daemon 1500a . . . 1500n is a background process which dynamically spawns instances of Rx emulators 1408a . . . 1408n as communications are established; here, the Rx emulators 1408a . . . 1408n will not exist until they are spawned by the Rx Daemon 1500a . . . 1500n.

Figure 37:
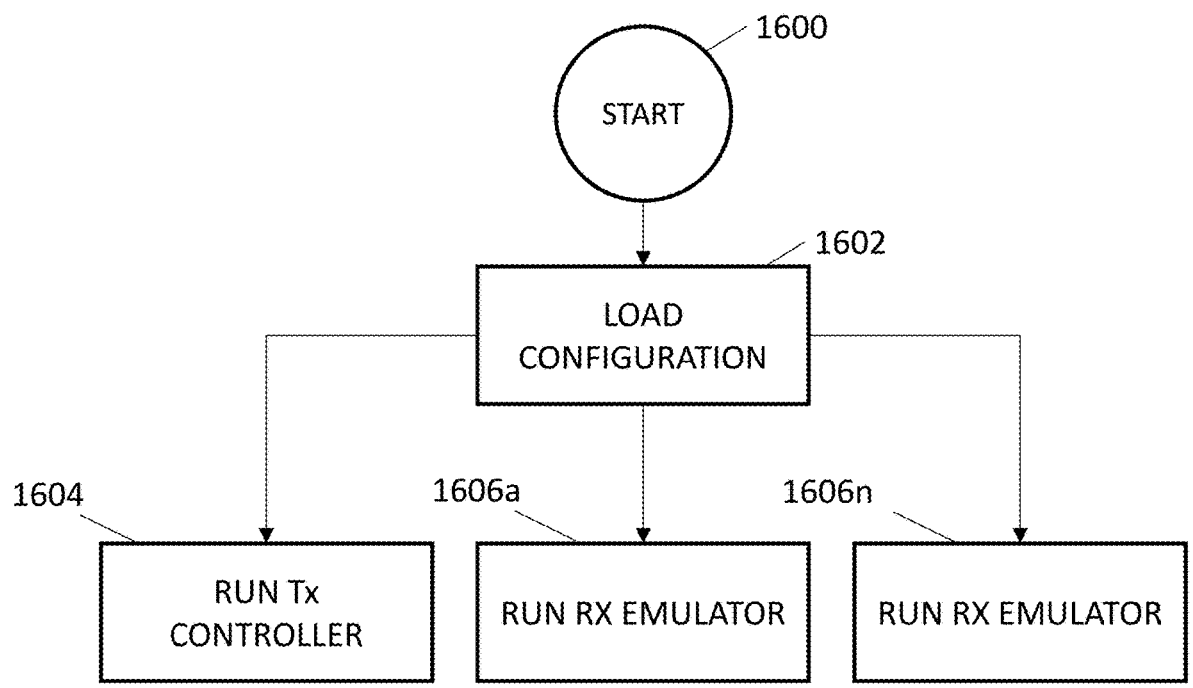
FIG. 37 depicts the initialization of the software for a serial connection.

FIG. 37 depicts the initialization of the embodiment presented in FIG. 35. After the programs start 1600, step 1602 loads any required configurations, parameters and data from non-volatile storage into runtime memory. Step 1602 creates and runs the Tx controller process. Step 1606a . . . 1606n creates an Rx emulator 1408a . . . 1408n immediately for each application end 1304a . . . 1304n.

Figure 38:
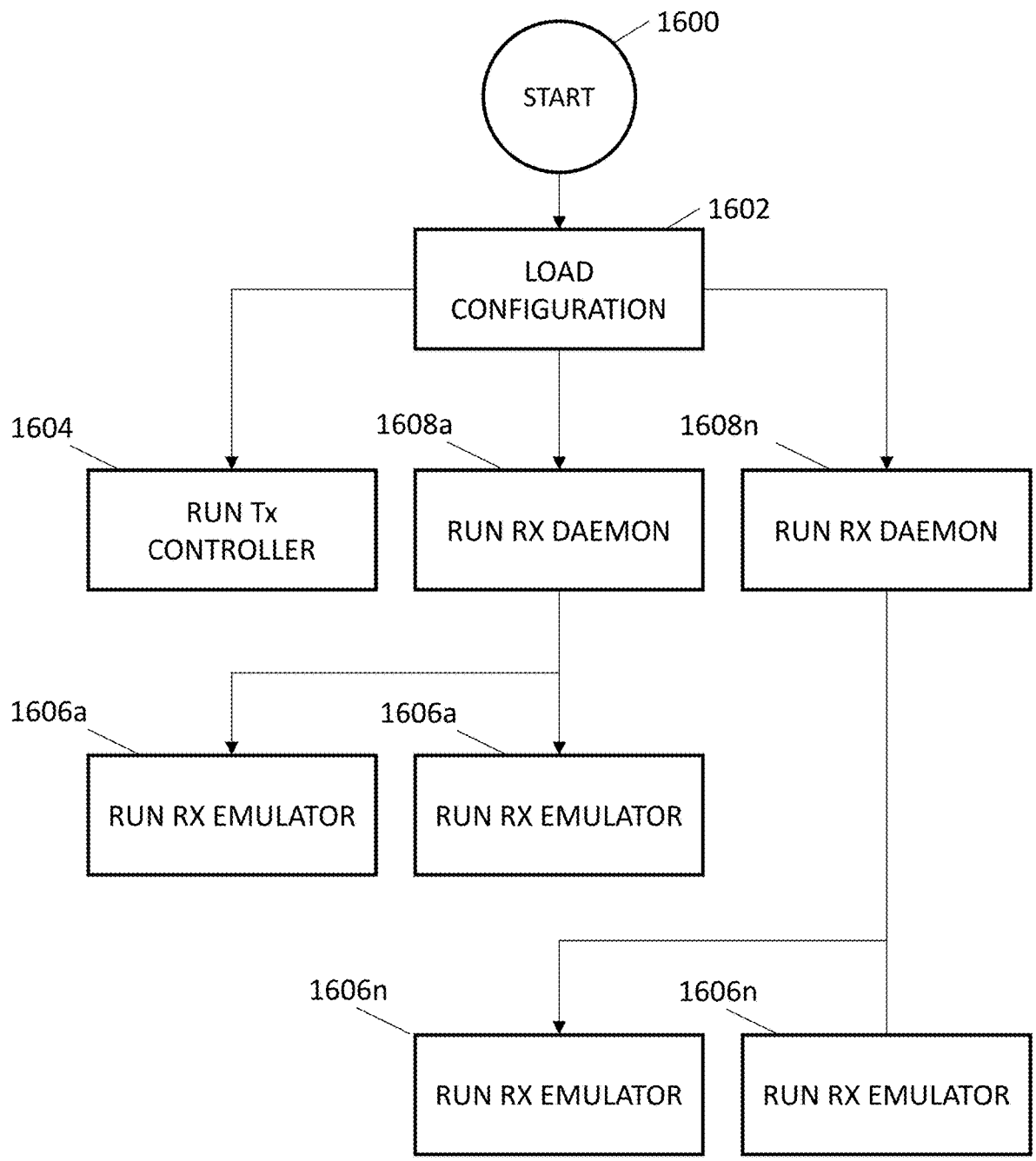
FIG. 38 depicts the initialization of the software for a TCP/IP connection.

FIG. 38 depicts the initialization of the embodiment presented in FIG. 36, where communications are through TCP/IP. In this embodiment, step 1608a . . . 1608n creates and runs an Rx Daemon 1500a . . . 1500n for each application end 1304a . . . 1304n. These Rx Daemons dynamically spawn and runs instances of Rx emulators 1408a . . . 1408n as connections are established. This can be one for each application group, or one for each application. This does not change the functionality of the system.

Figure 39:
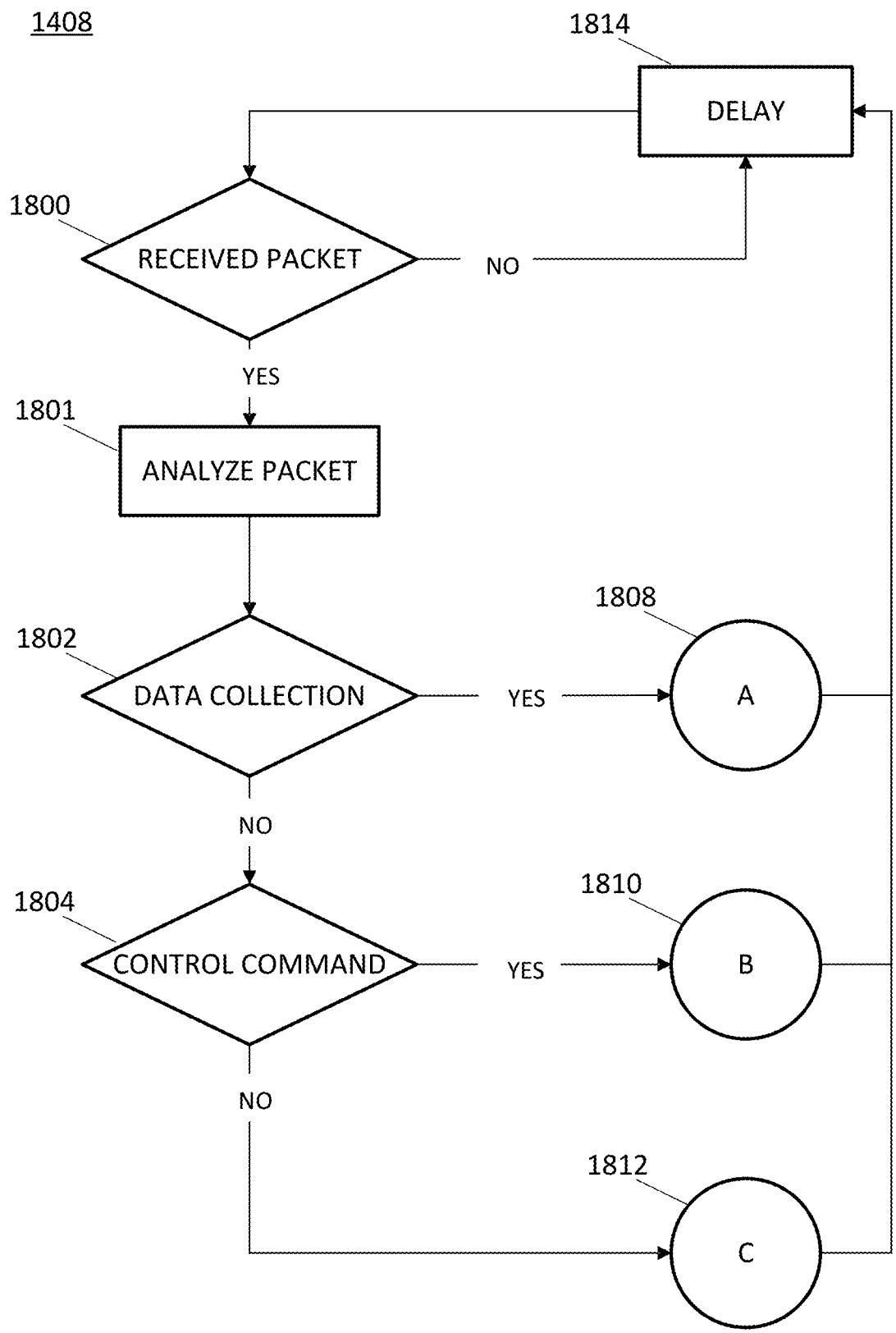
FIG. 39 depicts an embodiment of the Rx emulator process.
Figure 40:
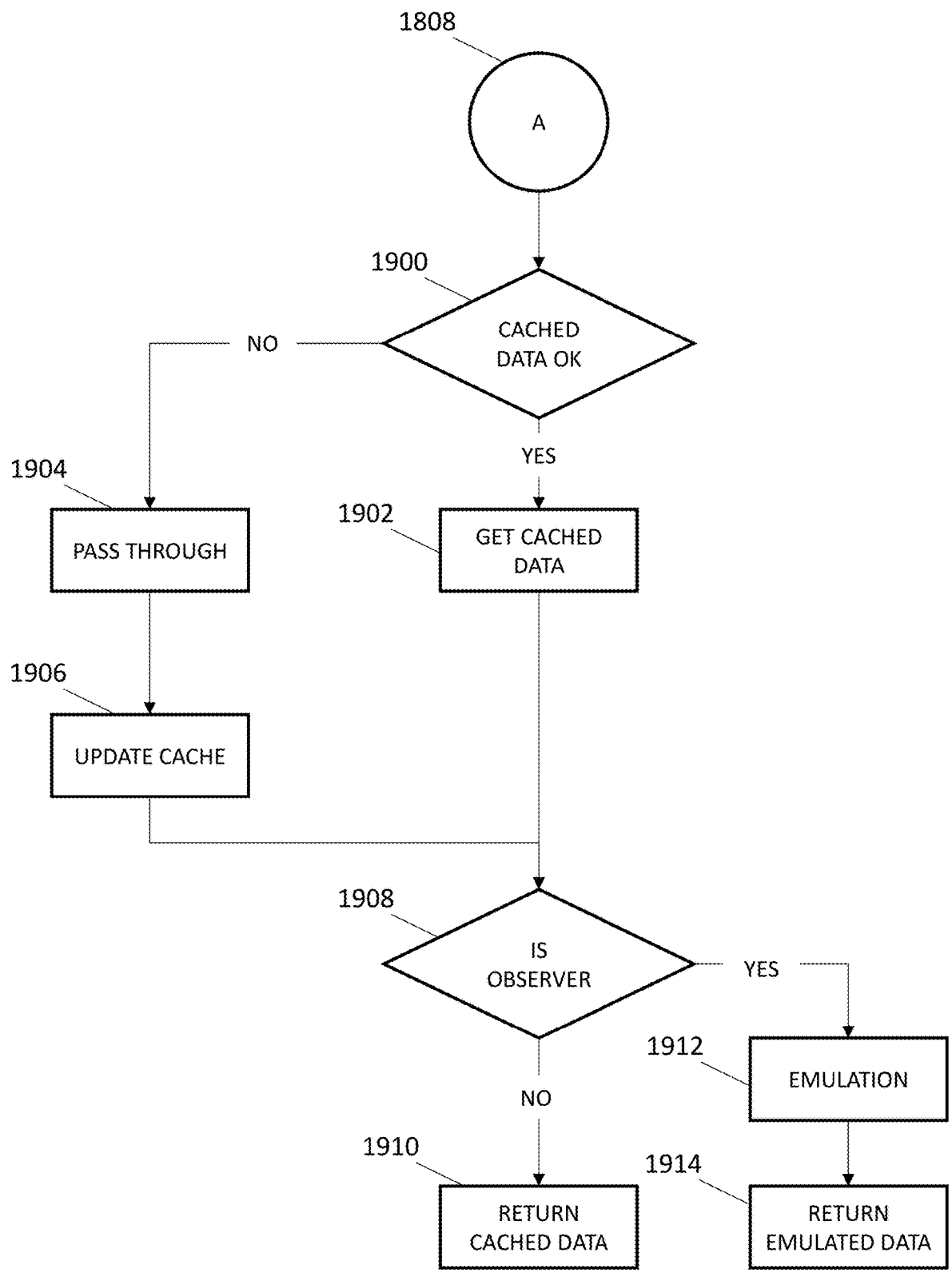
FIG. 40 depicts an embodiment for a function processing a data collection command.
Figure 41:
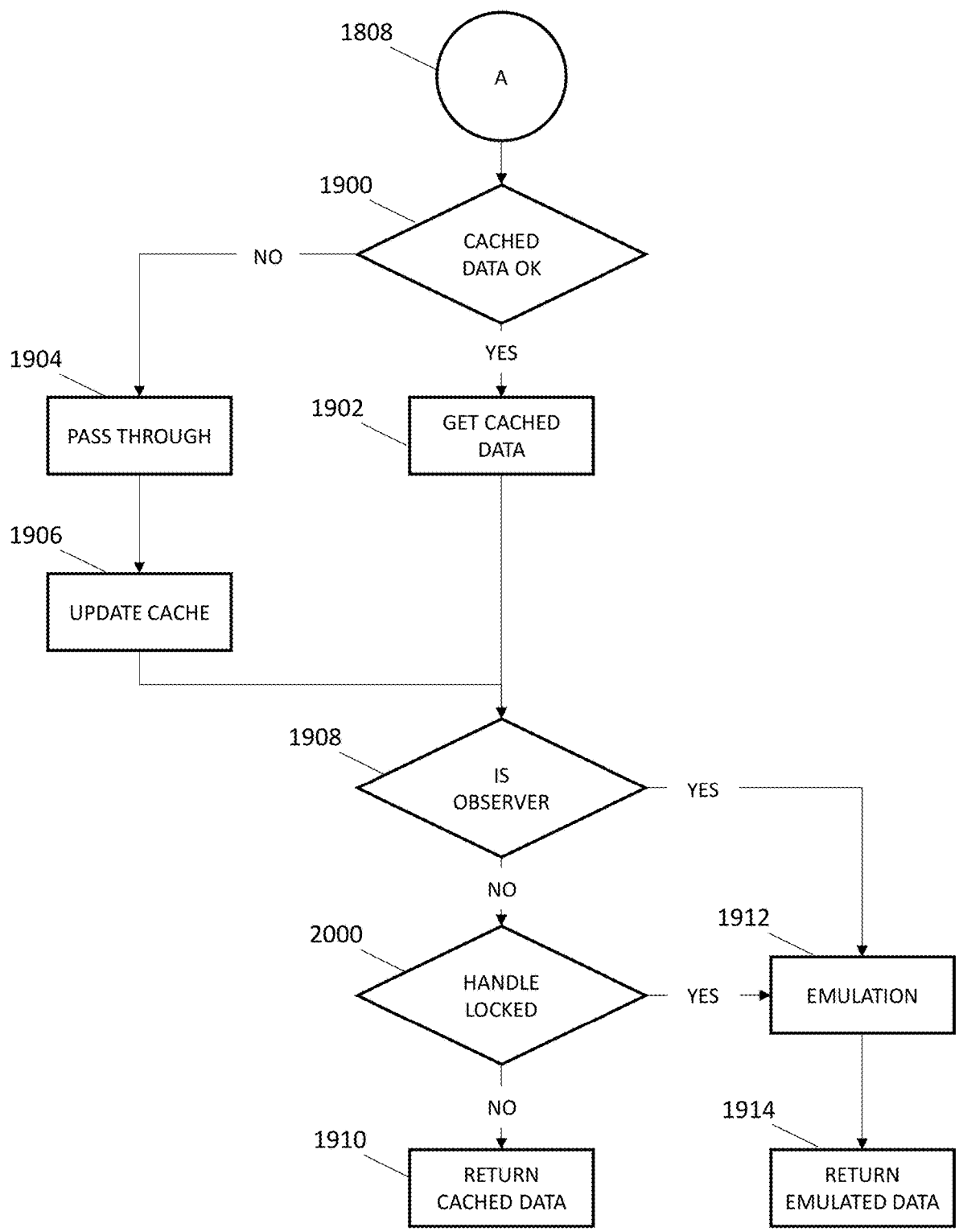
FIG. 41 depicts an embodiment for a function processing a data collection command with handle lock functionality.
Figure 42:
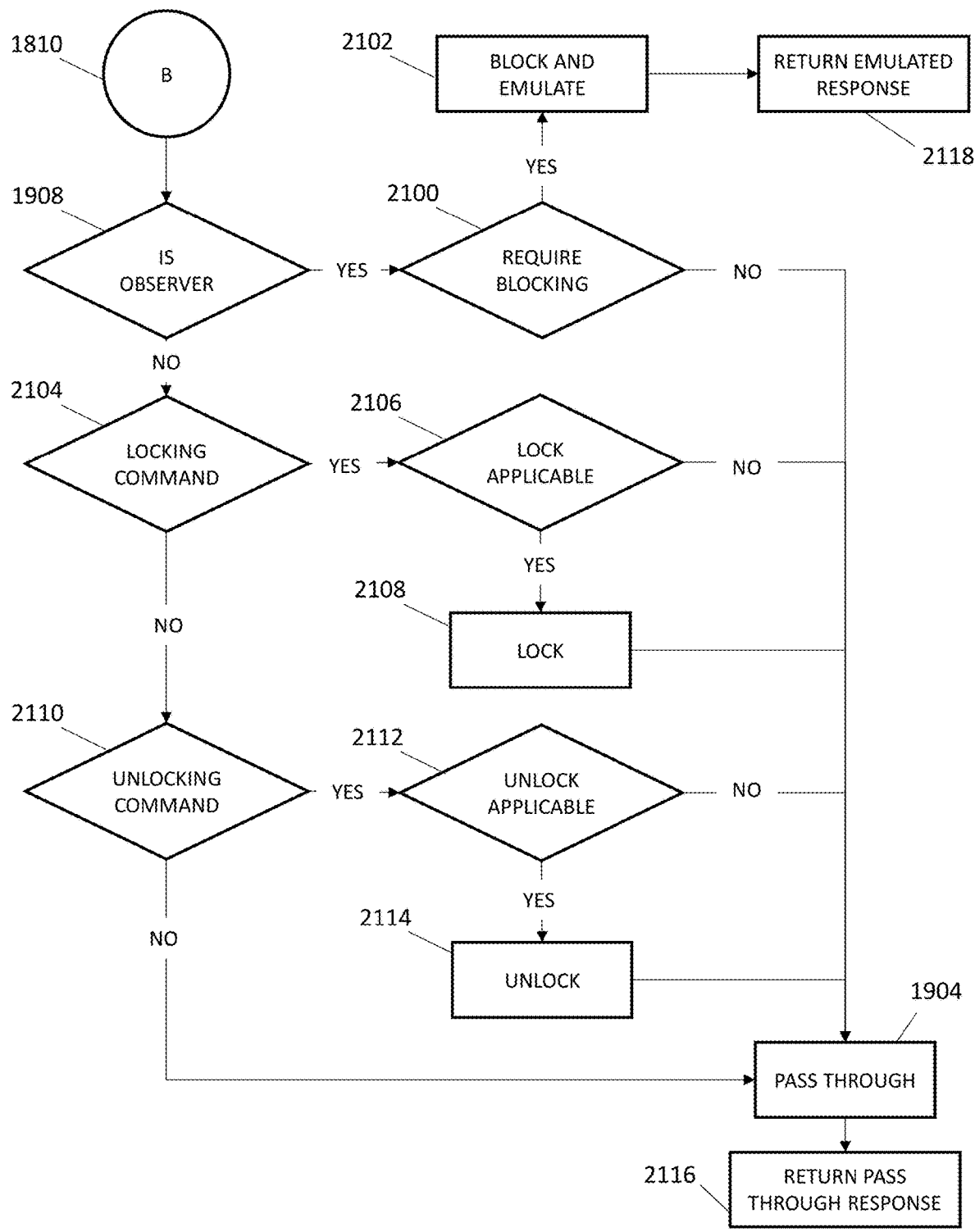
FIG. 42 depicts an embodiment of a function processing a controlling command.
Figure 43:
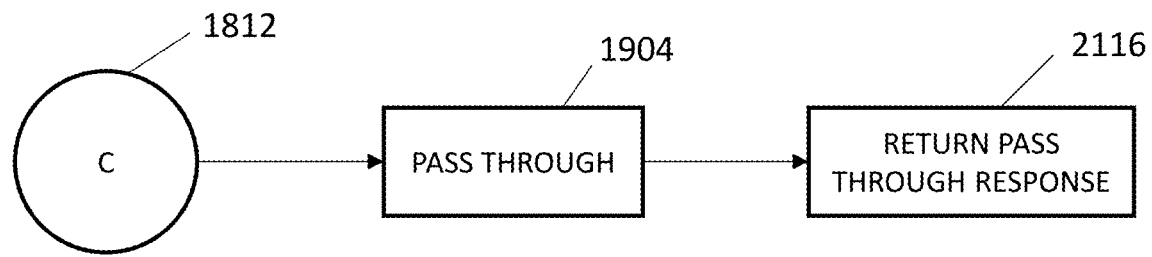
FIG. 43 depicts an embodiment of a function processing an "other" or unknown command.
Figure 44:
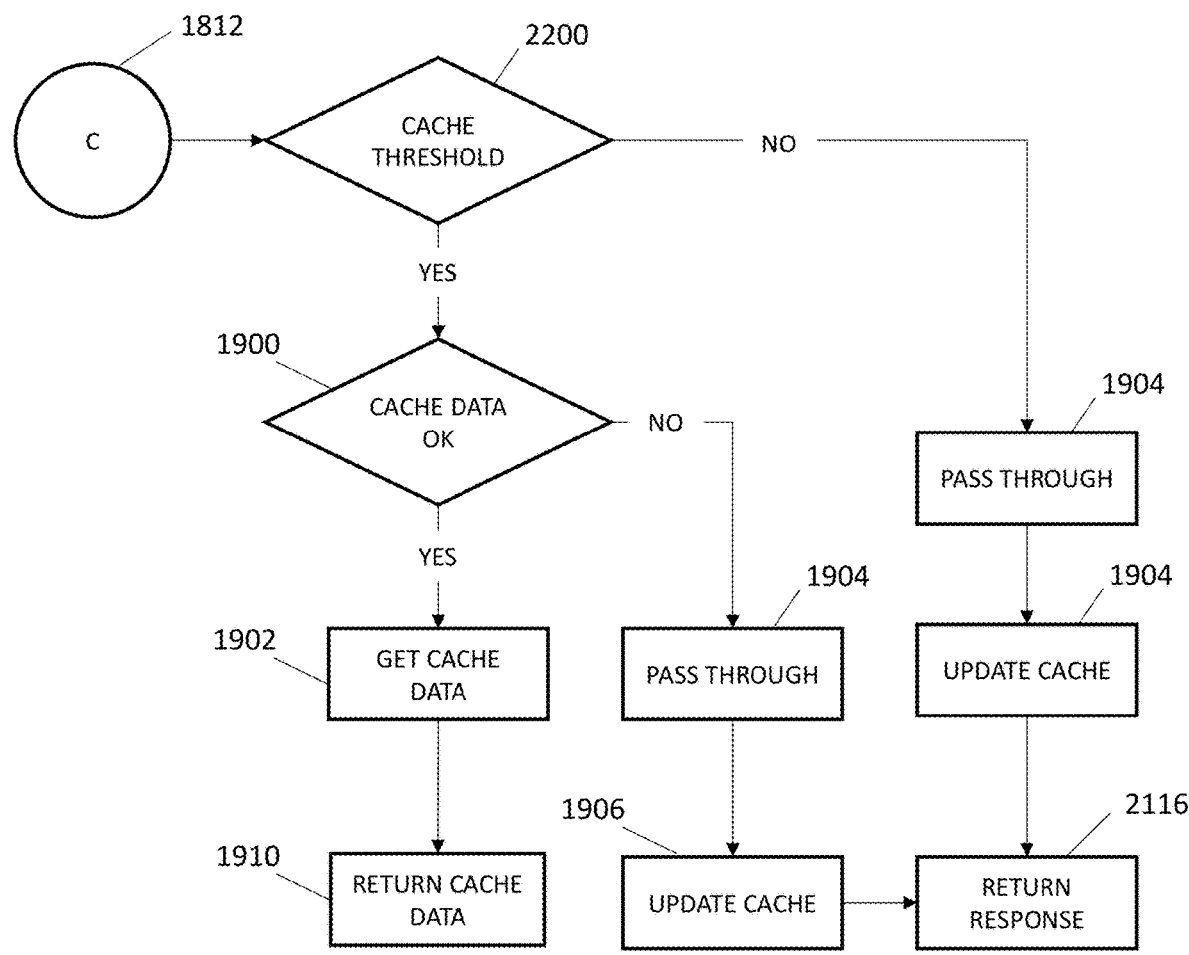
FIG. 44 depicts an embodiment of a function processing an "other" or unknown command.

FIG. 39 depicts an embodiment of the Rx emulator 1408 process. Step 1800 checks if a packet has been received. Step 1801 interprets and analyzes the packet for any required information. Step 1802 checks if it is a data collection command. Step 1808 is the function which processes a data collection command; embodiments of step 1808 are depicted in FIG. 40 and FIG. 41. Step 1804 checks if it is a control command. Step 1810 is the function which processes a control command; an embodiment of step 1810 is depicted in FIG. 42. Step 1812 is function which processes an "other" or unknown command; embodiments of step 1812 are shown in FIG. 43 and FIG. 44. Step 1814 is a delay.

FIG. 40 depicts an embodiment of a function which processes a data collection command 1808. Step 1900 checks the corresponding cached data for the command and determines if it is applicable, such as checking time since last update, flags, and counters. If so, step 1902 retrieves a cached response. If not, step 1904 passes the command through to the equipment and step 1906 updates the cache with the returned value. Step 1908 checks if the issuing application is an observer; this being if the piece of equipment is locked by a different application group. Step 1910 returns the cached data which was retrieved. Step 1912 performs emulation, modifying the data according to the configured requirements. Step 1914 returns the emulated data.

FIG. 41 depicts an embodiment of a function which processes a data collection command 1808 where an additional type of lock, handle lock, is used. Step 2000 here checks if the piece of equipment is handle locked by a different application group. This is typically combined with step 1908 but is shown separately here for illustrative purposes.

FIG. 42 depicts an embodiment of a function which processes a controlling command 1810. The process first checks if the equipment the controlling command was issued to is owned by a different application group 1908. If so, step 2100 checks if the command requires blocking. Step 2102 blocks the command and creates an emulated response according to configured values. Step 2118 returns this emulated response. Step 2104 checks if the command is a locking command. If so, step 2106 checks if issuing a lock is allowed or applicable, based on configured settings for each piece of equipment; this typically based on equipment status. Step 2108 issues a lock for the application group which sent the command. Step 2110 checks if the command is identified as an unlocking command. If so, step 2112 checks if unlocking is allowed or applicable, based on configured settings for each piece of equipment; this typically based on equipment status. Step 2114 unlocks the piece of equipment. Step 2116 returns the response from the pass-through.

FIG. 43 depicts an embodiment of a function which processes an "other" or unknown command 1812. In this embodiment, the command is simply passed through 1904 and the response from the pass-through is returned 2116. FIG. 44 depicts an embodiment of the response to an "other" or unknown command where caching is used. Step 2200 checks if this unknown or "other" command meets the threshold to be considered a data collection command. If so, the command is added to the cache so that it will be collected and it can return cached data. Alternate embodiments may not support the functionality for adding unknown commands to the cache.

Figure 45:
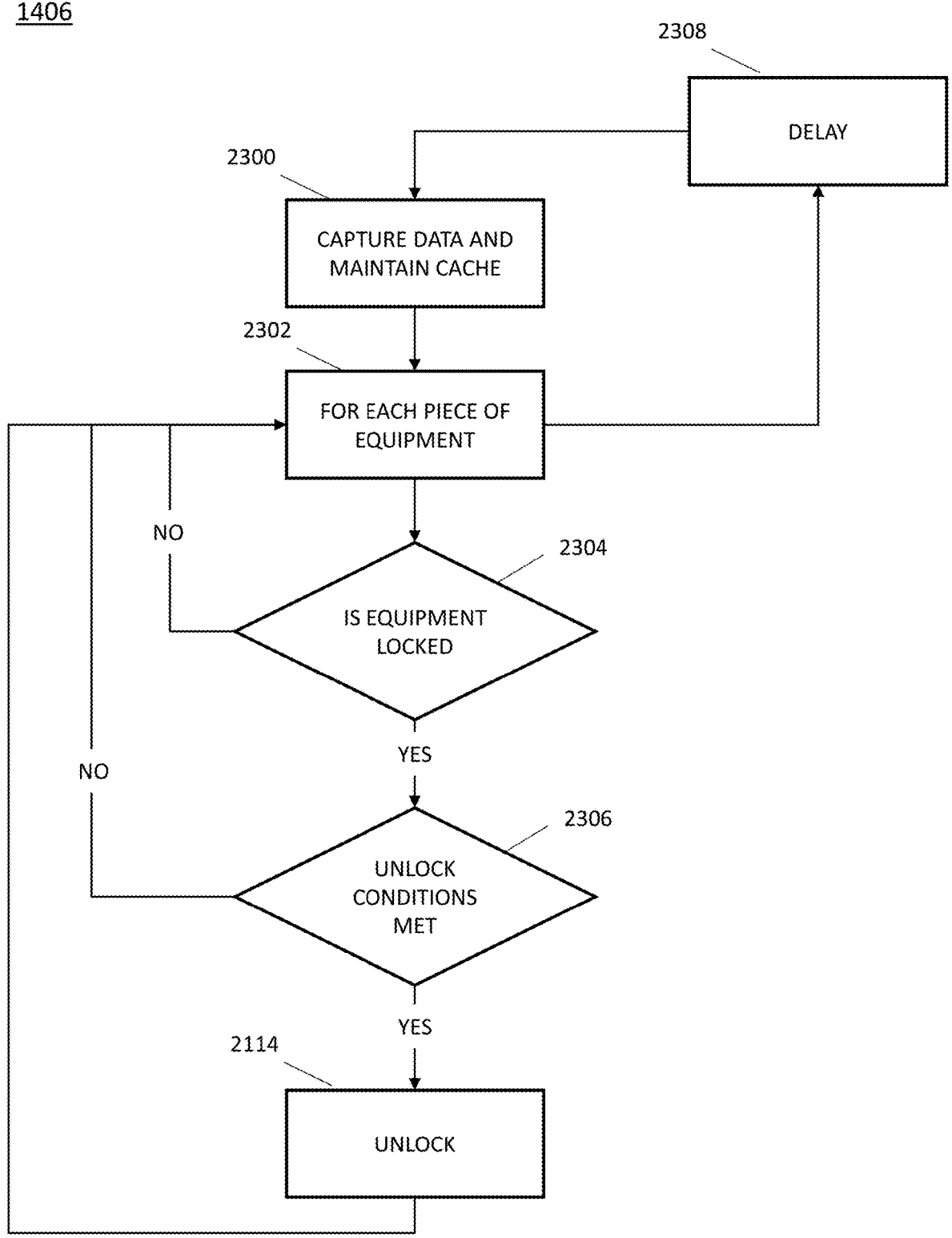
FIG. 45 depicts an embodiment of the Tx controller process.

FIG. 45 depicts an embodiment of the Tx controller process 1406. Step 2300 captures and maintains the cache, typically polling cached data or intercepting events. Packet switching is used for all information sent to and from the equipment in this step. Step 2302 is a loop which loops for each piece of equipment. For each piece of equipment, step 2304 checks if that piece of equipment is locked. Step 2306 checks if unlocking conditions are met; if so that piece of equipment is unlocked 2114. Step 2308 is a delay for the Tx controller.

Figure 46:
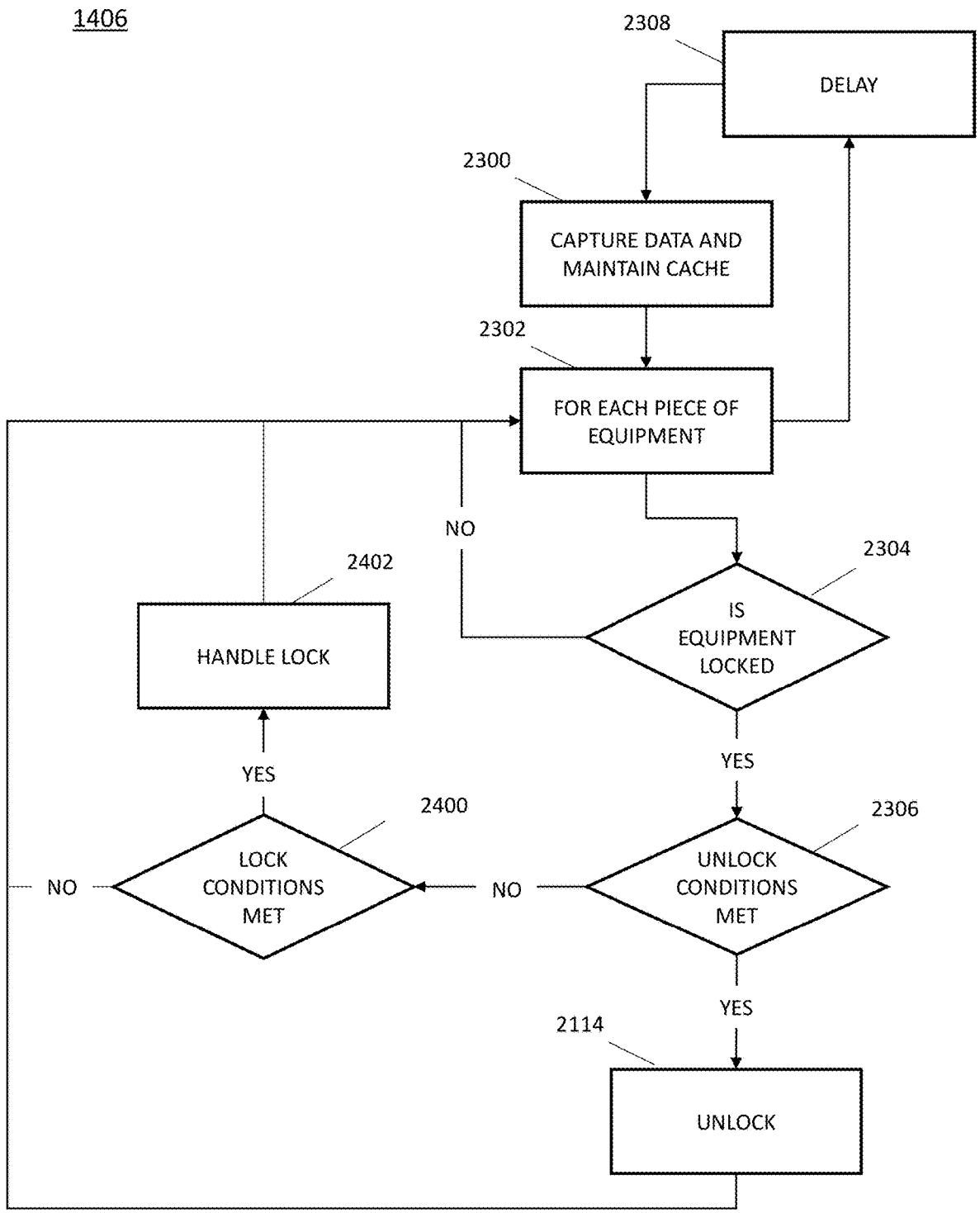
FIG. 46 depicts an embodiment of the Tx controller process with handle lock functionality.

FIG. 46 depicts an embodiment of the Tx controller process 2406 where equipment status based locks are checked. Step 2400 checks if any of the equipment status based lock conditions are met, in this embodiment this only the handle lock conditions; alternate embodiments may have other equipment status based locks such as sales lock. Step 2402 issues the handle lock.

Figure 47:
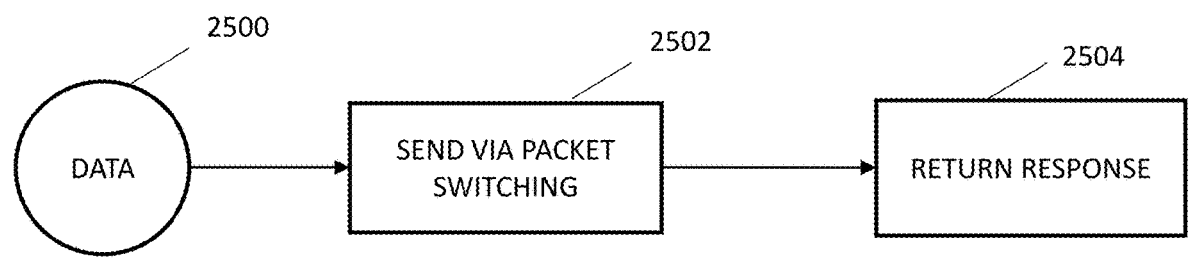
FIG. 47 depicts an embodiment of the pass-through function.
Figure 48:
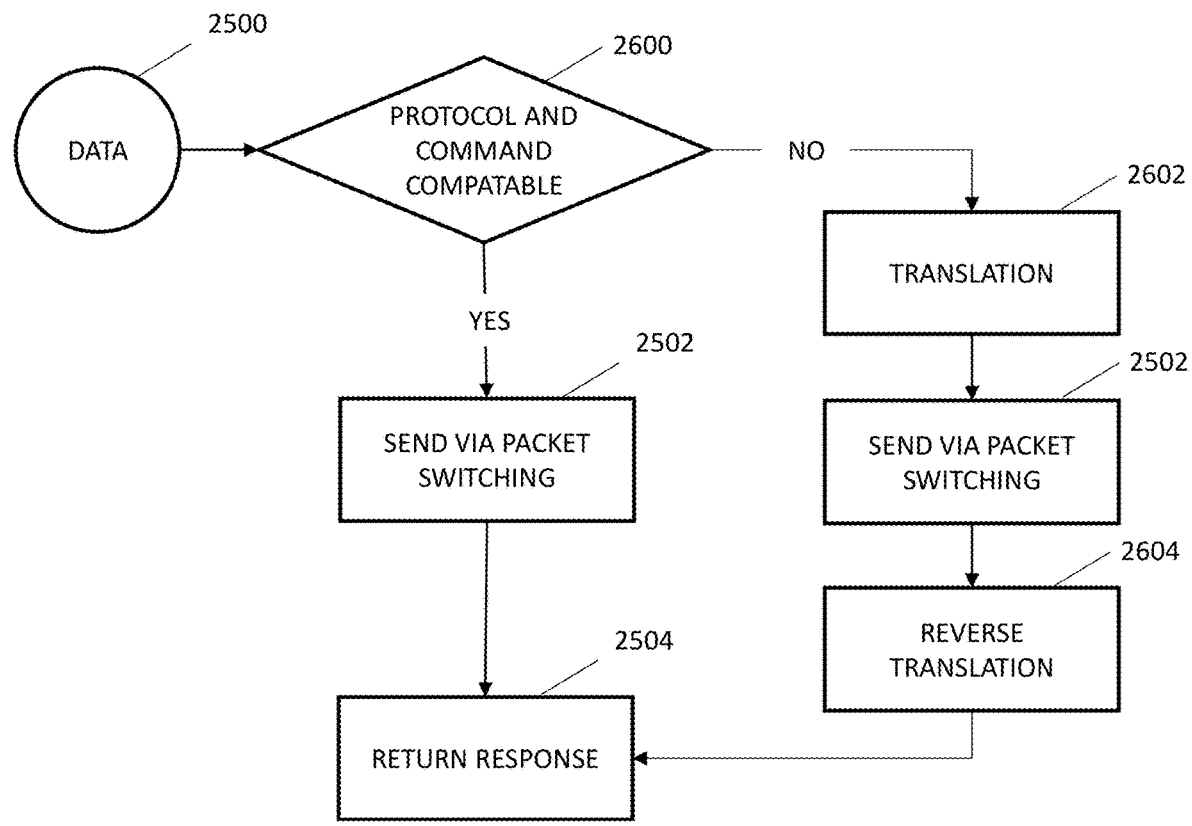
FIG. 48 depicts an embodiment of the pass-through function where translation is supported.

FIG. 47 depicts an embodiment of the pass-through function 2500. Step 2502 uses packet switching the send the command to the equipment, and step 2504 returns the response from the equipment. FIG. 48 depicts an embodiment of the pass-through function 2500 where translation is supported; translation is used when application end and equipment end protocols do not match. Step 2600 checks if the commands and protocols at each end are compatible. Step 2602 translates from the application end protocol to the equipment end protocol. Step 2604 translates the response from equipment end protocol to the application end protocol.

Figure 49:
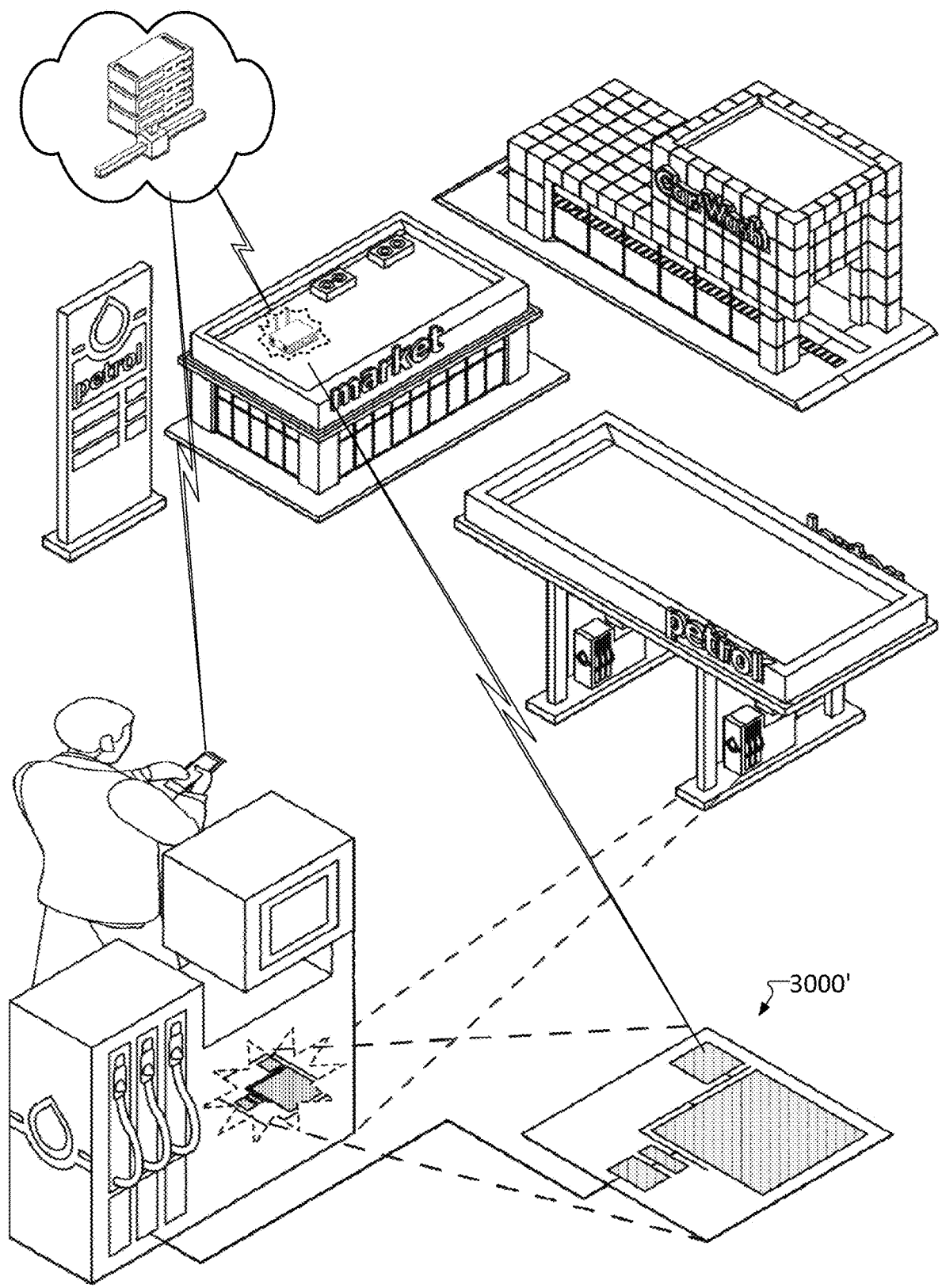
FIG. 49 shows, in highly schematic form, a further embodiment of a bridging circuit and control system for the automatic control of fluid dispensers, article dispensers, and related systems.

FIG. 49 depicts a variation of bridging circuit 3000. In-equipment circuit 3000' communicates with multiple equipped devices. In this implementation, the circuit 3000' is an in-pump circuit that communicates downstream with a double sided pump with two dispensers, each with three nozzles. As with the other embodiments, the circuit 3000' has a hardware processor that is adapted with suitable machine code to interact with the dispensers, and to communicate upstream via a network device. The network device shown in this figure is a wireless adapter but a wired connection is used in another implementation. The upstream communications with one or more applications take place over a network such as the Internet, as depicted by the servers shown in a cloud symbol. The functionality of the forecourt controller, in one implementation, is handled in software.

A user of a mobile device, shown adjacent the pump, uses the mobile device to control the application or applications to perform actions with respect to the equipment.

For example, an authorized user remotely changes the price-per-gallon of one of the fluids dispensed from a dispenser or obtains reports pertaining to one or all of the dispensers.

In another example, a customer uses an application of the petrol station to pay for fuel to be dispensed, to use reward points in lieu of payment for fuel to be dispensed, or to perform an authentication that the dispensing of the fuel is an authorized operation.

Although the figure shows the user of the mobile device adjacent the pump, the authorized user remotely performs actions with respect to the equipment from any location.

Although the figure shows the user of the mobile device as a customer that is not inside a vehicle, the customer in another example is inside a vehicle. For instance, the customer's interaction with the car wash in the figure takes place, in one example implementation, without requiring the customer to touch or otherwise physically interact with any physical payment terminal.

Numerous variations of the foregoing example embodiments will occur to those familiar with this field. Such variations are within the scope and spirit of the invention.

There is claimed:

1. A bridging circuit comprising:
  a hardware processor, configured to perform a predetermined set of basic operations in response to receiving a corresponding basic instruction, the corresponding basic instruction being one of a plurality of machine codes defining a predetermined native instruction set for the hardware processor;
  a memory under control of the hardware processor;
  a first application end interface and a second application end interface defining a plurality of application end interfaces, under control of the hardware processor;
  one or more upstream communication modules, configured to enable the hardware processor to communicate via the plurality of application end interfaces, and comprising a first set of the plurality of machine codes;
an equipment end interface under control of the hardware processor;
a downstream communication module comprising a second set of the plurality of machine codes, configured to enable the hardware processor to communicate via the equipment end interface; and
a control module comprising a third set of the plurality of machine codes, configured to enable the hardware processor to implement a lock state so that:
one of the plurality of application end interfaces is indicated as an owner, and
an instruction is blocked from being communicated via the equipment end interface in response to determining that input has been received via one of the plurality of application end interfaces that is not indicated as the owner;
wherein the memory stores the first set of the plurality of machine codes, the second set of the plurality of machine codes, and the third set of the plurality of machine codes,
wherein the plurality of application end interfaces are configured to receive commands,
wherein the memory further stores a configuration indicating predesignated actions for the, and
wherein the control module is further configured by the third set of the plurality of machine codes to use the configuration to determine one of the predesignated actions based on a received one of the commands.

2. The bridging circuit of claim 1, wherein the one of the predesignated actions comprises one of:
emulating a response to the received one of the commands without sending a corresponding communication to the equipment end interface;
replying to the received one of the commands with cached data; and
not responding to the received one of the commands.

3. The bridging circuit of claim 1, wherein the first application end interface includes one of a current loop circuit, an RS485 module, and an RS422 module, and
wherein the second application end interface includes one of a wireless communication circuit and an Ethernet communication circuit.

4. The bridging circuit of claim 1, wherein the one or more upstream communication modules and the downstream communication module are implemented as a single interface module configured to communicate with a network device.

5. A control system comprising:
a first application configured to communicate with an equipped device;
a bridge interposed between the first application and the equipped device; and
a second application configured to communicate with the equipped device via the bridge,
wherein the first application and the second application define a plurality of applications,
wherein the bridge is configured to implement a lock state so that one of the plurality of applications is an owner of the equipped device,
wherein the bridge is configured to prevent a command determined to have been communicated from one of the plurality of applications, other than the owner of the equipped device, from communication to the equipped device,
wherein the control system further comprises:
a controller adapted to enable communication between the first application and the equipped device;
wherein the controller is configured to communicate with the first application in accordance with a first communication protocol,
wherein the controller is configured to communicate with the equipped device in accordance with a device communication protocol different from the first communication protocol,
wherein the controller is configured to perform a conversion between the first communication protocol and the device communication protocol,
wherein the bridge is interposed between the controller and the equipped device, and
wherein the bridge is configured to communicate with the equipped device in accordance with the device communication protocol.

6. A control system comprising:
a first application configured to communicate with an equipped device;
a bridge interposed between the first application and the equipped device; and
a second application configured to communicate with the equipped device via the bridge,
wherein the first application and the second application define a plurality of applications,
wherein the bridge is configured to implement a lock state so that one of the plurality of applications is an owner of the equipped device,
wherein the bridge is configured to prevent a command determined to have been communicated from one of the plurality of applications, other than the owner of the equipped device, from communication to the equipped device,
wherein the control system further comprises:
a controller adapted to enable communication between the first application and the equipped device;
wherein the controller is configured to communicate with the first application in accordance with a first communication protocol,
wherein the controller is configured to communicate with the equipped device in accordance with a device communication protocol different from the first communication protocol,
wherein the controller is configured to perform a conversion between the first communication protocol and the device communication protocol,
wherein the bridge is interposed between the first application and the controller, and
wherein the bridge is configured to communicate with the controller in accordance with the first communication protocol.

7. A control system comprising:
a first application configured to communicate with an equipped device;
a bridge interposed between the first application and the equipped device; and
a second application configured to communicate with the equipped device via the bridge,
wherein the first application and the second application define a plurality of applications,
wherein the bridge is configured to implement a lock state so that one of the plurality of applications is an owner of the equipped device,
wherein the bridge is configured to prevent a command determined to have been communicated from one of the plurality of applications, other than the owner of the equipped device, from communication to the equipped device,
wherein the plurality of applications are configured to output downstream communications,
wherein at least one of the plurality of applications is configured to generate outputs in accordance with a first communication protocol,
wherein the equipped device is configured to output upstream communications in accordance with a device communication protocol different from the first communication protocol,
wherein the bridge is configured to intercept the downstream communications and the upstream communications, and
wherein the bridge is configured to perform a conversion between the first communication protocol and the device communication protocol.

8. The control system of claim 7, wherein the first application and the second application are configured to run on a same computer system.

9. The control system of claim 8, wherein the bridge is also configured to run on the same computer system.

10. A bridging method comprising:
separating a first application from an equipped device by interposing a bridge;
intercepting, with the bridge, downstream communications to the equipped device from the first application;
using the bridge, accepting downstream communications to the equipped device from a second application;
with the bridge, designating one of the first application and the second application as an owner;
implementing a lock state prohibiting control of the equipped device by an equipped device other than the owner;
configuring the bridge to receive commands;
configuring the bridge with a stored configuration indicating predesignated actions for the commands; and
using the configuration to take one of the predesignated actions based on a received one of the commands,
wherein the one of the predesignated actions comprises one of:
emulating a response to the received one of the commands without sending a corresponding communication to the equipped device;
replying to the received one of the commands with cached data; and
not responding to the received one of the commands.

11. An equipment apparatus, comprising:
one or more dispensers disposed at least partially in a housing; and
a bridge circuit disposed at least partially in the housing;
wherein the bridge circuit comprises:
a hardware processor, configured to perform a predetermined set of basic operations in response to receiving a corresponding basic instruction, the corresponding basic instruction being one of a plurality of machine codes defining a predetermined native instruction set for the hardware processor;
a memory under control of the hardware processor;
an application end interface under control of the hardware processor and adapted to communicate over a network;
an upstream communication module, configured to enable the hardware processor to communicate via the application end interface, and comprising a first set of the plurality of machine codes;
one or more equipment end interfaces under control of the hardware processor and respectively electrically connected with the one or more dispensers;
a downstream communication module comprising a second set of the plurality of machine codes, configured to enable the hardware processor to communicate via the one or more equipment end interfaces; and
a control module comprising a third set of the plurality of machine codes, configured to enable the hardware processor to respond to commands received via the application end interface and to issue instructions to the one or more dispensers via the one or more equipment end interfaces;
wherein the memory stores the first set of the plurality of machine codes, the second set of the plurality of machine codes, and the third set of the plurality of machine codes.

12. The bridging circuit of claim 1, wherein the bridging circuit is configured to bridge between fuel dispensers or car wash equipment.

13. A bridging method comprising:
separating a first application from an equipped device by interposing a bridge;
intercepting, with the bridge, downstream communications to the equipped device from the first application;
using the bridge, accepting downstream communications to the equipped device from a second application;
with the bridge, designating one of the first application and the second application as an owner; and
implementing a lock state prohibiting control of the equipped device by an equipped device other than the owner,
wherein the separating comprises physically or logically separating an existing communication line between the first application and the equipped device by interposing the bridge.

14. The bridging circuit of claim 1, wherein the third set of the plurality of machine codes is configured to enable the hardware processor to implement the lock state so that the one of the plurality of application end interfaces that is indicated as the owner to which control of the equipment end interface has been assigned.

* * * * *